(12) United States Patent
Barter

(10) Patent No.: US 12,204,960 B2
(45) Date of Patent: Jan. 21, 2025

(54) NERVOUS SYSTEM EMULATOR ENGINE AND METHODS USING SAME

(71) Applicant: Joseph William Barter, Durham, NC (US)

(72) Inventor: Joseph William Barter, Durham, NC (US)

(*) Notice: Subject to any disclaimer, the term of this patent is extended or adjusted under 35 U.S.C. 154(b) by 183 days.

(21) Appl. No.: 18/155,129

(22) Filed: Jan. 17, 2023

(65) Prior Publication Data

US 2023/0177283 A1 Jun. 8, 2023

Related U.S. Application Data

(63) Continuation of application No. 16/120,251, filed on Sep. 1, 2018, now Pat. No. 11,556,724.

(Continued)

(51) Int. Cl.
*G06N 3/10* (2006.01)
*A61B 5/316* (2021.01)
(Continued)

(52) U.S. Cl.
CPC .............. *G06G 7/60* (2013.01); *B25J 9/1605* (2013.01); *B25J 9/1694* (2013.01); *G06N 3/004* (2013.01); *G06N 7/08* (2013.01)

(58) Field of Classification Search
CPC ......... G06G 7/60; B25J 9/1605; B25J 9/1694; B25J 9/1679; G06N 3/004; G06N 7/08;
(Continued)

(56) References Cited

U.S. PATENT DOCUMENTS

| 9,925,667 B1 | 3/2018 | Berard et al. |
| 11,556,724 B1 * | 1/2023 | Barter ............... G06N 7/08 |

(Continued)

OTHER PUBLICATIONS

Barter et al. (2014) "The role of the substantia nigra in posture control." European Journal of Neuroscience, 39(9), pp. 1465-1473.

(Continued)

*Primary Examiner* — Brandon S Cole
(74) *Attorney, Agent, or Firm* — Cozen O'Connor

(57) ABSTRACT

A nervous system emulator engine includes working computational models of the vertebrate nervous system to generate lifelike animal behavior in a robot. These models include functions representing several anatomical features of the vertebrate nervous system, such as spinal cord, brainstem, basal ganglia, thalamus, and cortex. The emulator engine includes a hierarchy of controllers in which controllers at higher levels accomplish goals by continuously specifying desired goals for lower-level controllers. The lowest levels of the hierarchy reflect spinal cord circuits that control muscle tension and length. Moving up the hierarchy into the brainstem and midbrain/cortex, progressively more abstract perceptual variables are controlled. The nervous system emulator engine may be used to build a robot that generates the majority of animal behavior, including human behavior. The nervous system emulator engine may also be used to build working models of nervous system functions for clinical experimentation.

23 Claims, 51 Drawing Sheets

Related U.S. Application Data

(60) Provisional application No. 62/553,609, filed on Sep. 1, 2017.

(51) Int. Cl.

| | | |
|---|---|---|
| *B25J 9/16* | (2006.01) | |
| *G06F 16/22* | (2019.01) | |
| *G06G 7/60* | (2006.01) | |
| *G06N 3/004* | (2023.01) | |
| *G06N 7/08* | (2006.01) | |
| *G16B 25/00* | (2019.01) | |

(58) Field of Classification Search
CPC ........ G06N 3/049; G06N 3/088; G06N 3/092; G06N 3/008; G06N 3/0464; G06N 3/084
See application file for complete search history.

(56) References Cited

U.S. PATENT DOCUMENTS

| | | | |
|---|---|---|---|
| 2007/0166707 A1 | 7/2007 | Schadt et al. | |
| 2008/0009771 A1 | 1/2008 | Perry et al. | |
| 2014/0303672 A1* | 10/2014 | Tran ................... | A61B 17/7004 606/255 |
| 2015/0106316 A1 | 4/2015 | Birdwell et al. | |
| 2016/0008988 A1* | 1/2016 | Kennedy ................. | B25J 15/08 414/738 |
| 2016/0242690 A1 | 8/2016 | Principe et al. | |
| 2023/0177283 A1* | 6/2023 | Barter ..................... | G06N 7/08 703/11 |

OTHER PUBLICATIONS

Barter et al. (2015) "Beyond reward prediction errors: the role of dopamine in movement kinematics." Frontiers in Integrative Neuroscience, 9, 22 pp.

Barter et al. (2015) "Basal Ganglia Outputs Map Instantaneous Position Coordinates during Behavior." Journal of Neuroscience, 35(6), pp. 2703-2716.

Powers (1973) "Behavior: The Control of Perception." Hawthorne, New York: Aldine de Gruyter. Chapters 4-14, 83 pp.

Powers (1979) "The Nature of Robots Part 1: Defining Behavior," Byte, 9 pp.

Powers (1979) "The Nature of Robots Part 2: Simulated Control System," Byte, 14 pp.

Powers (1979) "The Nature of Robots Part 3: A Closer Look at Human Behavior," Byte, 16 pp.

Powers (1979) "The Nature of Robots Part 4: Looking For Controlled Variables," Byte, 15 pp.

Powers (2008) "Living Control Systems III: The Fact of Control." Bloomfield, New Jersey: Benchmark Publications. Chapters 5-9 and Appendix, 56 pp.

Yin (2013) "Restoring Purpose in Behavior," In G. Baldassame & M. Mirolli (Eds.), Computational and Robotic Models of the Heirarchical Organization of Behavior (pp. 319-347). Berlin, Heidelberg: Springer Berlin Heidelberg, 30 pp.

Young (2017) "A General Architecture for Robotics Systems: A Perception-Based Approach to Artificial Life." Artificial Life, 23(2), pp. 236-286.

* cited by examiner

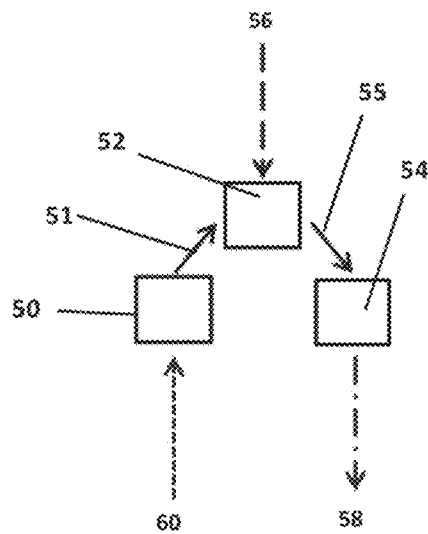
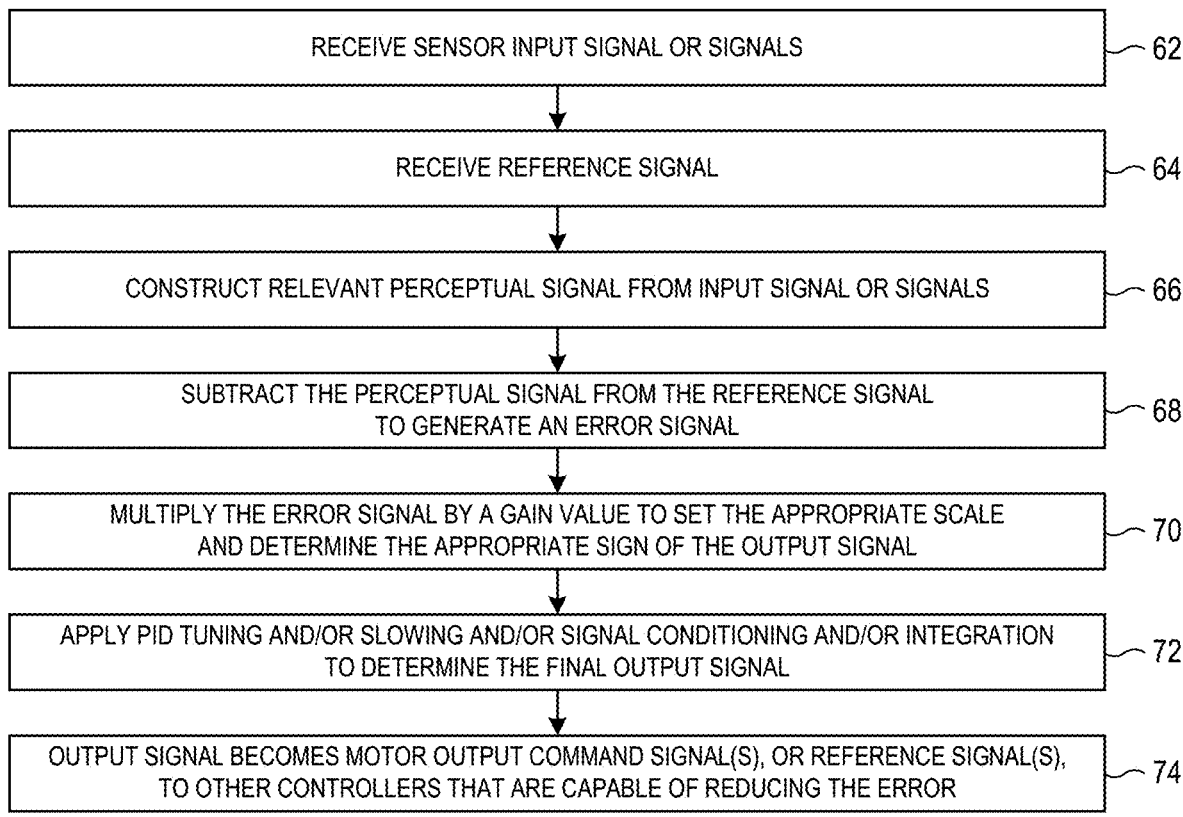
FIG. 1

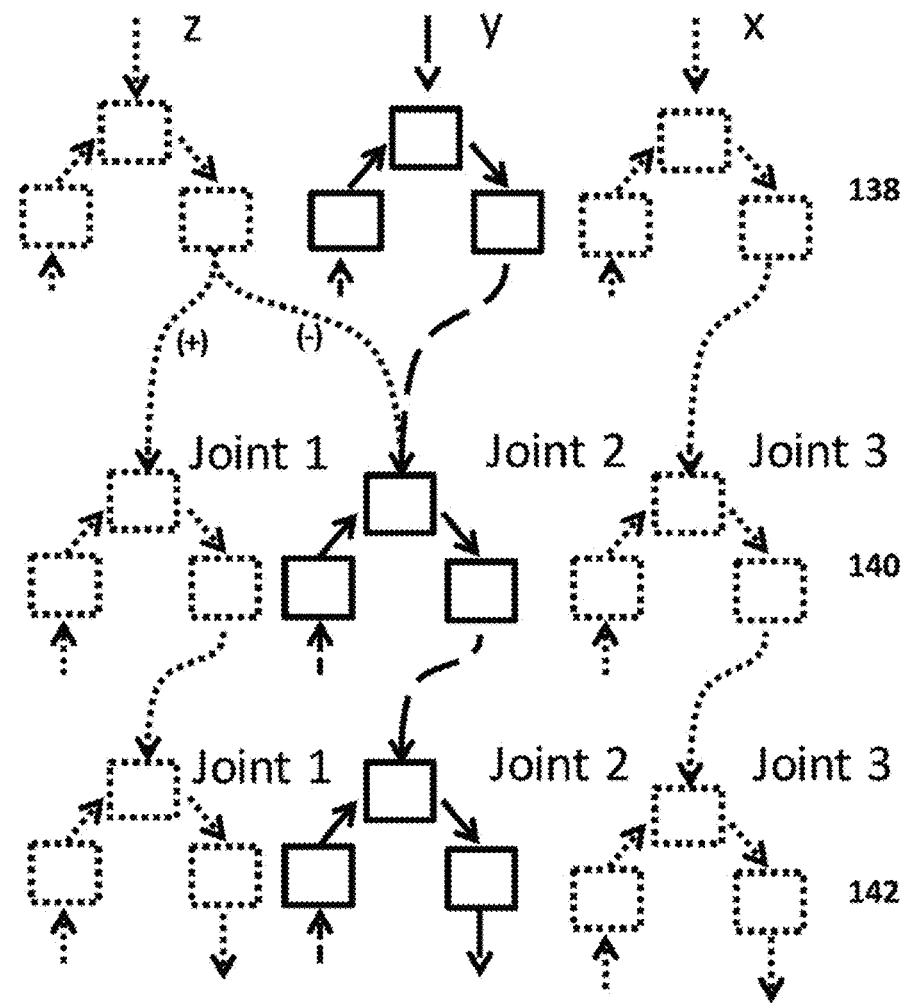
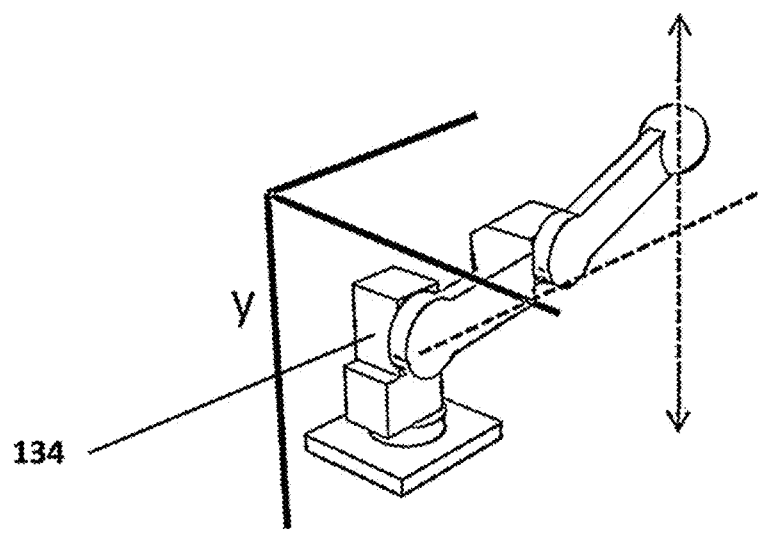
FIG. 6

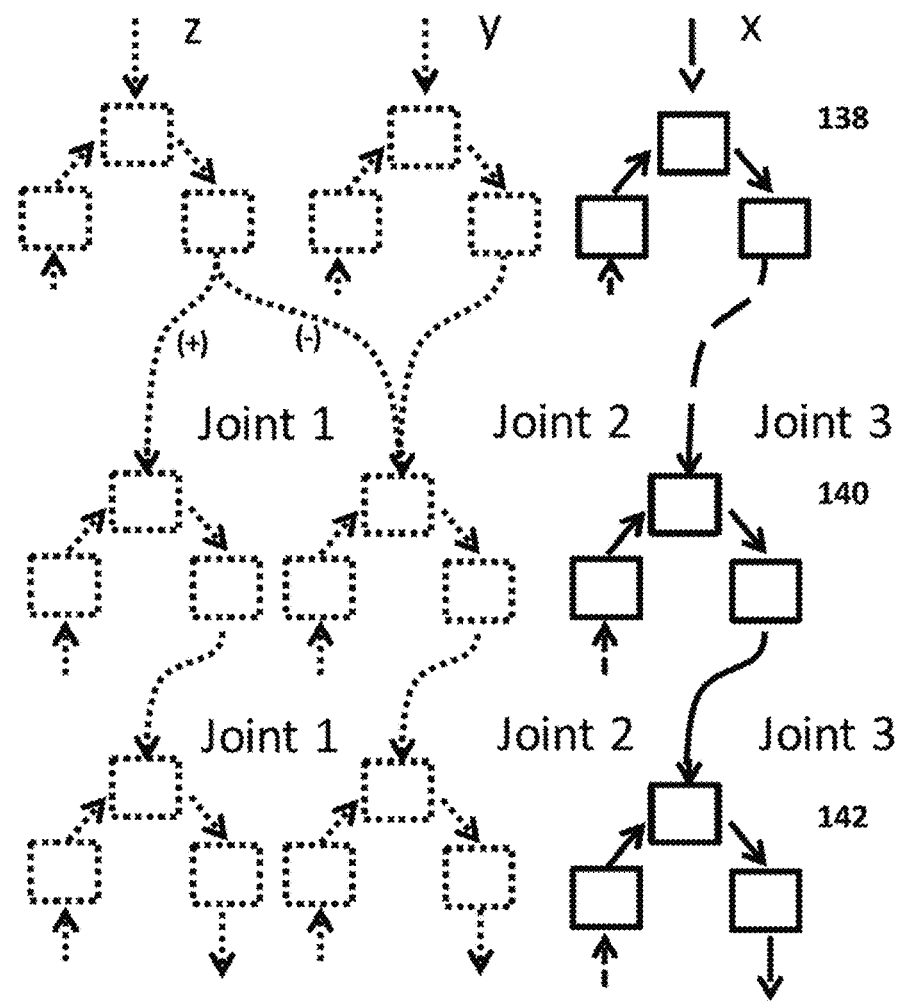
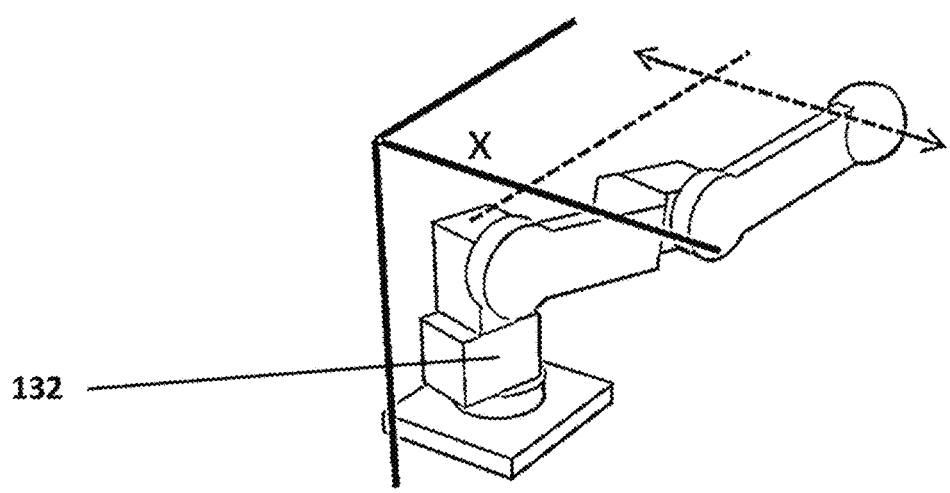
FIG. 8

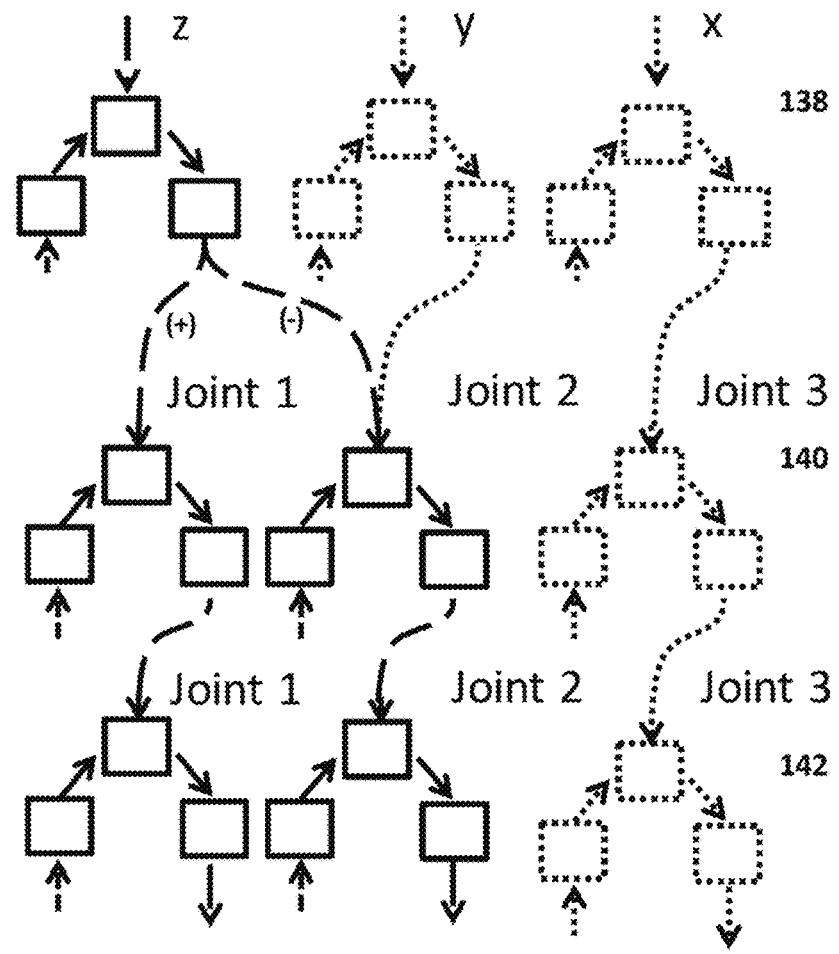
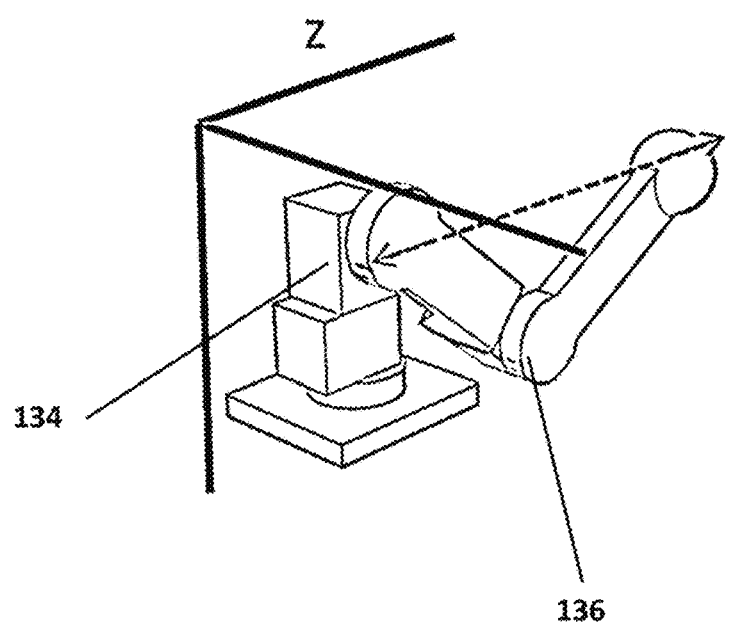
FIG. 9

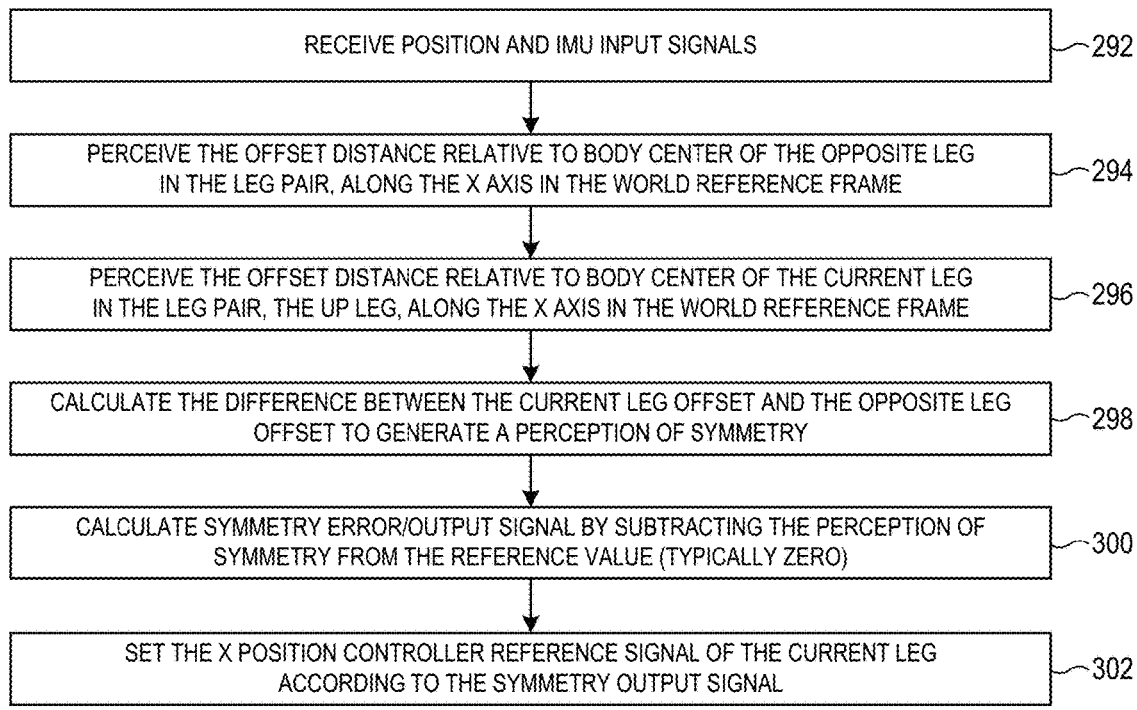
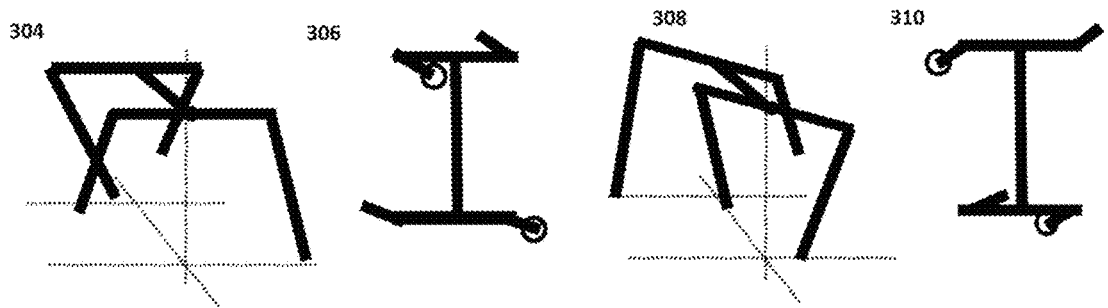
FIG. 18

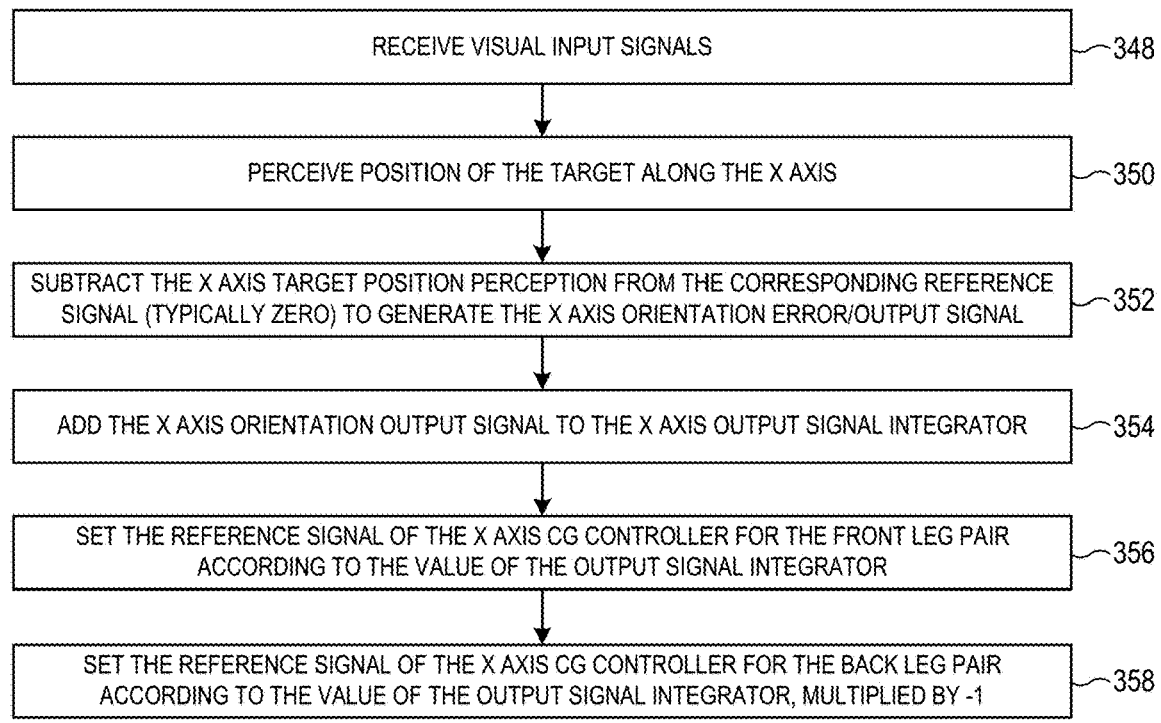
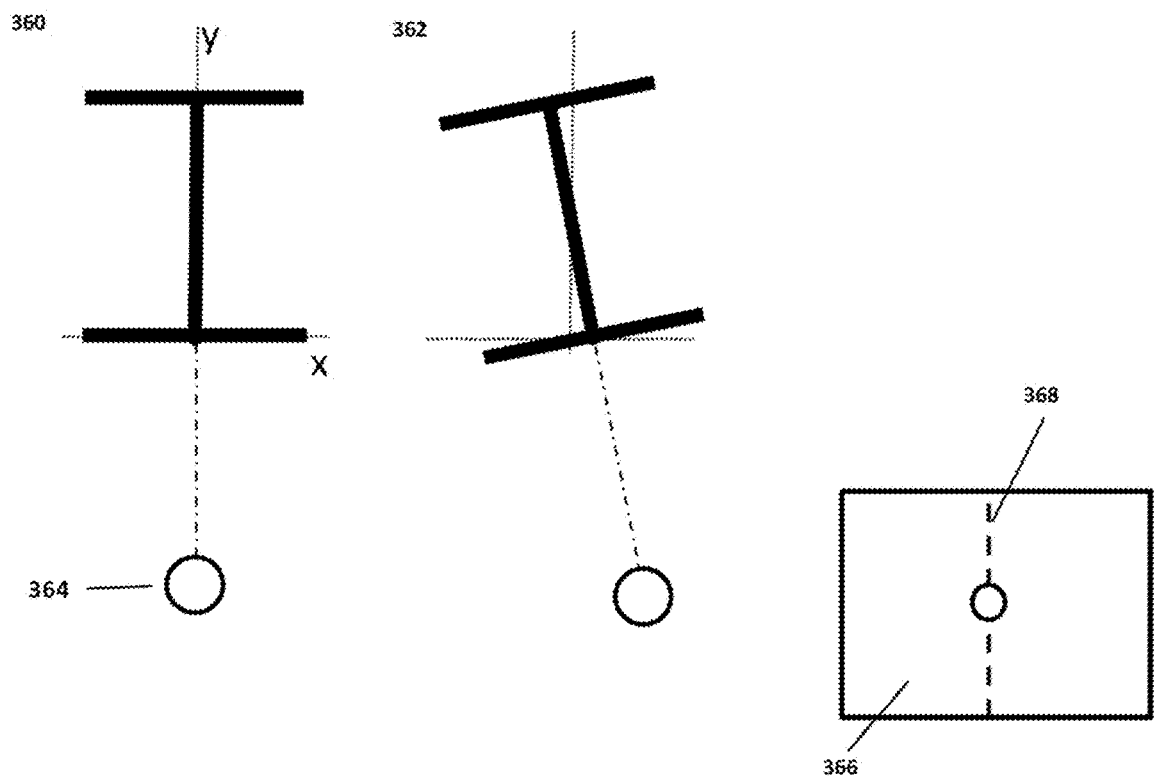
FIG. 21

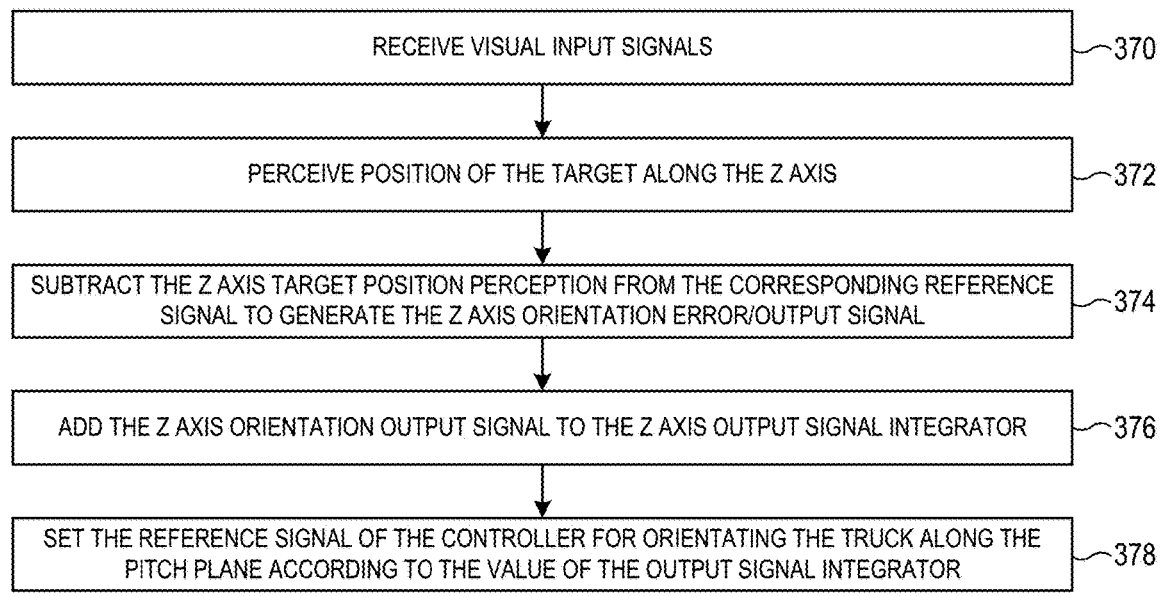
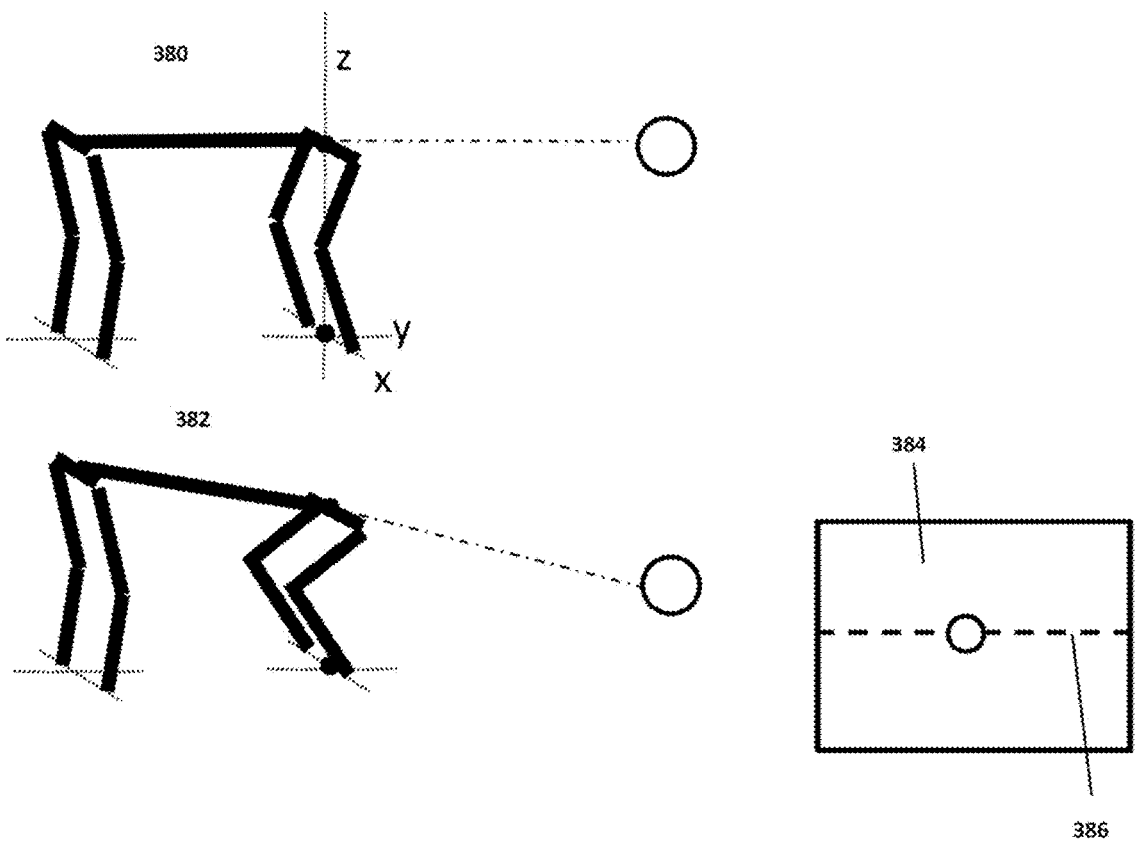
FIG. 22

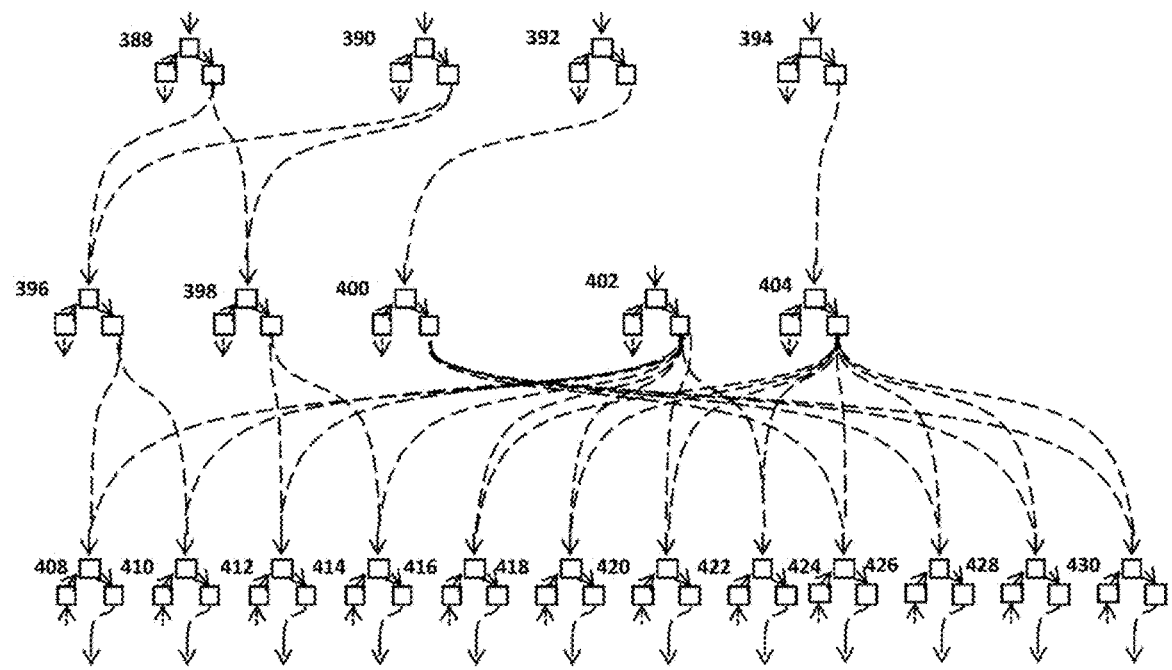
A
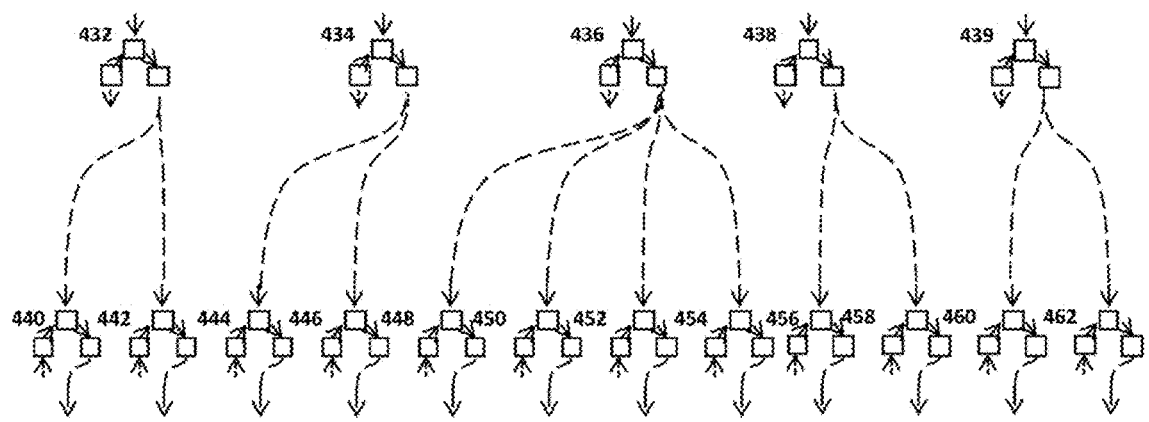
B
*FIG. 23*

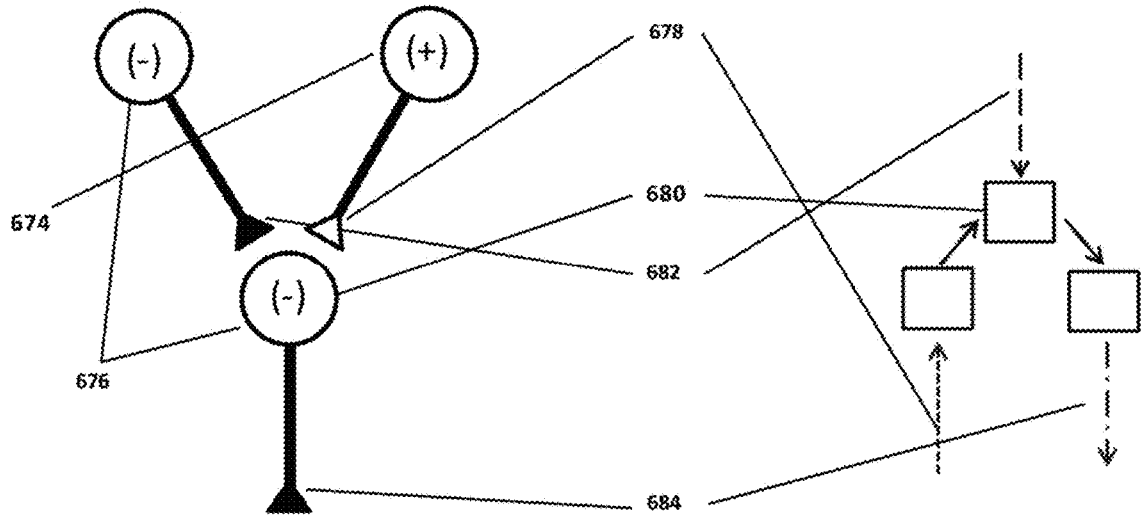
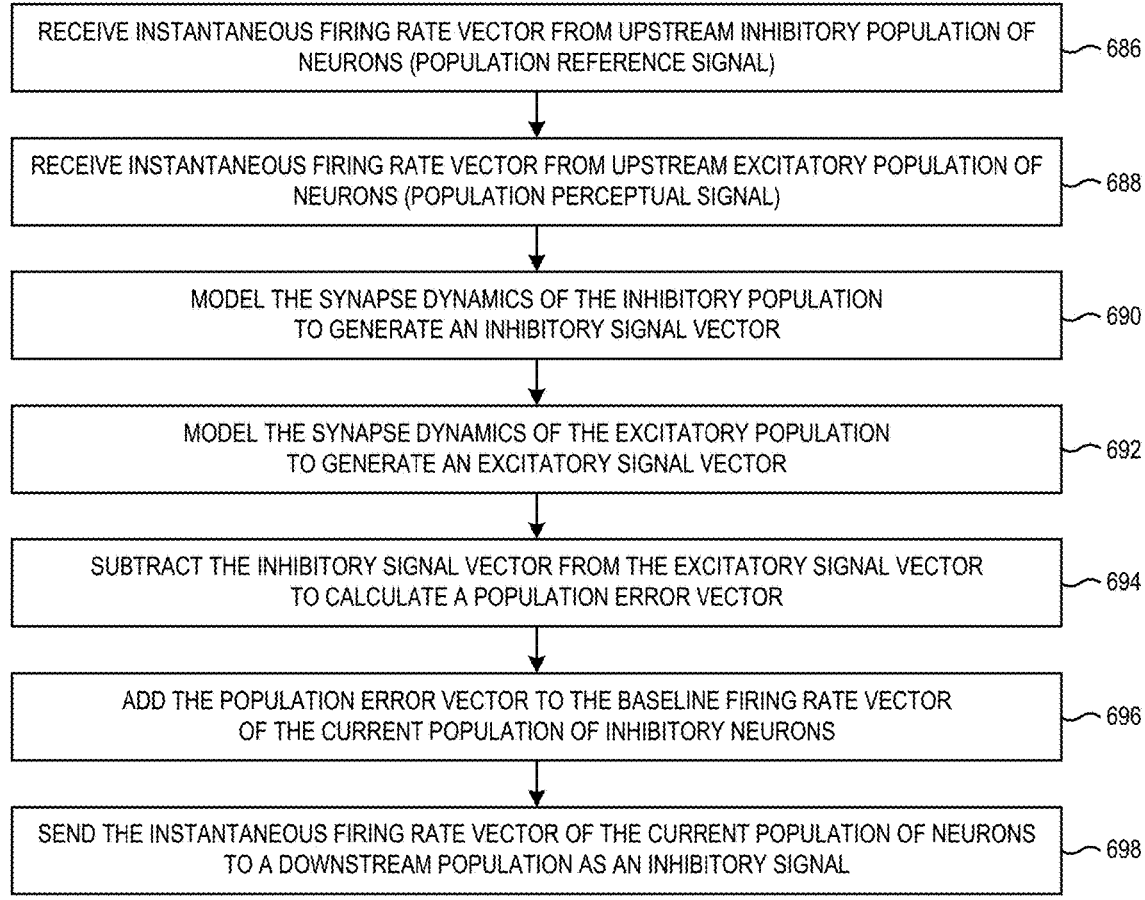
FIG. 36

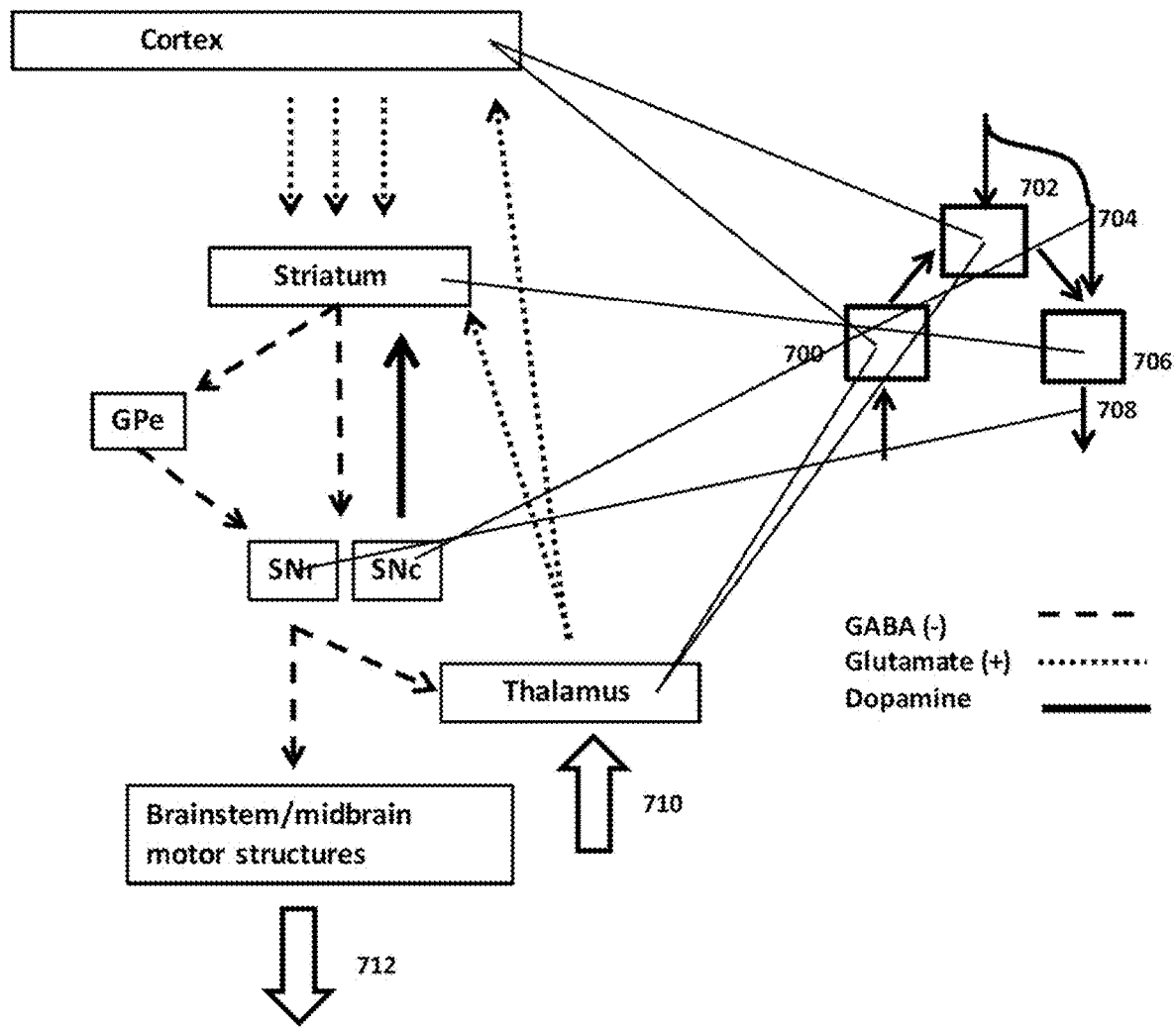
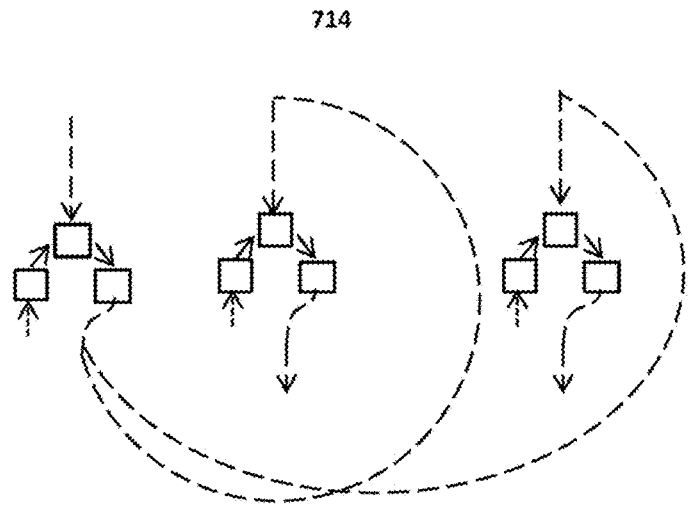
FIG. 37

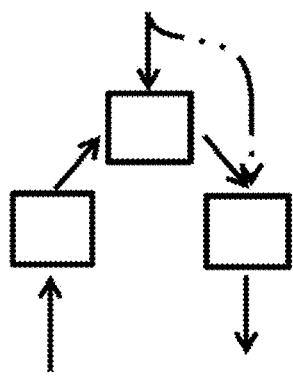 716
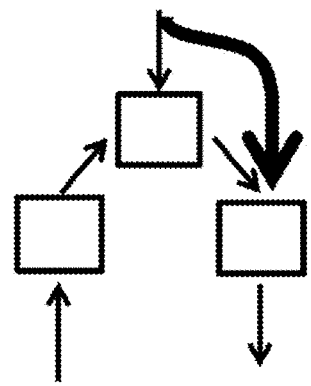 720
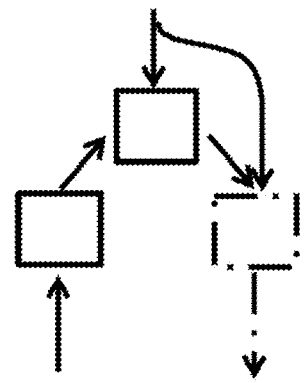 718
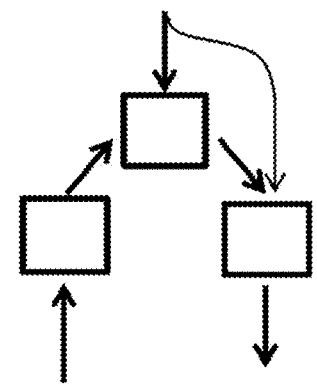 722
FIG. 38  FIG. 39

NERVOUS SYSTEM EMULATOR ENGINE AND METHODS USING SAME

RELATED APPLICATIONS

This application is a continuation of U.S. patent application Ser. No. 16/120,251, filed on Sep. 1, 2018, which claims priority to U.S. Provisional Patent Application No. 62/553,609, filed on Sep. 1, 2017. Each of these applications is incorporated herein by reference in its entirety.

BACKGROUND

Modern artificial intelligence and robotics are generally limited to engineering approximations of nervous system functions based on how they appear to an external observer, as in the Turing test. The importance of moving beyond this limitation and modeling the actual functions of the nervous system is highlighted by the recent success of layered artificial neural network techniques (e.g., deep neural networks) whose key design features originate in neuroscience. However, these techniques are generally more useful for perceptual processing than generating realistic animal behavior.

SUMMARY

In accord with the teachings herein, one embodiment of a nervous system emulator engine includes working computational models of the vertebrate nervous system to generate lifelike animal behavior in a robot body. These models include functions representing several anatomical features of the vertebrate nervous system, such as the spinal cord, brainstem, basal ganglia, thalamus, and cortex. These features are embodied in a parallel hierarchy of controllers in which controllers in higher levels accomplish goals by continuously specifying desired goals for controllers in lower levels. The lowest levels of the hierarchy reflect spinal cord circuits that control muscle tension and length. Moving up the hierarchy from the spinal cord into the brainstem and midbrain/cortex, progressively more abstract perceptual variables may be controlled. In principle, these techniques may be used to build a robotic system that generates the majority of animal behavior, including human behavior. These techniques may also be used to build accurate working models of nervous system functions for the purpose of clinical experimentation.

Unlike traditional approaches to controlling robot behavior, the nervous system emulator engine described herein advantageously does not require prediction or prior calculation, but instead relies on real-time computation based on feedback from sensors to generate behavior as a continuous process. As such, it requires relatively little computational power and is resistant to environmental disturbances. Because of the hierarchical organization of the controllers, these benefits exist at lower levels in which controlled variables include aspects of body configuration and force, and higher levels in which controlled variables include behavioral goals such as target proximity or the charge of an internal battery.

The nervous system emulator engine models actual features of the vertebrate nervous system, and thus has unique advantages. First, it produces lifelike behavior matching that of a real animal, a valuable feature in a robot toy or companion. Second, the nervous system emulator engine may be given a variety of neurological disorders by modifying the instructions (e.g., computer code) representing the corresponding neuroanatomical feature. As such, the nervous system emulator engine may be advantageously used as a test environment for safely and rapidly investigating the system-wide effects of various experimental treatments. Third, because the computations carried out by the emulator engine model the activity of neurons, the nervous system emulator engine may be employed as a new type of computational system designed to model nervous system functions directly.

Fourth, the nervous system emulator engine is capable of communicating with actual neural circuits in a format close to their native language. For example, electrophysiological neural firing rate data may be simply binned and read into the engine in real time as a continuous variable, designated as the appropriate signal-type reflecting their actual function in the nervous system (e.g., perceptual signal, reference signal, error signal) and routed to the appropriate target controller(s) within the nervous system emulator engine. Assuming the existence of a reliable method for translating in the other direction, from a continuous computer variable to in-vivo neural firing rate, the same logic would apply in reverse. As such, the nervous system emulator engine may prove valuable in various brain machine interface applications, including clinical applications such as neuroprosthetics and closed-loop deep brain stimulation.

A fifth advantage of the nervous system emulator engine is the relative simplicity of the design process. Standard control theory emphasizes extensive analysis and modeling of a control loop, including transfer functions of the components of the control loop, in order to ensure loop dynamical behavior (e.g., response time, stability, bandwidth). On the other hand, embodiments herein advantageously do not require this level of analysis to operate, and therefore more closely represent a vertebrate nervous system that interacts with components in the external world without knowledge of their transfer functions. This advantage becomes increasingly important with increasing abstraction of the perceptual variables to be controlled, increasing size and complexity of the control hierarchy, and with increasing variability in both the effector performance and environmental conditions. For example, a controller may be configured to control the orientation of a human user relative to itself as long as "human orientation relative to myself" can be perceived and represented as a single input value, despite the fact that the feedback transfer function of the human user in this case is effectively impossible to model given our current understanding of the human attentional system. Such a nervous system emulator engine may be designed through experimentation and/or the unsupervised learning methods described below.

In an embodiment, a vertebrate nervous system emulator engine includes a plurality of controllers arranged according to a vertebrate nervous system hierarchical model. Each of the controllers may be configured to (a) convert at least one input signal, from a plurality of sensors coupled to a plurality of controllable components, into one perceptual signal, (b) generate an error by comparing its perceptual signal to a reference value, and (c) process the error into an output signal so as to reduce that error when a subset of output signals from the plurality of controllers control a plurality of effectors manipulating the controllable components.

In another embodiment, a method emulating robotic control like a vertebrate nervous system includes, for each of a plurality of controllers arranged according to a vertebrate nervous system hierarchical model, (a) converting at least one input signal, from a plurality of sensors coupled to a plurality of controllable components of a robot body, into one perceptual signal, (b) generating an error by comparing the perceptual signal to a reference value, and (c) processing the error into an output signal so as to reduce the error when a plurality of the output signals controls a corresponding plurality of effectors, of the robot body, that manipulate the controllable components of the robot body.

In another embodiment, a vertebrate nervous system emulator engine includes a plurality of controllers interconnected according to a vertebrate nervous system hierarchical model. Each of the controllers may have a processor and memory communicatively coupled with the processor. Each of the controllers may also have software implemented as machine-readable instructions stored in the memory and configured to control the processor to (i) store one perceptual signal, from one of a plurality of sensors coupled to a plurality of controllable components, in the memory, (ii) generate an error by comparing its perceptual signal to a reference value, and (iii) process the error into an output signal so as to reduce that error when a subset of output signals from the plurality of controllers control a plurality of effectors manipulating the controllable components.

In another embodiment, a vertebrate nervous system emulator engine includes a processor, memory communicatively coupled with the processor, and software implemented as machine-readable instructions stored in the memory and configured to control the processor to iteratively (i) receive a plurality of input signals from a plurality of sensors coupled to a plurality of controllable components, (ii) convert the plurality of input signals into a plurality of perceptual inputs, (iii) for each of the perceptual inputs, generate an error by comparing said each of the perceptual inputs to a reference value, and process the error with tuning into one output signal, and (iv) route the output signals according to a vertebrate nervous system hierarchical model so as to reduce the errors when a subset of output signals control a plurality of effectors manipulating the controllable components.

BRIEF DESCRIPTION OF THE FIGURES

FIG. 1 shows the organization of one controller, in an embodiment.

FIG. 6 shows a hierarchy for controlling a Cartesian Y offset between a foot and a shoulder of the robotic arm of FIG. 5, in an embodiment.

FIG. 8 shows a hierarchy for controlling a Cartesian X offset between the foot and the shoulder of the robotic arm of FIG. 5, in an embodiment.

FIG. 9 shows a hierarchy for controlling a Cartesian Z distance between the foot and the shoulder of the robotic arm of FIG. 5, in an embodiment.

FIG. 18 shows symmetry control behavior, and corresponding pseudocode, in the flight legs of the quadruped robot of FIG. 12, when stepping, in embodiments.

FIG. 21 shows a hierarchy and corresponding pseudocode for controlling location of a visual target along the horizontal axis relative to center of the visual field, in embodiments.

FIG. 22 shows a hierarchy and corresponding pseudocode for controlling location of a visual target along the vertical axis relative to center of visual field, in embodiments.

FIG. 23 shows hierarchies responsible for a) stance leg behavior and b) flight leg behavior of the quadruped robot of FIG. 12 during stepping, in embodiments.

FIG. 36 shows a method and corresponding pseudocode that models neural circuits for clinical experimentation, in embodiments.

FIG. 37 shows a method that models the basal ganglia, in an embodiment.

FIG. 38 shows a method that models neurological disorders in a robot, in an embodiment.

FIG. 39 shows a method that models drug administration to a robot, in an embodiment.

DETAILED DESCRIPTION

Embodiments presented herein generate behavior in a robot through a hierarchy of input control system modules having the same basic design. For clarity, these input control system modules are referred to herein as "controllers." Each controller receives a different input or combination of inputs from sensors, outputs one output signal to a target, and has unique tuning based on a control loop, or loops, of which it is part. The robot therefore requires three types of components: (1) sensors, (2) a device for assembling the hierarchy (e.g., computer, microcontroller), and (3) effectors of movement (e.g., motors).

Figure 1A:
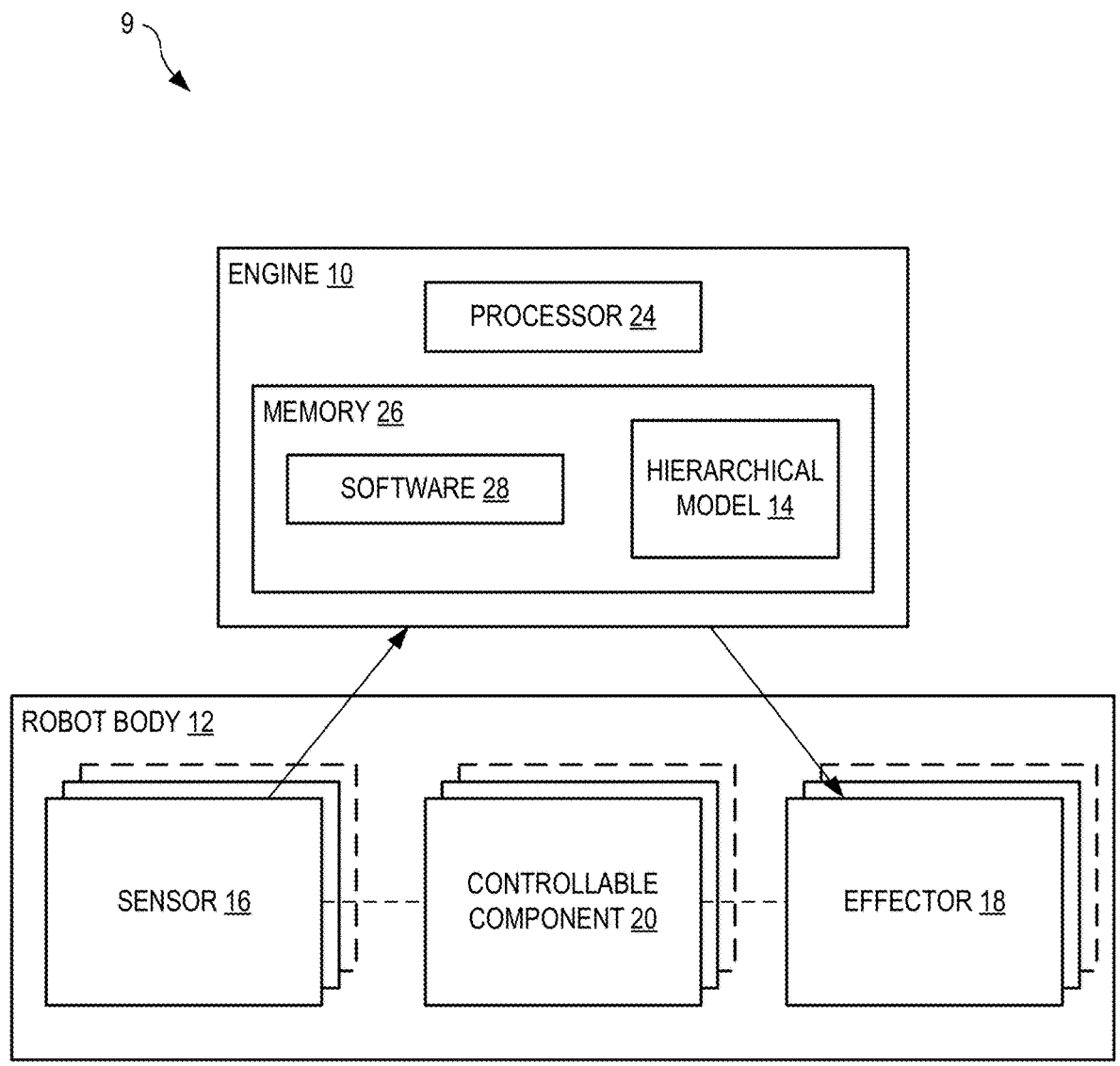
FIG. 1A is a schematic illustrating one example robotic system with a nervous system emulator engine for controlling a robot body, in embodiments.

FIG. 1A is a schematic illustrating one example robotic system 9 with a nervous system emulator engine 10 that controls a robot body 12 having a plurality of controllable components 20 (e.g., arms, legs, joints). Robot body 12 also has a plurality of sensors 16 and a plurality of effectors 18 that together sense perceptual inputs and manipulate controllable components 20. Nervous system emulator engine 10 employs a hierarchical model 14 that includes one or more controllers, each implemented with discrete electronic components and/or a processor circuit 24. Each controller also has memory 26 storing software 28, implemented as machine-readable instructions configured to control processor circuit 24, that provides the functionality of nervous system emulator engine 10 as described herein. For example, software 28 may control processor circuit 24 to receive inputs from all sensors 16, implement hierarchical model 14, and route output signals to control effectors 18. In another example, emulator engine 10 is implemented using a plurality of processors, each processor implementing one part of hierarchical model 14 to collectively animate robot body 12.

FIG. 1 shows the organization of one controller. Each controller receives an input signal (or signals) 60, which is transformed according to an input function 50 into a perceptual signal 51 representing the state of a controlled variable in the form of a voltage or computer numeric quantity. If the input signal naturally reflects the perceptual signal, then no conversion is necessary (e.g., input function 50 may be the identity function). The perceptual signal is then compared with a reference value 56, according to a comparison function 52, to calculate an error 55, which may be the difference between the current state and the reference state. Error 55 is then transformed according to an output function 54 into an output signal 58 that is sent to a robot body capable of reducing that error (e.g., robot body 12 of FIG. 1A). Output function 54 may contain proportional, integral, and derivative (PID) tuning and/or other signal conditioning. The parameters of the output function may be manually adjusted or automatically adjusted through gradient descent to achieve stability in control.

The process shown in FIG. 1 occurs in real time; if the hierarchy is implemented with a microprocessor-based computer then it will occur in a loop with frequencies ranging from 50 Hz to 1000 Hz, if not higher. Controllers in one level of the hierarchy may be implemented in parallel through vector or matrix operations, with an indexing scheme to accomplish proper signal routing. When the controllers are arranged in a hierarchy (see FIG. 3), the output signals of each level are calculated from top to bottom, i.e., higher level output signals are calculated before lower level output signals. Output signals from multiple active controllers that converge on a single lower-level controller may be added to generate a single reference signal for the lower-level controller.

Figure 2:
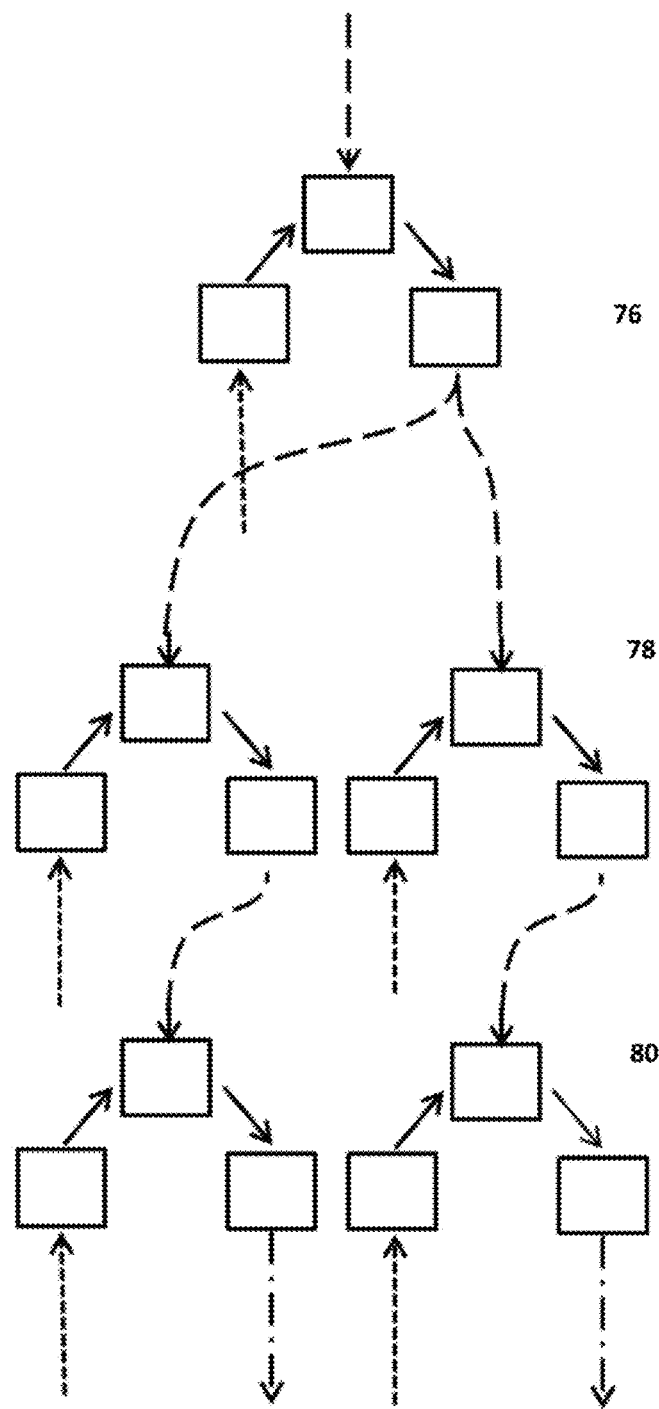
FIG. 2 shows a plurality of the controllers of FIG. 1 arranged in a control hierarchy, in an embodiment.

FIG. 2 shows a plurality of the controllers of FIG. 1 arranged in a control hierarchy, with level 1 representing a first level 80 of the hierarchy. When a controller is part of first level 80, the output signal of the controller is converted into a velocity or acceleration command for a motor or group of motors that determine effector position. When a controller belongs to a higher level (e.g., second level 78, third level 86), the output signal of the controller is routed to one or more lower-level controllers as the reference signal for each lower-level controller.

All control hierarchies, regardless of which variable is controlled by which controller, have the organization of FIG. 2: higher-level controllers (e.g., controllers of second level 78 and third level 86) defend their reference signals by adjusting the reference signals of controllers of lower levels (e.g., first level 80).

Embodiments described herein feature a control hierarchy that reflects the organization and reorganizational flexibility of the vertebrate nervous system. Level 1 in this hierarchy is the level of force control. A force sensor, such as a strain gauge or spring displacement sensor, may be oriented such that the force along the axis of effector movement is sensed. The physical variable controlled by level 1 controllers is force, with each controller sensing and controlling force along its corresponding axis. For example, when the force reference signal is set to zero, then the effector yields to move in the opposite direction to an outside force acting upon it so that the sensed force remains as close to zero as possible. Likewise, when the force reference signal is set to a non-zero value, the effector will move in the appropriate direction, depending on the sign of the force reference signal, until that force reference is achieved either through effector acceleration or through contact with an external object.

In one embodiment, each force controller is programmed with floor and ceiling forces representing a safe limit of forces for the corresponding effector, beyond which the corresponding effector will yield. As level 1 of the control hierarchy represents the lowest level of spinal circuitry for controlling muscle tension, as sensed by golgi tendon organs, yielding of an effector above a force threshold models what is known in the art as the golgi tendon reflex.

Level 2 of the hierarchy is the level of effector position or joint angle control. Position sensors, such as potentiometers, are arranged to sense the position of each effector along its axis of movement. This arrangement is similar to any servo-type motor position controller, with some key differences. The most important of these differences is that the position error signals are not directly converted into motor commands, but instead into force reference signals for the corresponding force controller at level 1 operating along the same dimension of movement. Therefore, if the sensed effector position is different from the reference effector position, the resulting error is converted into a force reference signal of the appropriate sign. The force controller will then seek the desired reference force by moving the effector accordingly. As the position error is thereby reduced through movement commanded by the force controller, so too is the force reference signal reduced at the same time until the position reference signal is achieved and the force reference signal thus returns to neutral. This arrangement results in position adjustments that actively minimize force production. The benefits of this arrangement are energy efficiency, fluidity of movement, and safety for both the robotic system itself and for objects and living things in the surrounding environment. These benefits also exist in an alternate embodiment (see FIG. 37) of joint angle control in which joint angle control is accomplished by a physiologically realistic three-level hierarchy with contracting "muscles." In this alternate embodiment, all higher levels are shifted up by one level to make room for the additional level so that level 3 becomes level 4, etc. In another alternative embodiment which may or may not be combined with the previous alternative embodiment, joint angle is controlled by a three-level hierarchy in which force control is at level 1, joint velocity control is at level 2, and joint position control is at level 3. In this embodiment, all higher-level controllers in the hierarchy are shifted up by one additional level. Regardless of the exact embodiment, this level of the hierarchy represents spinal circuitry for controlling muscle velocity and length as sensed by type 1*a* and type II fibers from muscle spindles. This level also represents joint angle control through reciprocal inhibition, in which the controlled variable is the difference between the muscle lengths across a joint and which is most accurately modeled using the first alternative embodiment described above.

Level 3 of the hierarchy is the level of Cartesian relationship control. Cartesian position is calculated for each relevant body part in real time based on joint angles and known bone lengths. Various geometric relationships between body parts in three-dimensional (3D) space may then be perceived in the body reference frame (e.g., the X or Y distance between the foot and corresponding shoulder of a leg). With the addition of tilt-sensors, such as an inertial measurement unit (IMU) located inside the robot, body coordinates can be rotated so that Cartesian relationships are perceived and controlled relative to the vector of gravity in the world reference frame. Such world-referenced control is necessary to perceive variables important in balance, such as the position of the center-of-gravity for a leg pair over the support position of the feet. Once assembled, Cartesian perceptions are controlled relative to goal values by simply calculating the difference (e.g., error) between them in the body reference frame and then outputting those values as reference signals to the appropriate level 2 position controllers. Level 3 errors are converted into joint angle reference signals by scaling them to accomplish the appropriate relative joint angle velocities to move along the specified Cartesian dimension (e.g., see FIGS. 6-8). The joint angle output signals resulting from each dimension of Cartesian error are added together to generate the final joint angle reference signals required to accomplish control in 3D space. The controllers at this level represent higher spinal and brainstem systems for basic forms of postural control, orientation control and locomotion, e.g., the reticulospinal, tectospinal, and vestibulospinal systems. The IMU models the vestibular system.

To generate a level 3 output signal (e.g., output signal 58 of FIG. 1) that serves as a level 2 reference signal for position, rather than movement, the level 3 error (e.g., error 55 of FIG. 1) may be integrated. Without integration, the level 3 error may be understood as how the joint angle position should be changed (e.g., joint angle velocity) so as to reduce the level 3 error. Thus, the level 3 error may be integrated into a reference value for joint angle position, as the level 2 controller is a joint angle position controller as opposed to a joint-angle velocity controller. Integration may be implemented with the output function of the level 3 controller (e.g., output function 54 of FIG. 1) via the integration term (i.e., the "I" term) of a PID controller, such that the level 3 output signal is integrated; other types of tuning containing integration may be alternatively used, such as PI or $PI^2D$. Alternatively, the integration may be implemented with an integrator located between the level 3 and level 2 controllers, in which case the (unintegrated) level 3 output signal is integrated into the level 2 reference signal (e.g., see the leaky integrator below). While the above example describes integration of a level 3 error, similar benefits apply to integration of errors of other levels (e.g., level 4).

In neuroscience, a leaky integrator may be used to model the behavior of a synapse where an upstream neuron releases a neurotransmitter that continuously accumulates in, and is removed from, the synapse. In this case, the influence of the upstream neuron on the downstream neuron is indirectly determined by a quantity of the accumulated neurotransmitter in the synapse. Various types of recurrent neural circuits and cell membrane dynamics are also believed to perform leaky integration for a variety of purposes in the brain, including movement and perceptual processing.

In certain embodiments, leaky integrators are used to smoothly move controllable components 20 when robotic system 9 switches between operational modes, advantageously preventing controllable components 20 from rapidly snapping to neutral or between positions and thereby damaging controllable components 20 and/or surrounding objects. Each operational mode uses a different subset of the controllers, and therefore the number and interconnectivity of the controllers must accommodate all of the operational modes. For example, robotic system 9 may transition between stance and flight modes during stepping (see FIGS. 17-18 below). To transition between operational modes, certain controllers may be turned off (i.e., their output signals are set to zero, or some other neutral value) while other controllers may be turned on (i.e., their output signals are enabled so as to have values other than zero, or the neutral value).

In certain embodiments, a leaky integrator time-integrates a level 3 output signal into an integrated output signal used to derive at least one level 2 reference signal. For example, when robotic system 9 transitions between modes by turning off the level 3 controller (i.e., setting the level 3 output signal to zero), the leaky integrator momentary maintains the integrated output signal at the value prior to the transition between modes, thereby preventing the corresponding level 2 reference signal from jumping to zero even though the level 3 output signal abruptly jumps to zero. The output of the leaky integrator then slowly decays to zero, or neutral, allowing the controllable components controlled by level 2 controllers to slowly decay to their neutral positions. Conversely, when robotic system 9 transitions between modes by enabling the level 3 controller, the leaky integrator provides a smoothly varying level 2 reference signal even though the level 3 output signal inputted to the leaky integrator may abruptly jump away from zero.

In some embodiments, one leaky integrator is used for each level 3 output signal to be integrated. In other embodiments, level 2 reference signals are derived from both integrated and non-integrated level 3 output signals. The leaky integrator may be an analog integrator circuit, such as an op-amp integrator with resistive feedback to replicate a leak, or a sample-and-hold circuit. Alternatively, the leaky integrator may be implemented digitally with a dedicated digital integrator circuit or microprocessor circuit that implements the leaky integration algorithmically. The leaky integrator may be tuned so as to change a size of the modeled leak. For example, when the leaky integrator is an analog op-amp integrator, the leaky integration may be tuned by adjusting the feedback resistance and/or feedback capacitance to change the leak time constant. When the leaky integrator is implemented digitally, the leaky integration may be tuned by changing parameters of the algorithm.

In other embodiments, one leaky integrator is used for each level 2 reference signal input. In one of these embodiments, an adder derives a weighted sum from a plurality of level 3 output signals such that the leaky integrator time-integrates the weighted sum. In embodiments where each level 3 output signal has its own leaky integrator, a weighted sum of several integrated level 3 output signals may be derived as a level 2 reference signal. Thus, the order in which level 3 output signals are scaled, added, and integrated is irrelevant.

Level 4 of the hierarchy is the level at which the strict stratification of the control hierarchy breaks down. Level 4 controllers may control a wide variety of perceptual variables, including those derived wholly or from combinations of inputs from visual, auditory, somatosensory, proprioceptive, and other neurological systems. For example, a level 4 controller may control a perceptual input representing a second-order geometric relationship between body parts, or between a body part and a perceptual target or location in the external world. Level 4 controllers may also control perceptions such as the left-right difference in foot-force for a leg pair, perceived temperature, perceived charge of an internal battery, force vectors, and perceptions of social status. As long as the robot is equipped with sensors and processors capable of perceiving a particular physical variable, and as long as that variable can be meaningfully influenced through some combination of locomotor, orientation or postural/motor adjustments, then it should be possible to control that variable via a level 4 controller tuned for that variable.

An important feature of level 4 controllers is that they may be combined in flexible ways through learning to generate new control architectures as the output function of a single level-4 controller. As such, level 4 may be thought of as a workspace for assembling new architectures, while individual level 4 controllers may occupy virtually any position in these architectures from the lowest level (sends outputs to level 3 controllers or lower), to the highest level of a hierarchy formed from other level 4 controllers. The control architectures beginning at this level represent the basal ganglia, thalamus, cortex and the "thalamocortical" circuit loops that connect them. Level 4 controllers may also represent the pyramidal motor outputs from the cortex, which can control reference signals of any lower level controller directly (levels 3, 2 or 1).

In certain embodiments, a leaky integrator time-integrates a level 4 output signal into an integrated output signal used to derive at least one level 3 reference signal. In other embodiments, a leaky integrator time-integrates a level 4 output signal into an integrated output signal used to derive at least one level 4 reference signal. In other embodiments, level 3 reference signals are derived from both integrated and non-integrated level 4 output signals. In other embodiments, level 4 reference signals are derived from both integrated and non-integrated level 4 output signals.

Besides hierarchies, one aspect of embodiments herein is sequencing, i.e., activating subhierarchies of the controllers according to a sequence so as to achieve a particular task or sequence of tasks. A "subhierarchy" is a subset of the controllers that are interconnected via their output signals and reference signals. A subhierarchy includes one controller at a top level of the subhierarchy, as well as each lower-level controller whose reference value can be derived back to the output signal of the top-level controller. For example, a subhierarchy having a level 4 controller at its top level may also include at least one level 3 controller, at least one level 2 controller, and at least one level 1 controller.

Each step of sequencing may be initiated in response to certain feedback signals. For example, each controller of a first subhierarchy may be activated so as to stabilize the error of said each controller to within a threshold margin (i.e., "achieve its goal" of aligning the perceptual signal with the reference signal). After the top-level controller of the first subhierarchy has achieved its goal, a second subhierarchy may be subsequently activated. When the top-level controller of the second subhierarchy has achieved its goal, a third subhierarchy may then be activated. This process continues until each step of the sequence has been completed. As discussed below with respect to FIGS. 34-35, sequence control architectures may be assembled through unsupervised learning methods to generate sophisticated puzzle-solving behavior.

At each step of sequencing, a previously activated subhierarchy may be deactivated or held online at its current reference state until some later step in the sequence occurs, depending on the task(s). Sequencing may be orchestrated by a sequencer that monitors the errors of the controllers to determine when a step of the sequence is complete. The sequencer then initiates the next step of the sequencing by opening and/or closing switches that route output signals of one level of the subhierarchy to the next lower level. In one embodiment, a level 4 controller cooperates with a sequencer to achieve its goal. For example, a robot may be configured to (1) go to a wireless battery charging station and (2) activate the charging station by stepping on a lever, in order for the level 4 controller to achieve its goal of "full battery charge." In this case, the sequencer implements steps 1 and 2 with a two-step sequence, each step activating a different subhierarchy that operates to achieve its own goal.

In another embodiment, a level 4 controller uses nested sequencing to achieve its goal. For example, if the charging station of the above example is enclosed and only accessible by a door that the robot must first open, then the sequence may be: (1) go to the wireless battery charging station, (2) open the door, and (3) activate the charging station by stepping on the lever. However, step 2 may be accomplished with a sub-sequence. The step 2 sub-sequence to "open the door" may be: (i) bring the front right food to a position just in front of the door latch, (ii) move the foot a distance into the door latch, and (iii) move the foot down to a point close to the ground. The entire step 2 sub-sequence may be repeated until the goal of "door open" is accomplished and the door is perceived to be open; only then can the higher "battery charging" sequence proceed to step 3.

One benefit of nested sequencing is that previously learned sequences may be used as part of entirely new sequences, advantageously reducing the amount of learning required to perform a new task. It is emphasized that sequencing strives to achieve a sequence of perceptual goals, and not produce a sequence of outputs. The outputs in this case, as with all controllers, are produced only as the means of achieving the desired perceptual input. Such outputs can vary widely over time as required by changing environmental conditions, while maintenance of the desired perceptual input remains constant.

If an active controller is unable to achieve its goal (e.g., the environment has changed, the robot is injured, the goal is new and has never been achieved before), it is possible for the nervous system emulator engine to learn how the active controller may achieve its goal. The learning may consist of transforming and routing the output signal of the active controller through a variety of pathways until a configuration is found that allows the active controller to achieve its goal. The learning may also consist of adjusting PID tuning coefficients and/or other parameters of the output function of the active controller (e.g., output function 54 of FIG. 1).

The learning may be implemented by gradient descent in which the gradient being navigated is the error of the active controller. Outputs of this gradient descent include exploratory changes in the conversion by which the output signal is transformed into the reference signals of lower controllers. Typically, an output signal is converted into lower reference signals by either (a) multiplying it by a vector of gain or weighting values ranging from −1 to 1, in which each gain value specifies the conversion of the output signal into the reference signal of a particular lower controller, or (b) converting it directly into a vector of static reference signal values ranging from −1 to 1. Reference signals may specify joint angles, forces, body postures, Cartesian coordinates, position coordinates in high-dimensional perceptual space, etc. By applying exploratory changes to the conversion vector, a wide variety of lower reference signals may be derived from one higher-level output signal. The number of steps in a sequence may also be adjusted, as discussed in more detail below with regards to FIGS. 30-31 and 33-36. It is important to emphasize that these techniques for learning are concerned with establishing the exact set of reference signals (i.e., goals) for lower controllers that allows for a higher controller to successfully achieve and defend its own reference signal. All involved controllers are continuously adjusting outputs as required by changing environmental conditions so that the input perceptual signal of each matches its corresponding reference signal. This approach is contrasted with common reinforcement-learning techniques for selecting the specific output actions, in response to sensory inputs, that result in maximization of some "reward" consequence over time. Such reinforcement learning techniques result in the construction of what are essentially open-loop input-output systems, whereas the learning techniques outlined here result in the construction of an active hierarchy of closed-loop controllers.

At the highest level of authority in the control hierarchy is a selector that activates and deactivates controllers to prevent conflict and maintain an overall level of performance. The selector is given a small set of essential controllers selected from the level 4 controllers, which must continuously maintain their goals within an acceptable range. For example, one controller might maintain the goal of "battery charge," while another maintains the goal of "proximity to human," etc. As with the essential homeostatic variables of real animals, the maintenance of these essential goals is ultimately responsible for the majority of behavior produced by the robot. Because these goals are often incompatible, such as if the human and the charging station are in different rooms, it is often necessary that one of the essential controllers be selected while all other essential controllers are turned off. Otherwise, the robot would exist in a state of limbo in which the outputs of conflicting controllers cancel each other and neither goal is achieved. The selector prevents these limbo states while ensuring that none of the essential controllers acquire an error outside of an acceptable range. In its simplest form, the selector activates the essential controller that is experiencing the highest error while deactivating all other essential controllers. Besides preventing conflict and failure, a benefit of this top-level organization is that controllers are periodically allowed to experience errors significant enough to activate learning. This periodic learning is beneficial for developing and fine-tuning controllers in an ever-changing environment.

DETAILED DESCRIPTION OF THE FIGURES

Figure 51:
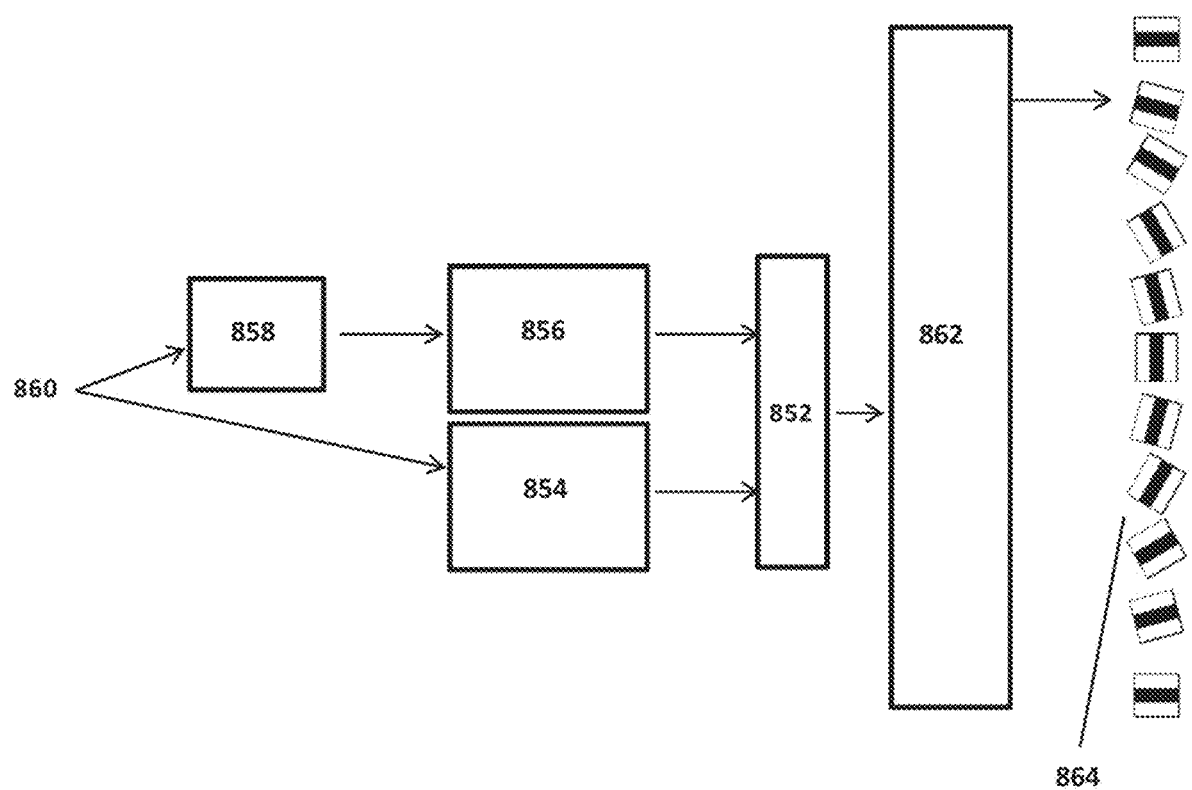
FIG. 51 shows a method that implements gradient descent in analog circuitry, in an embodiment.
Figure 52:
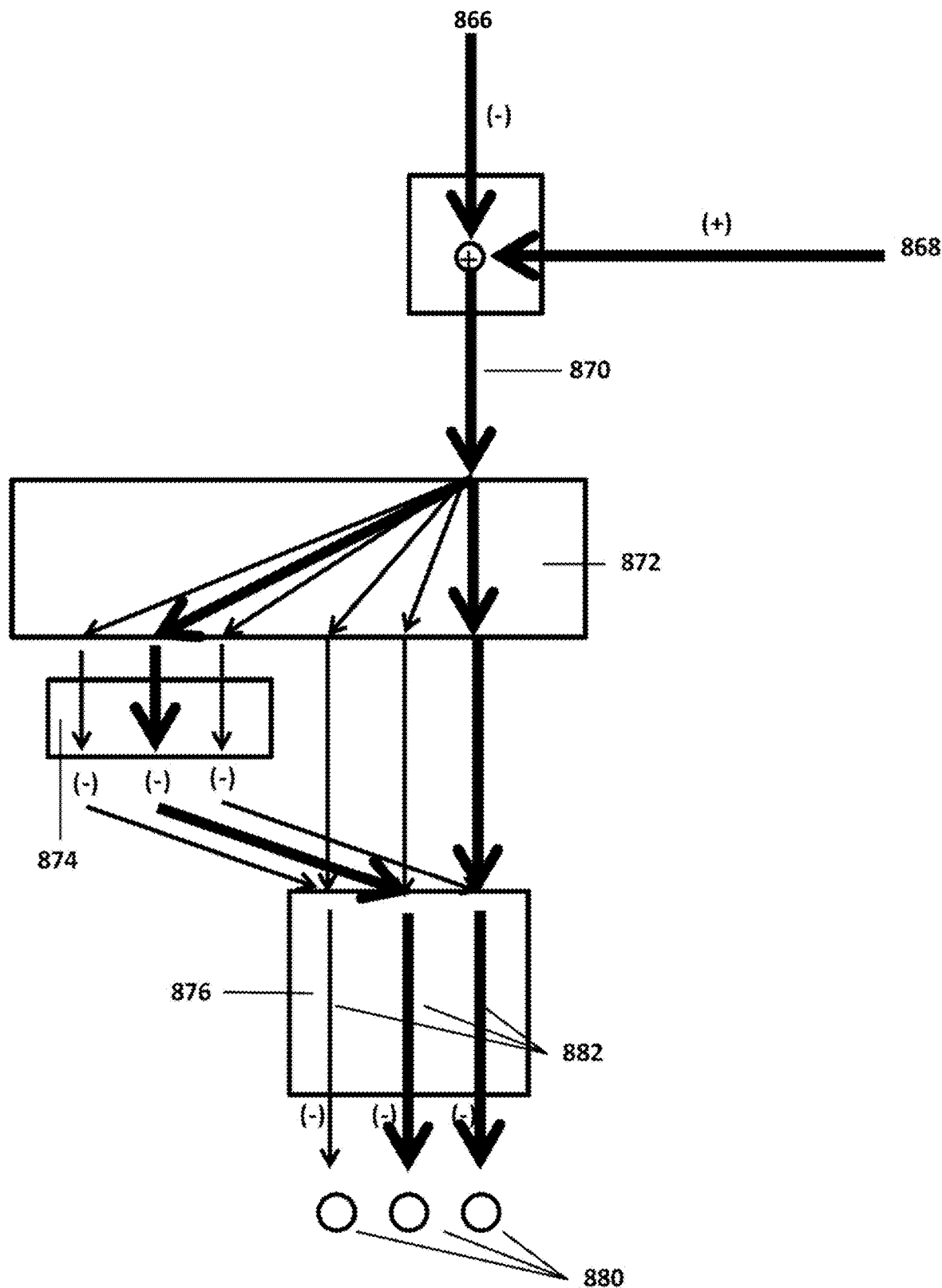
FIG. 52 shows a method that constructs and reorganizes the output function of a controller in analog circuitry, in an embodiment.
Figure 53:
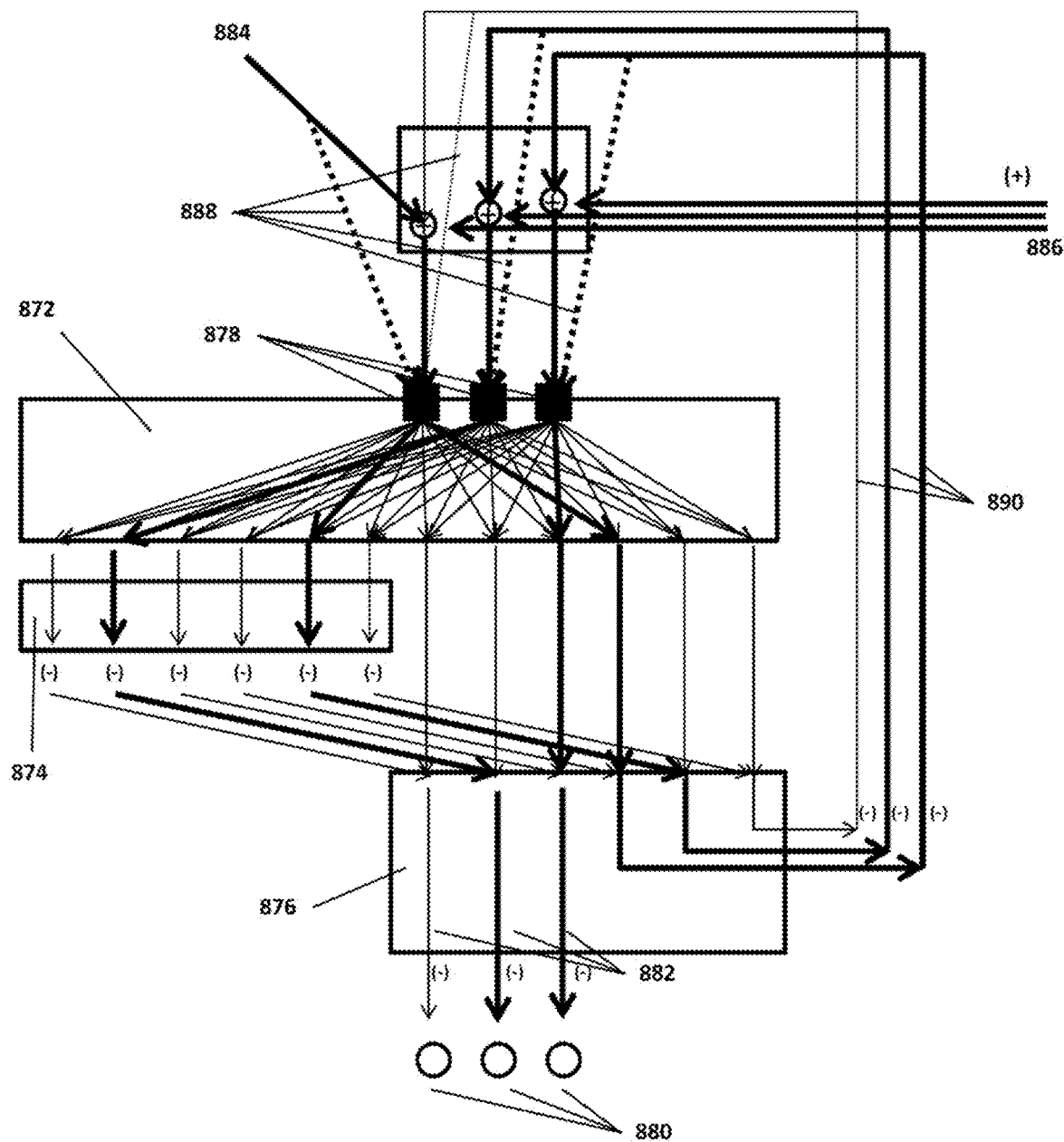
FIG. 53 shows a method that constructs and reorganizes control hierarchies in analog circuitry, in an embodiment.

FIGS. 1-53 provide examples and embodiments of a nervous system emulator engine that utilizes computational models, including a computational unit or "controller" (FIG. 1), a hierarchy of controllers (FIG. 2), robot control hierarchies (FIG. 3), a joint angle control hierarchy (FIGS. 4-10, 41 and 42), a joint protective reflex (FIG. 11), a controller hierarchy for a legged robot (FIGS. 12-23, 44-46, and 48-49), a visual target controlling hierarchy (FIGS. 21 and 22), center of gravity (CG) controlling hierarchies (FIGS. 14, 16, 20 and 44), controlling hierarchies for generating locomotion (FIGS. 19 and 20), controlling hierarchies for visual perception (FIGS. 24-26), controlling hierarchies for target pursuit and obstacle avoidance (FIGS. 27-28), reorganization of controlling hierarchies through learning (FIGS. 25-26, 29-32, and 34-35), social signaling by controlling hierarchies (FIG. 40), clinical experimentation controlling hierarchies (FIGS. 36-39), computational hardware (FIG. 50), gradient descent controlling hierarchy (FIG. 51), and analog process controlling hierarchies (FIGS. 52-53).

FIG. 1 shows the organization of one controller, as described above. Pseudocode blocks 62-74 show operational steps of the controller.

FIG. 2 shows a plurality of the controllers of FIG. 1 arranged in a control hierarchy, as described above. For clarity, perceptual and reference signals may be normalized to a scale from −1 to 1, with 0 representing a neutral state.

Figure 3:
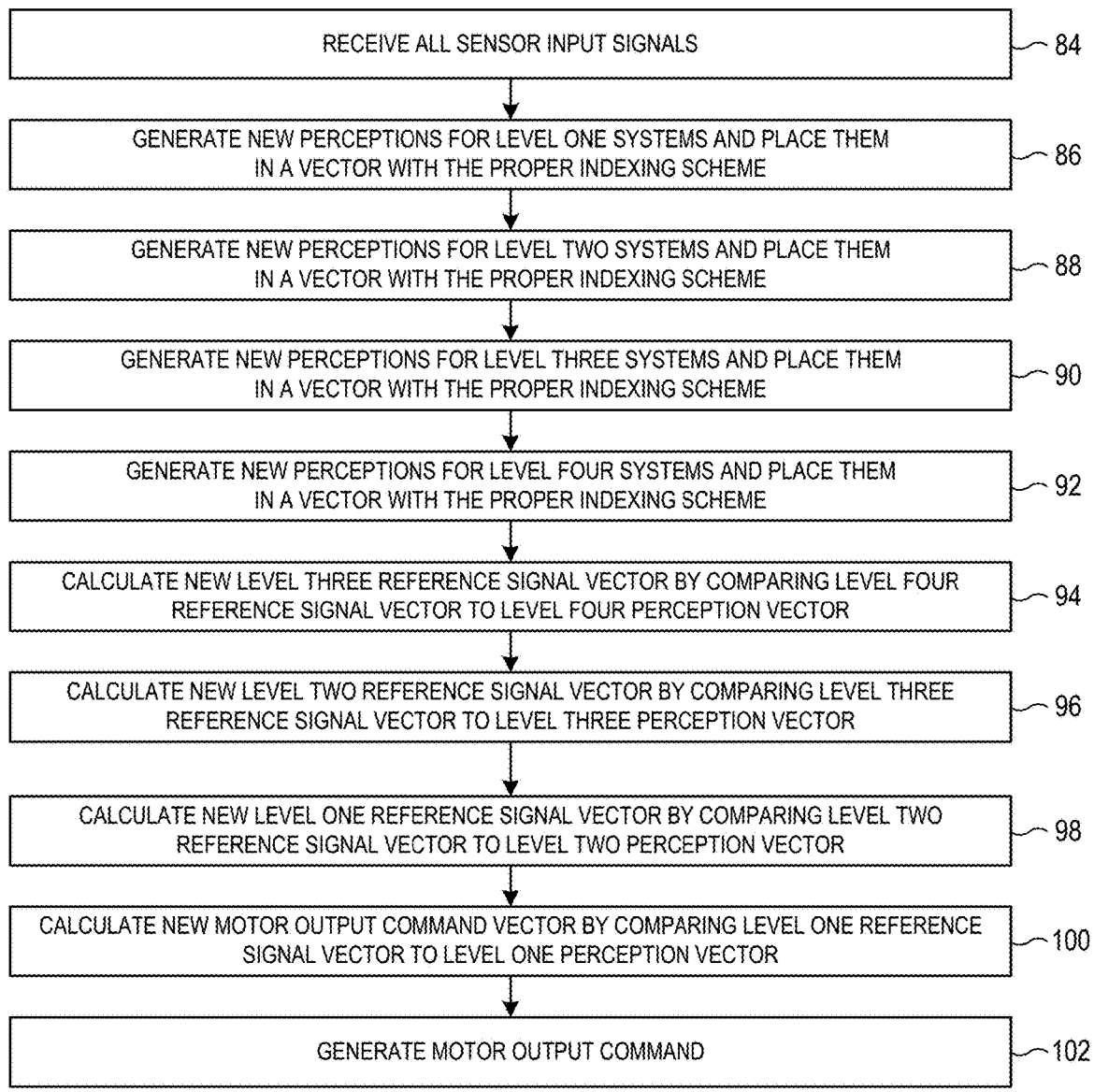
FIG. 3 shows components and pseudocode for assembling control hierarchies in a robot body using standard digital computer parts, in embodiments.

FIG. 3 shows components 82 and pseudocode 84-102 for assembling control hierarchies in a robot body using general computer parts. These hierarchies run continuously in a loop. At the beginning of each step in the loop, sensor inputs are read and converted into computer format 84. Sensor input values are then converted into perceptual values and filled into an indexed perceptual matrix 86-92. There is a corresponding internal reference matrix with the same indexing scheme representing the goal values for the perceptual matrix. Within each step in the loop, all of the perceptual values for a given level in the hierarchy are compared with their corresponding reference values to calculate the error between them for each controller at that level. These error values are then converted into output signals. Outputs from controllers in the hierarchy above level 1 become updated values in the reference matrix for the next lower level of controllers 94-98. Outputs from controllers at level 1 of the hierarchy become motor output command signals 100-102. The targets, relative gains and PID tunings of these adjustments to lower reference signals or motor outputs are determined by a predefined set of output tables and sometimes specialized output weighting functions. Within each step in the loop, this process occurs from the top of the hierarchy to the bottom. Calculations are performed as vector or matrix math wherever possible for speed and simplicity. In all of the following pseudocode examples, it is assumed that there is a step in which an error undergoes PID tuning, output gain weighting and sign switching where necessary, signal conditioning etc. before it is added to the reference signal of the appropriate lower level controllers.

Figure 4:
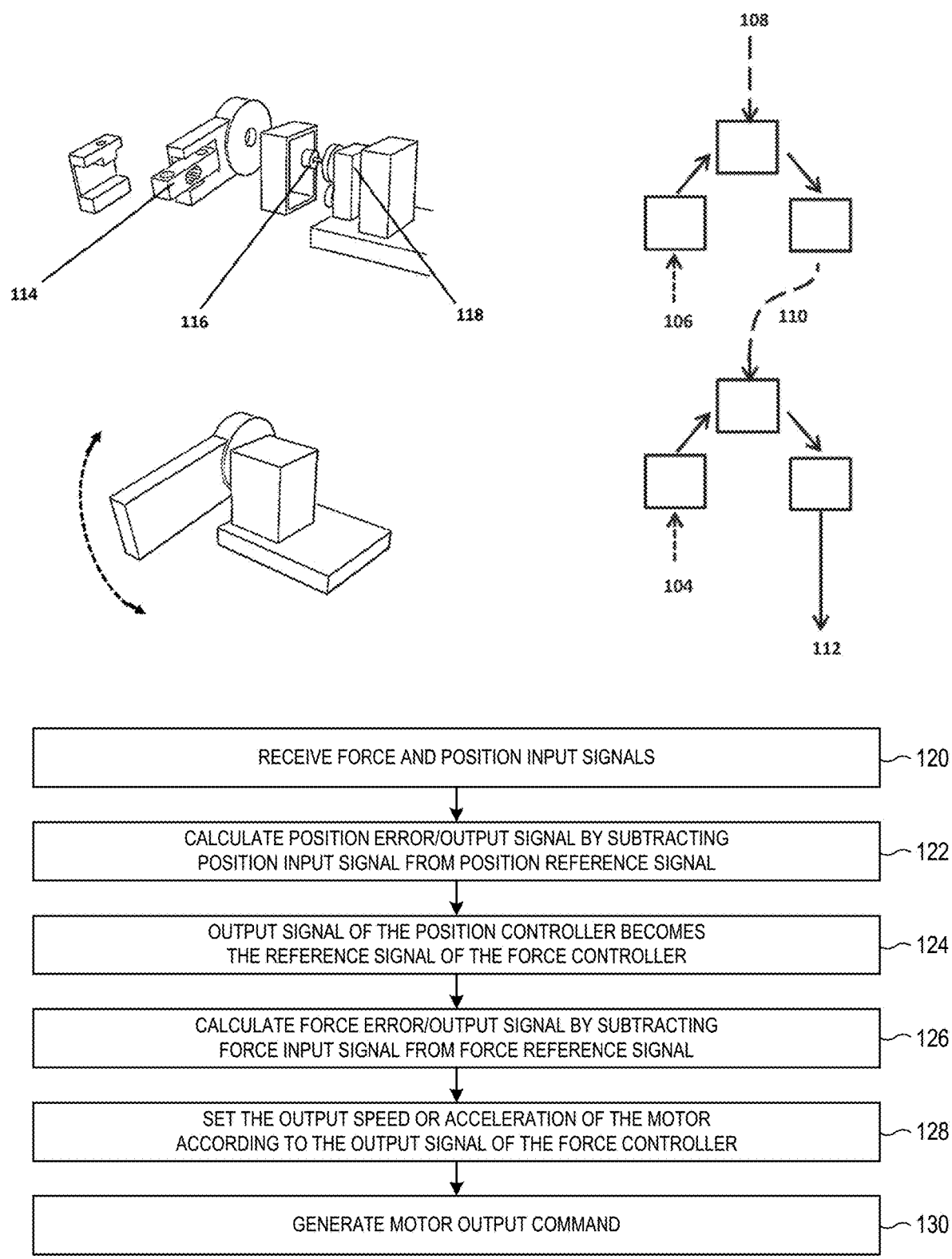
FIG. 4 shows an example joint angle control hierarchy, in an embodiment.

FIG. 4 shows an example joint angle control hierarchy. This hierarchy controls joint angle 106 at level 2 and joint force 104 at level 1 for a single joint. The joint angle controller reduces its error by adjusting the reference signals 110 of the force controller for the same axis of movement. The force controller reduces its error by adjusting motor outputs 112. The connection between the motor output and the body part being actuated may be mediated by a soft material (sorbothane for example) to aid in vibration dampening and safety as long as the position sensor senses the position of the actual body part rather than just the position of the motor output.

Figure 5:
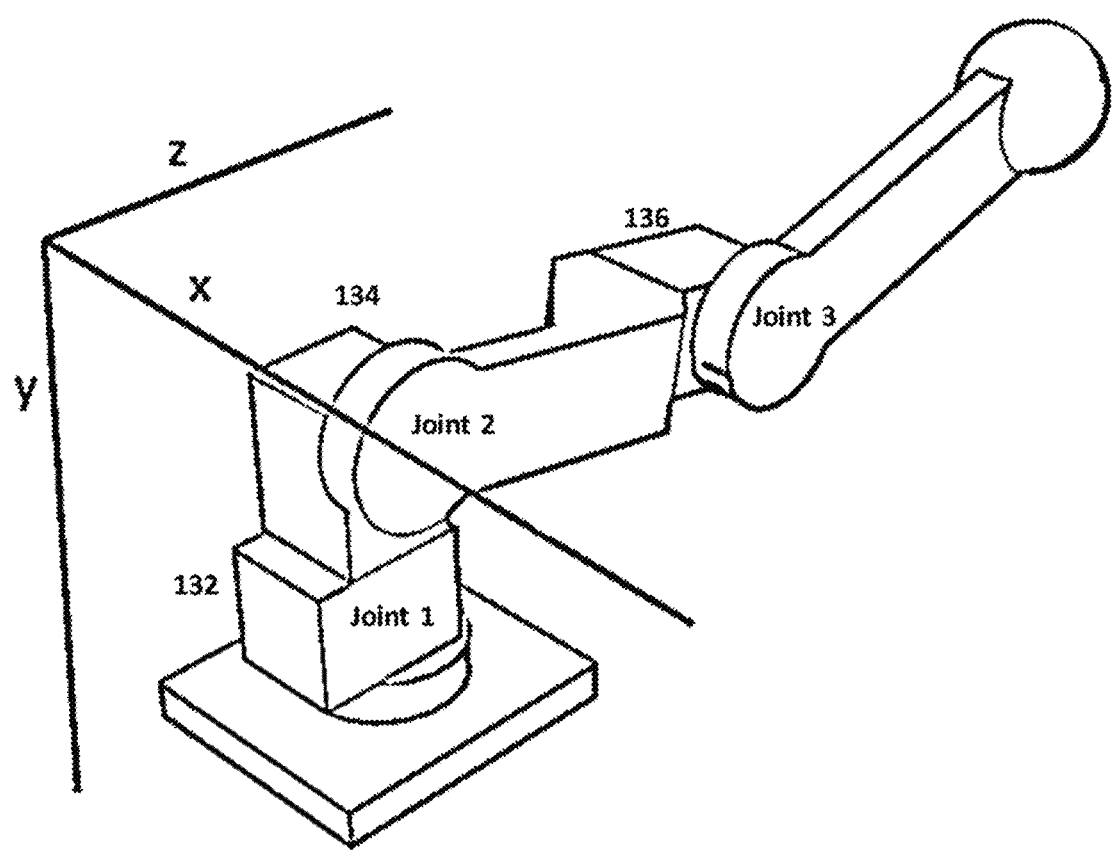
FIG. 5 shows a robotic arm comprised of three joint angle controllers.

FIG. 5 shows a robotic arm comprised of three joint angle controllers.

FIG. 6 shows a hierarchy for controlling a Cartesian Y offset between a foot and a shoulder of the robotic arm of FIG. 5. The Y offset is controlled by adjusting reference signals of the joint angle controller for joint 2. In FIGS. 6-10, controller hierarchies are shown in solid lines and dotted lines for the purpose of highlighting the subset of controllers depicted in solid lines.

Figure 7:
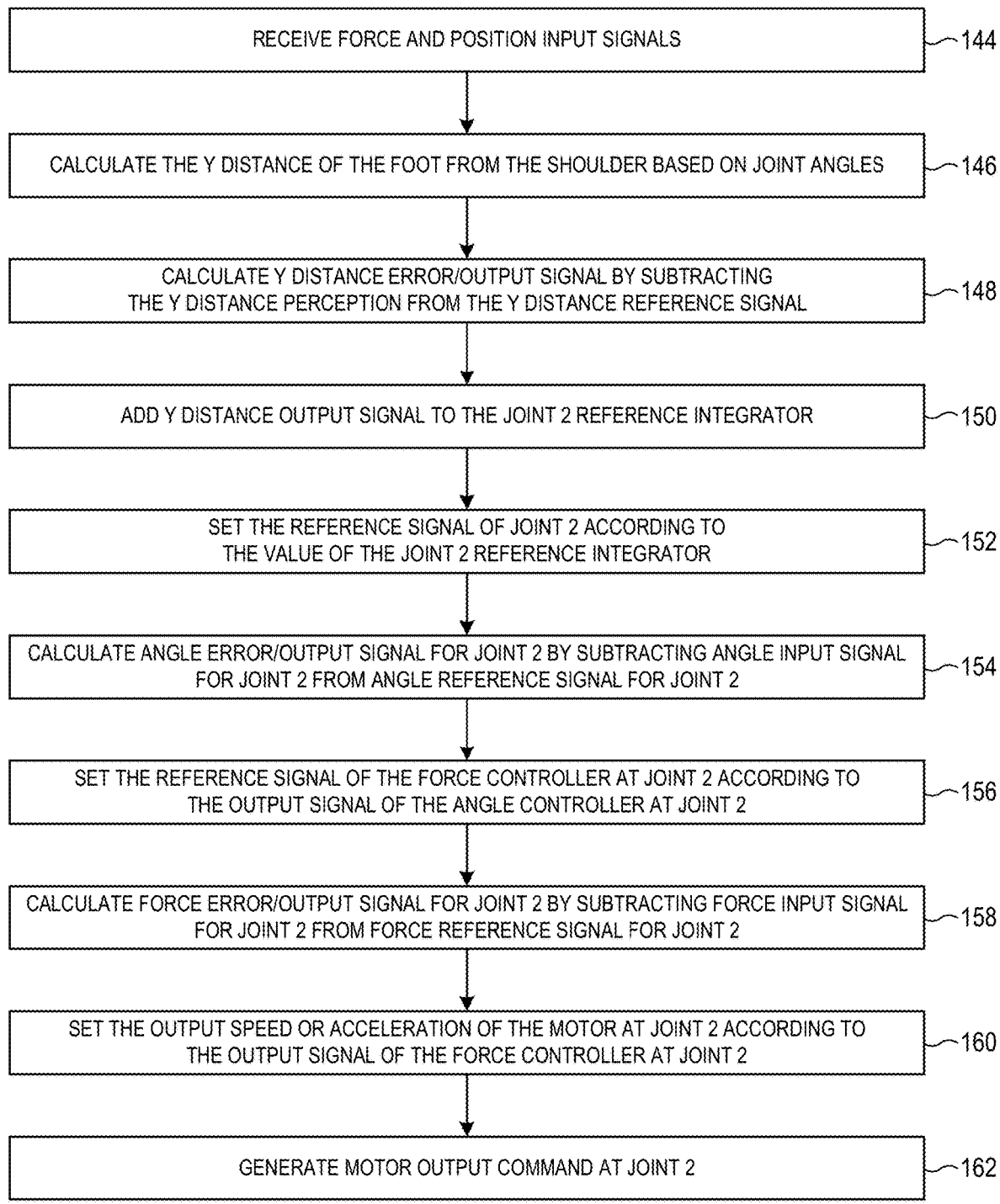
FIG. 7 shows pseudocode that controls the Cartesian Y offset between the foot and the shoulder of the robotic arm of FIG. 5, in an embodiment.

FIG. 7 shows pseudocode that controls the Cartesian Y offset between the foot and the shoulder of the robotic arm of FIG. 5

FIG. 8 shows a hierarchy for controlling a Cartesian X offset between the foot and the shoulder of the robotic arm of FIG. 5.

Figure 32:
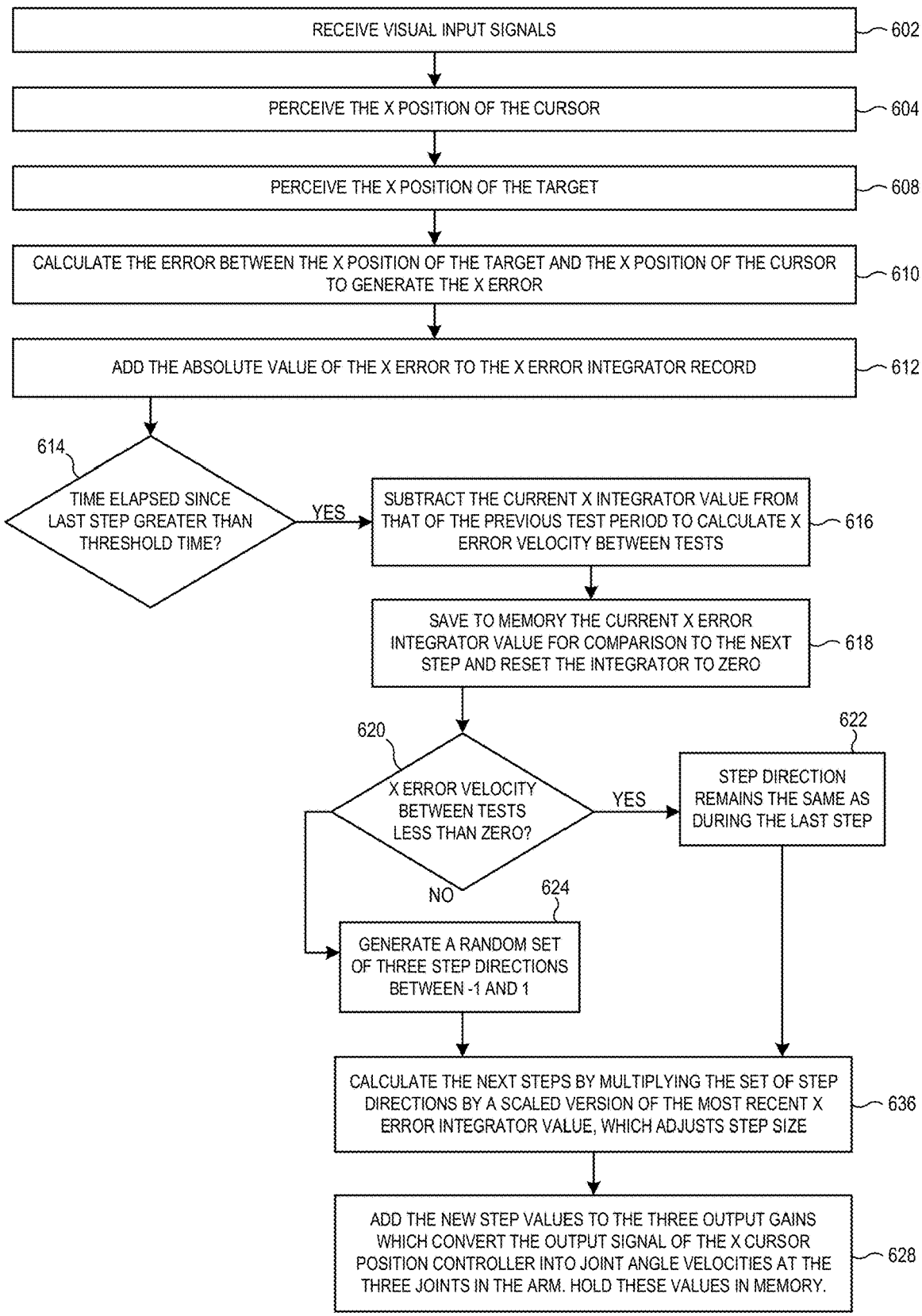
FIG. 32 shows pseudocode for generating the motor learning depicted in FIG. 31, in an embodiment.
Figure 33:
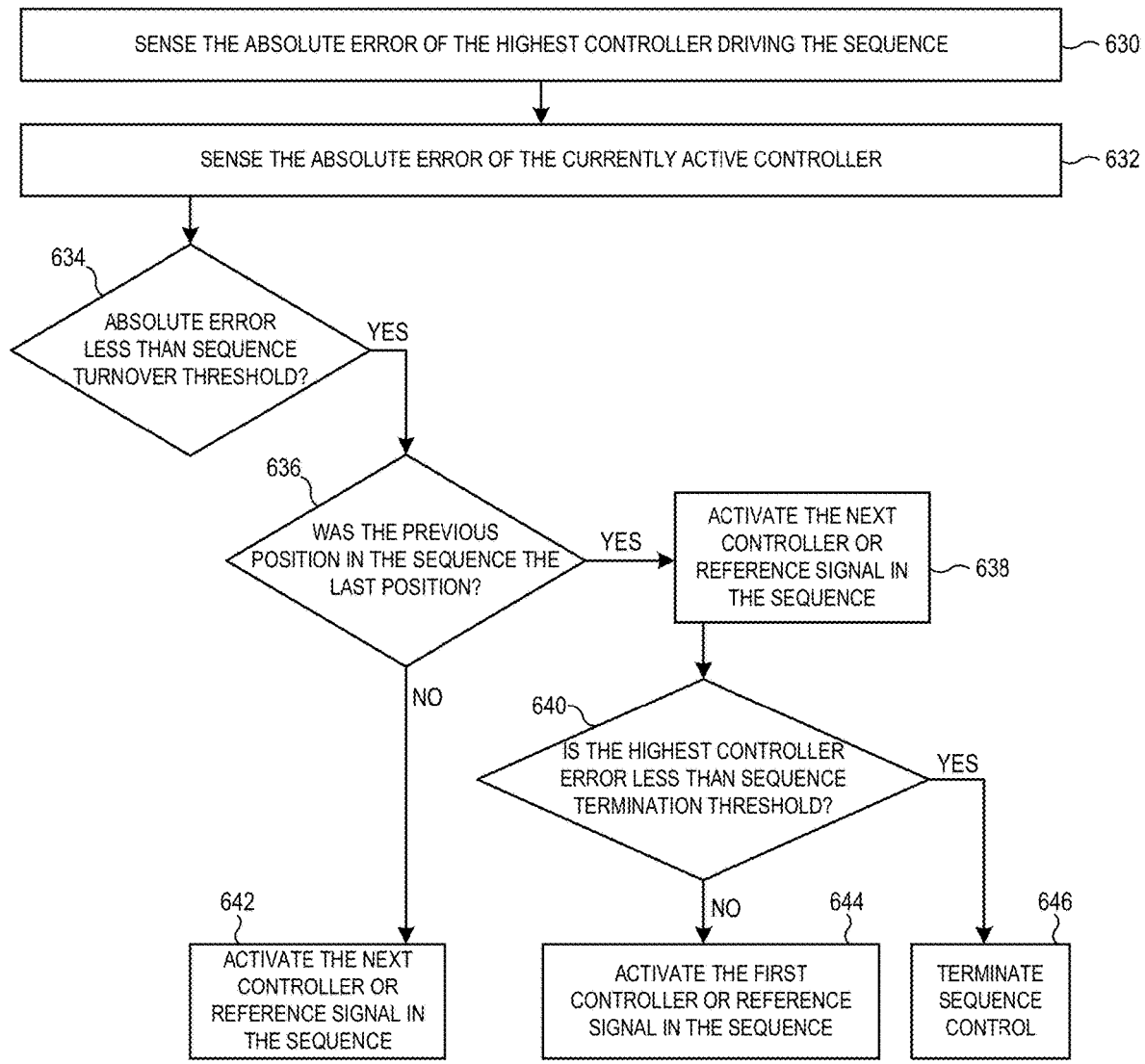
FIG. 33 shows pseudocode for generating sequence control, in an embodiment

FIG. 9 shows a hierarchy for controlling a Cartesian Z distance between the foot and the shoulder of the robotic arm of FIG. 5. Offset is controlled by adjusting reference signals of the joint angle controllers for first joint 132 and second joint 134 in opposite directions and with different relative gains. In order to extend or retract the arm along the Z axis, first joint 132 and second joint 134 must not only move in opposite directions but first joint 132 must move roughly twice the distance as second joint 134. The relative gains, or weightings, of outputs to first joint 132 and second joint 134 in this output function may be described as: first joint=+1, second joint=−0.5. Because Z and Y axis control share second joint 134 as an output function component, their outputs are simply added together at second joint 134 to achieve simultaneous control along both axes. A more sophisticated approach to controlling all three axes of movement is to adjust the gains continuously based on the sensed position of the limb, so that the instantaneous gains reflect the relative joint angle speeds required to move the foot from the current position along a particular axis with a constant speed according to a Cartesian to polar transformation. For example, the gain of the X and Y controllers would reduce according to the laws of trigonometry as the leg length is increased so that a given reference signal change would convert into a given foot movement of the same distance regardless of leg length. This trigonometric gain adjustment scheme is preferable because it gives improved stability and performance when compared to the simpler fixed output ratio scheme described above and in the pseudocode examples, 144-162, 164-186, and 214-238. The main benefit of the fixed output ratio approach shown in these pseudocode examples is its simplicity; as shown in FIGS. 32-33, it is possible for a robot to establish this type of motor coordination entirely through unsupervised learning.

Figure 10:
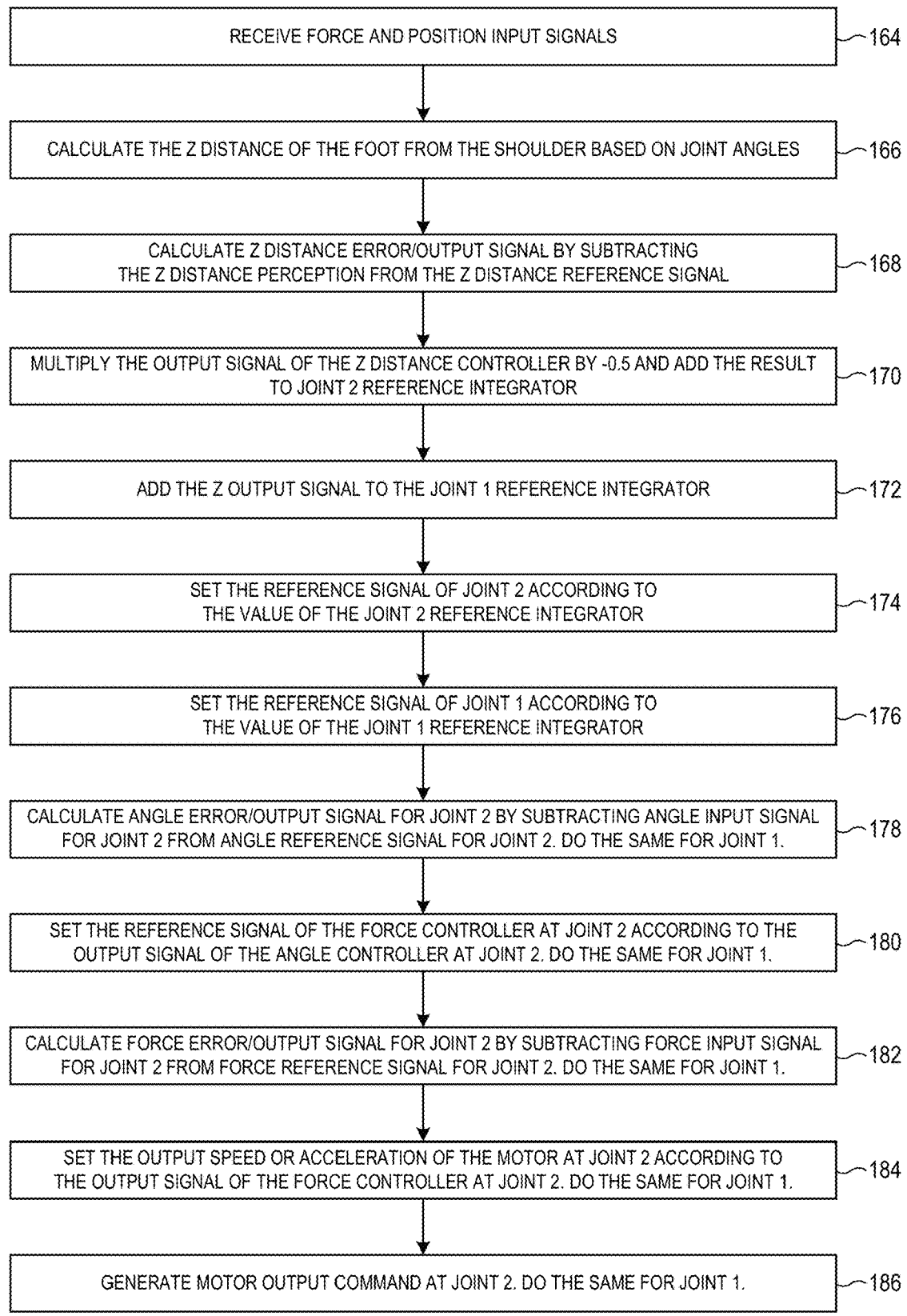
FIG. 10 shows pseudocode for controlling the Cartesian Z distance between the foot and the shoulder of the robotic arm of FIG. 5, in an embodiment.

FIG. 10 shows pseudocode for controlling the Cartesian Z distance between the foot and the shoulder of the robotic arm of FIG. 5.

Figure 11:
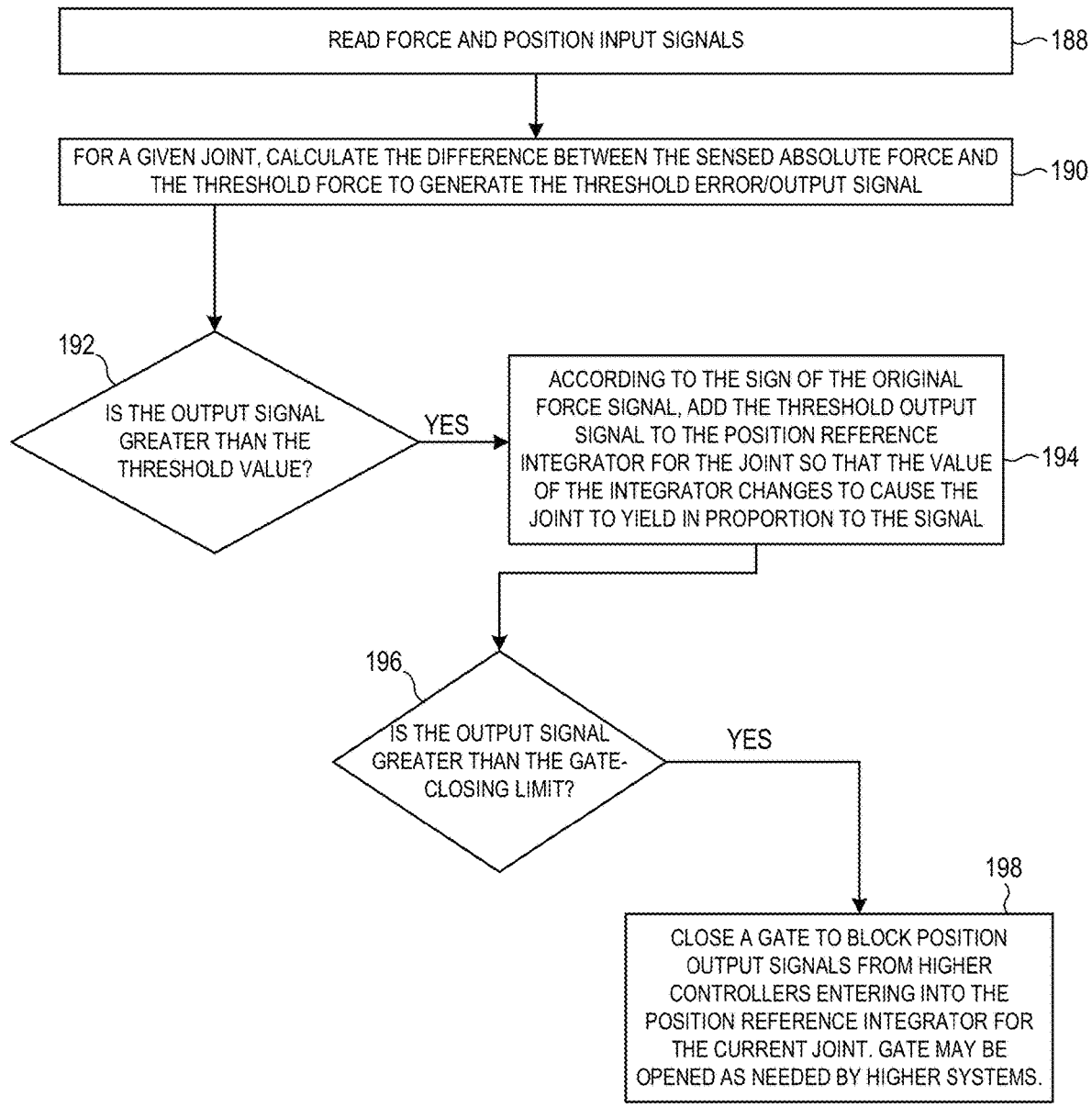
FIG. 11 shows pseudocode for generating joint yielding with waxy flexibility, in an embodiment.

FIG. 11 shows pseudocode for generating joint yielding with waxy flexibility. When perceived force at a joint exceeds its reference signal or floor/ceiling values, the joint yields so as to not experience forces much greater than that threshold. This is carried out entirely by the level 1 force controller. At the same time, the value of the joint position reference signal integrator of the corresponding joint is moved while the relevant force signal is past a threshold, thus overriding the effect of active higher position controllers which send outputs to the same integrator. The purpose of this influence on the position integrator is to prevent the limb from snapping back to its original position when the force disturbance is removed. The neurological term for this behavior is waxy flexibility. In embodiments, waxy flexibility is implemented by a waxy flexibility controller separate from the level 1 force controller. To prevent abrupt activation/deactivation of waxy flexibility, the waxy flexibility controller is gradually activated in proportion to distance in perceived force past the force threshold. If the threshold is crossed beyond certain safety limit, a gate is closed preventing higher-level controllers from influencing the joint reference signal at all until that gate is reopened by the appropriate higher-level controller. While this gate is closed, the joint yields to force more easily, and when the force is removed the joint stays roughly where it is because the position reference signal has changed. Following the reopening of this gate, the active higher position controllers can recover their desired reference position by continuing to add signals to the reference signal integrator. The primary purpose of the waxy flexibility controller is to protect and stabilize the robot, when absorbing a force disturbance, in a controlled manner without immediately springing back. For example, a heavy fall or impact will cause progressive yielding and then buckling in the joints experiencing the most concentrated forces due to level one force control. The resulting deformations to body shape are then held by the waxy flexibility controller. The positioning of the thresholds here is dynamically adjustable by higher-level controllers as needed under different conditions to promote safety, fluidity, stability, strength, etc. It is worth noting that there are other ways to implement waxy flexibility in the embodiments. For example, waxy flexibility may be accomplished by a level 4 controller that maintains forces below a threshold level through the adjustment of lower position reference signals.

Figure 12:
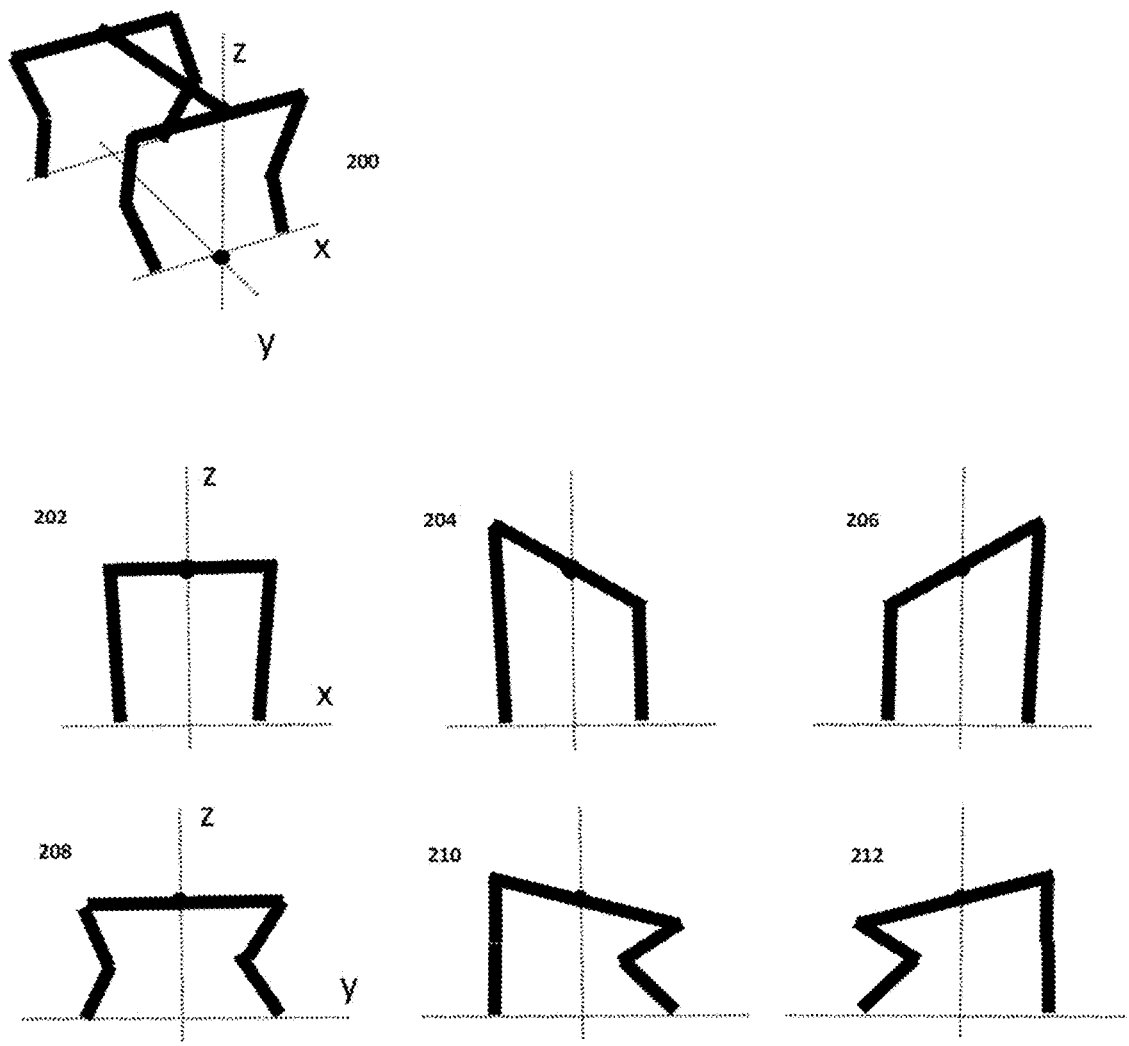
FIG. 12 shows a quadruped robot with three-jointed arms/legs demonstrating foot position control in the world reference frame, in an embodiment.

FIG. 12 shows a quadruped robot 200 with three-jointed arms/legs demonstrating foot position control in the world reference frame. For clarity, quadruped robot 200 is shown in FIG. 12 and other figures below as being suspended such that its feet do not touch a floor. A tilt of quadruped robot 200 may be sensed by an IMU located in a trunk of quadruped robot 200, allowing the Cartesian position of body parts to be sensed in the world relative to the center of rotation of the body and the vector of gravity. The diagrams 202-212 show 3D position control of the feet in this world reference frame, with reference positions being held constant while the robot is tipped. The control of foot position in the world reference frame is accomplished by subtracting the perceived position from the reference position along X, Y, and Z dimensions and converting the resulting errors first into the body reference frame and then into joint angle reference signals through the methods described previously. As discussed below, the control of foot position in the world reference frame is the basis for generating the correct behavior of legs when they are in the flight phase of the step cycle.

Figure 13:
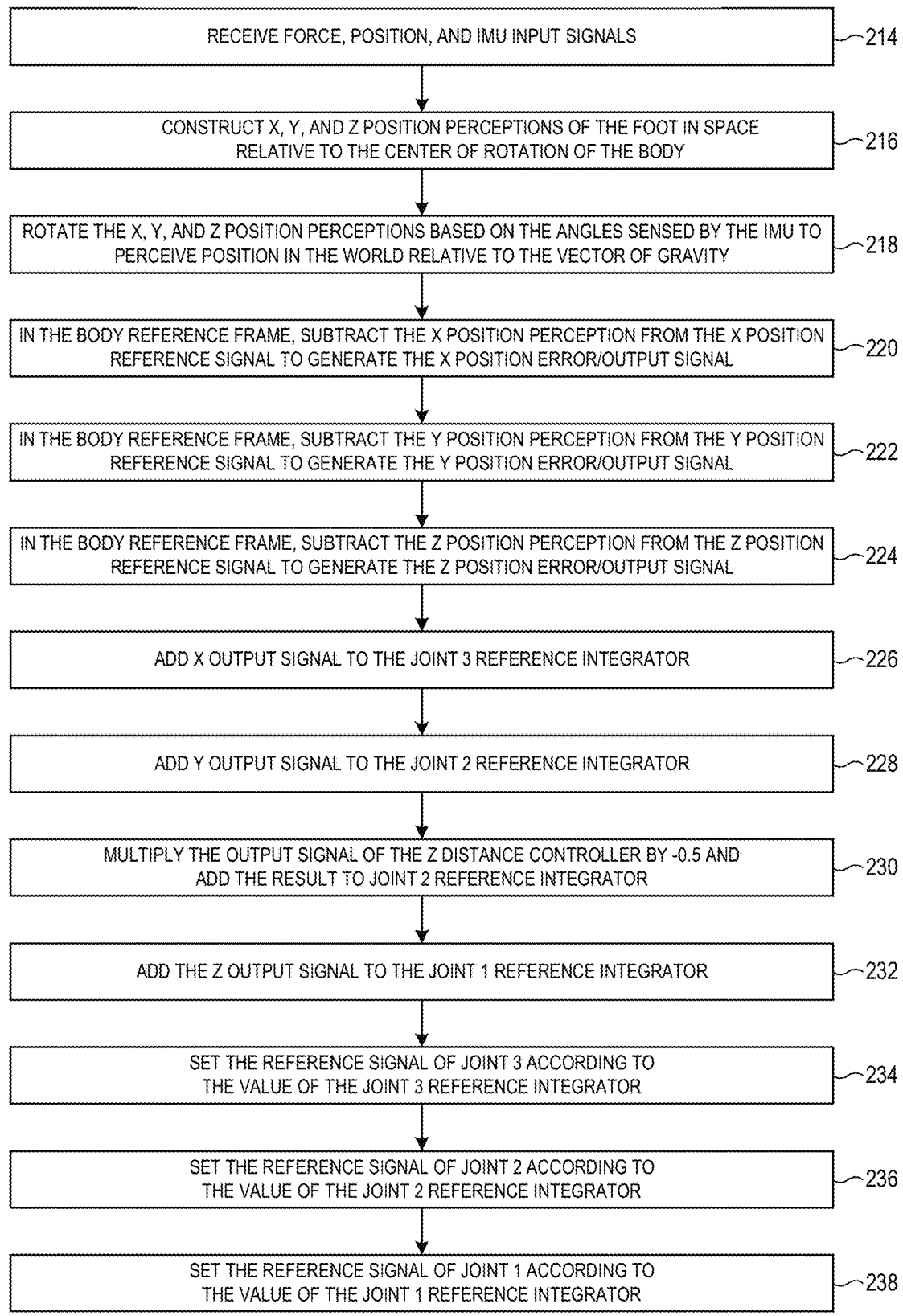
FIG. 13 shows pseudocode for generating foot position control of the quadruped robot of FIG. 12 in the world reference frame, in an embodiment.

FIG. 13 shows pseudocode for generating foot position control of quadruped robot 200 of FIG. 11 in the world reference frame. The pseudocode applies to one leg of quadruped robot 200. This is a three-level hierarchy.

Figure 14:
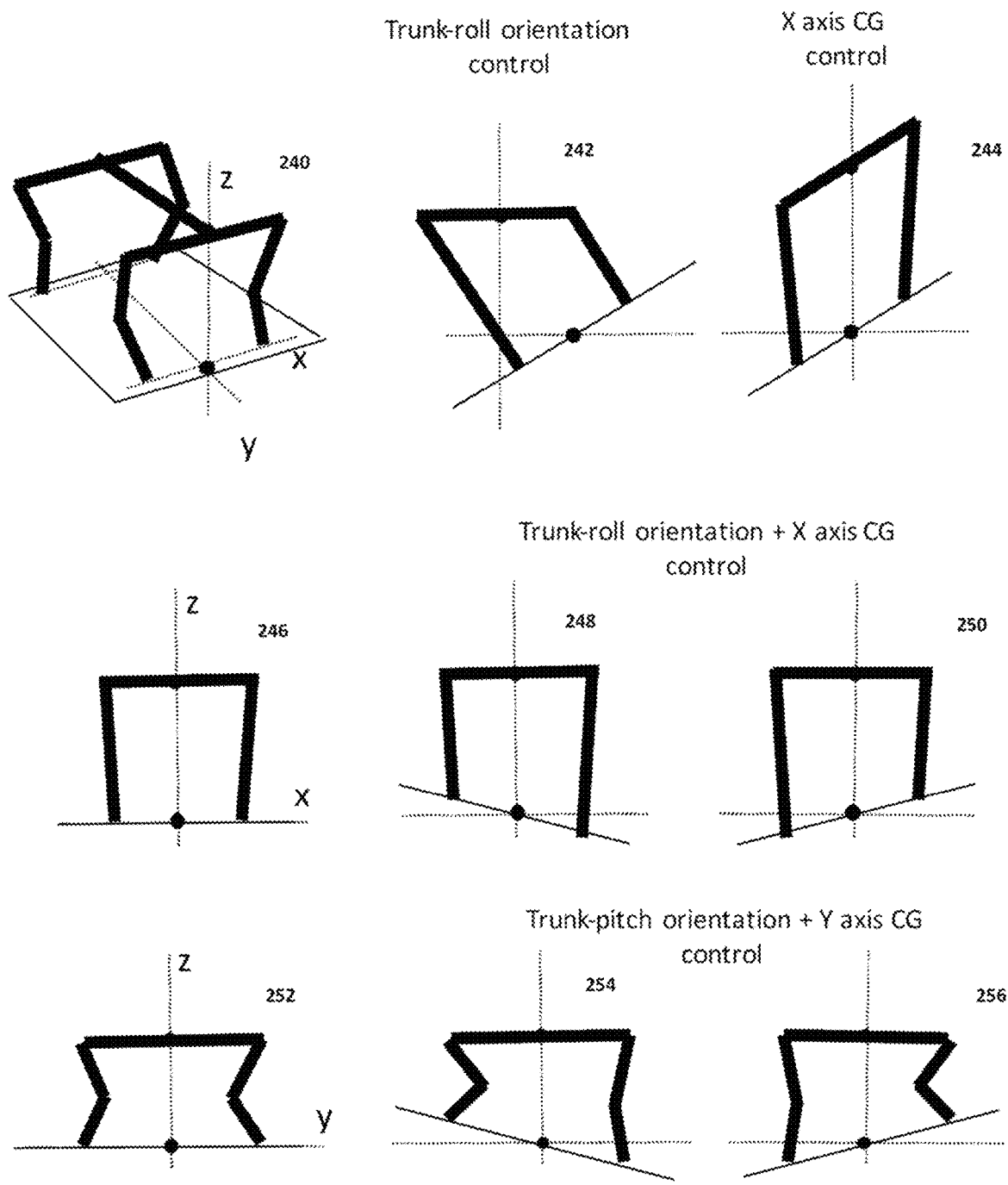
FIG. 14 shows the quadruped robot of FIG. 12 balancing on a tilted platform, in an embodiment.

FIG. 14 shows quadruped robot 200 of FIG. 12 balancing on a tilted platform. FIG. 14 illustrates two types of standing balance controller: a) trunk orientation control 242 and b) center-of-gravity (CG) position control 244. As shown, neither one of these controllers on its own is sufficient to maintain a balanced posture on a tilting platform. Trunk orientation control on its own 242 causes a shift in the CG away from the center of support when the platform is tilted. CG control on its own 244 has no effect on maintaining trunk orientation. In order to accomplish stable posture on a tilting platform, the outputs of these controllers must be continuously added together 246-256. In a robot with a rigid spinal column, there are two trunk orientation controllers, one for roll orientation and one for pitch orientation. Each orientation controller compares a reference orientation, which is typically set at a neutral value, with the perceived orientation and converts the error between the two into a body-centric movement of the feet that causes the trunk to rotate towards the reference position while keeping the feet stationary. This is essentially the opposite of the movement required to keep the feet stationary in space while the trunk rotates, as shown in 202-212. In a robot with a rigid spinal column, there is one Y axis CG controller for the body, and one X axis CG controller for each leg pair. These controllers control the positioning of the CG relative to the corresponding support position in the world reference frame, which is calculated as the midpoint between the feet along that axis. A neutral reference signal for these controllers reflects a posture in which the CG is positioned directly over the support position. The errors experienced by these controllers are converted into a body-centric movement of the feet along either X or Y axes, resulting in a sliding movement of the trunk parallel to the ground that brings the CG back to the reference position relative to the center of support along that axis.

Figure 15:
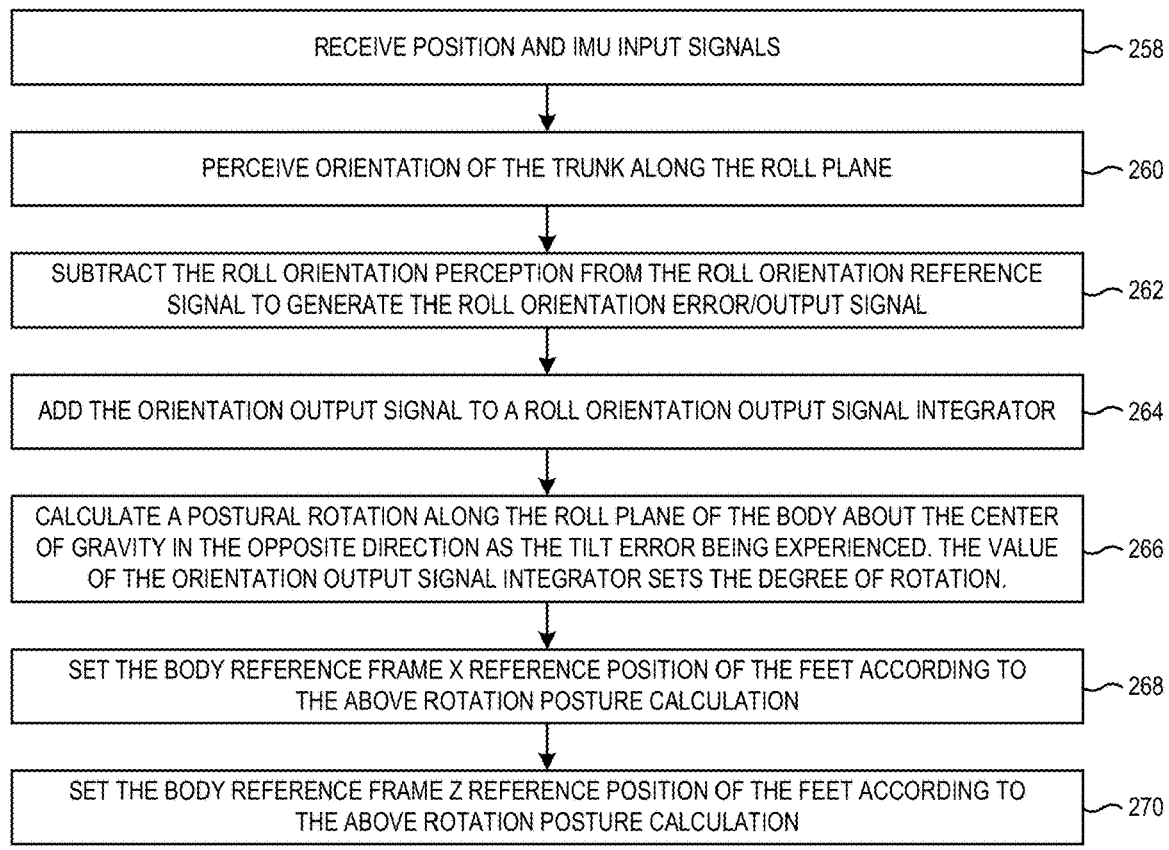
FIG. 15 shows pseudocode for generating trunk orientation control along the roll plane, in an embodiment.

FIG. 15 shows pseudocode for generating trunk orientation control along the roll plane. The pitch controller pseudocode is essentially interchangeable. In this embodiment, the controller sits at the top of a four-level hierarchy and sends reference signals to Cartesian foot position controllers at level 3. In an alternate embodiment, this controller sits at level 3 and accomplishes the same trunk roll movement by sending the appropriate reference signals to joint angle controllers at level 2.

Figure 16:
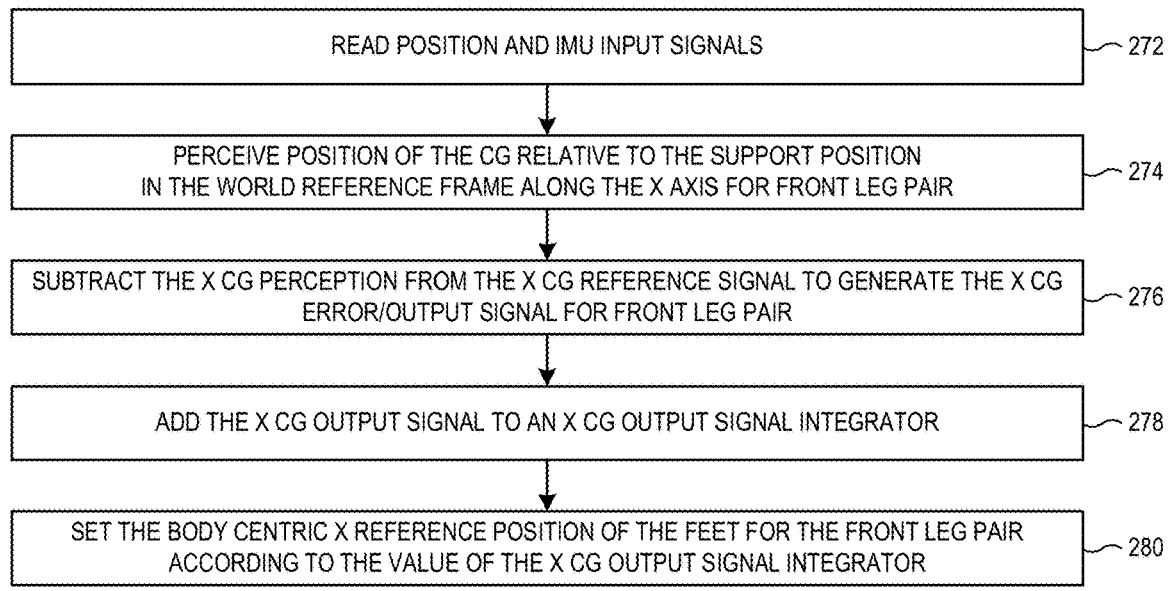
FIG. 16 shows pseudocode for generating center of gravity control along one axis, in an embodiment.

FIG. 16 shows pseudocode for generating center-of-gravity (CG) control along one axis. The Y axis CG controller pseudocode is essentially interchangeable. As described with respect to FIG. 15, this controller is currently depicted as a level 4 controller. An alternate embodiment for this controller is as level 3 controller which accomplishes the same "sliding" movements by sending reference signals directly to joint angle controllers at level 2.

Figure 17:
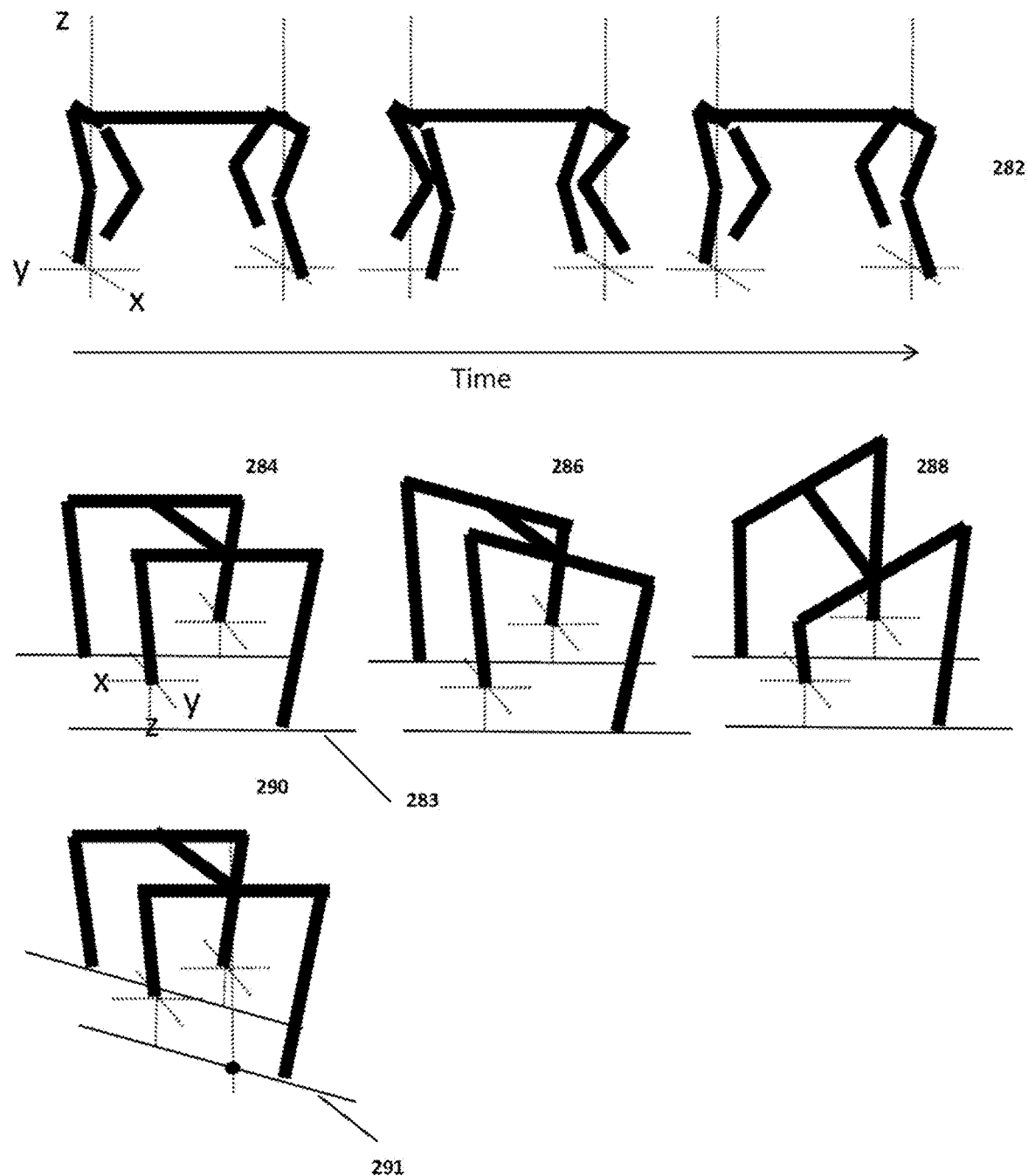
FIG. 17 shows the quadruped robot of FIG. 12 stepping, illustrating the influence of different controllers on the flight versus stance legs, in an embodiment.

FIG. 17 shows quadruped robot 200 of FIG. 12 stepping, illustrating the influence of different controllers on the flight versus stance legs. The stepping sequence 282 may be activated in response to a sufficiently large disturbance to the CG controllers, in order to allow for the activation of balance and locomotor controllers that only work during stepping, such as those shown in FIG. 18-21. Stepping on its own can have an intrinsic stabilizing effect in that it allows the flight legs to remain underneath the body. In the embodiment shown here, quadruped robot 200 has a rigid spine connecting the front and back leg pairs. To generate stepping, each leg transitions between flight and stance modes in a repeating sequence as shown, with antiphase relationships across the body in both directions, although a wide variety of dynamically stable step cycles is also possible. Transitioning between flight and stance modes is determined by a combination of descending reference signals and foot force input. For a given leg of quadruped robot 200, an oscillator issues a reference signal to cause the leg to lift. As soon as the foot is off the ground, as perceived by force sensors in the foot, a) the flight systems are activated with the appropriate reference signals, while b) the stance systems are deactivated. The ground proximity controller reference signal causes the foot to lift and then return to the ground. As soon as the foot touches back down, as perceived by force sensors in the foot, a) the flight systems are deactivated while b) the stance systems are activated. The frequency and amplitude of the repeating step cycle may be adjusted by higher-level controllers.

When a leg transitions from flight mode to stance mode or vice versa, one set of controllers connecting to the leg controllers is simply turned off while the other set is turned on. Because these controllers ultimately connect to a shared set of reference signal integrators controlling joint angles, the joints are able to hold their positions at the point of transition without any jumps as described previously. This same stability benefit of reference signal integration applies when we move up the hierarchy and deal with transitions between higher level controlled variables and their corresponding control architectures.

FIG. 17 (middle row)—When in flight mode, the behavior of the leg is determined by the X, Y, Z world reference frame foot position controllers introduced in FIG. 12. A ground proximity controller is also activated during flight mode which continuously senses the proximity of the foot to the ground directly below the foot along the Z axis in the world reference frame. The ground proximity controller continuously adjusts the reference position of the Z controller to defend its own reference proximity. Ground may be perceived in a number of ways, including through terrain-scanning sensors such as vision, or a simple memory of the Z leg position at the last point of touchdown. With this arrangement, each foot that is in flight mode controls X, Y, Z position in the world reference frame so that even if the trunk is tipped those feet remain fixed in space relative to the center of rotation and the vector of gravity. Even if the trunk drops, as shown in 288, the flight feet remain fixed in space.

FIG. 17 (bottom row)—When in stance mode, the behavior of a leg is determined by the trunk orientation and CG controllers introduced in FIG. 14. This arrangement allows the robot to use its down legs to defend trunk orientation and CG positioning, an important feature in allowing the robot to maintain its balance while stepping on angled terrain or in response to an external disturbance. The diagram here shows the effect of both stance and flight systems during stepping on an angled surface. The tilted platform highlights the behavior of the stance controllers, which defend trunk orientation and CG position. Also highlighted is the role of the ground proximity controller in maintaining a reference height despite the tilted surface.

FIG. 18 shows symmetry control behavior, and corresponding pseudocode, in the flight legs of quadruped robot 200 of FIG. 12. During stepping, the flight position controllers are adjusted so that the reference positions in the world reference frame along X and Y axes of the up leg mirror the corresponding positions of the down leg of the same leg pair in the same reference frame. The controlled variable of each of these controllers is body symmetry, as can be seen in the posture diagrams, 304-310. The symmetry controller promotes balance by maintaining a symmetrical base of support which widens as needed, and also by effectively allowing each leg pair to function as wheel with two axes of rotation; as the down leg moves along the ground, the up leg moves in the opposite direction through the air so that when it touches down and enters the stance phase it has sufficient runway to make the opposite movement along the ground. For example, if a stepping robot receives a hard push along the X axis, the force at the shoulders of the down legs may be great enough to cause those legs to yield and the robot to slide its trunk along the X axis in the direction of the push while the feet remain planted. While this occurs, the up legs will position themselves in the opposite direction so that, upon touchdown, they can catch the robot with a wide base of support and allow it to continue the sliding trajectory until the force has been dissipated. This process may be stabilized by the waxy flexibility controller. In this example, if the force of the push is not great enough to cause much yielding, then the robot simply defends balance by leaning into the push and keeping the center of gravity above the center of support as shown in FIG. 14. Pseudocode steps 292-302 illustrate this process for the X axis of one leg pair only. These steps are essentially the same for control about the Y axis. With some slight modification, symmetry control can also be used for balance to control the symmetry in geometry or in masses of the various moving body parts of a robot above a center of support.

Figure 19:
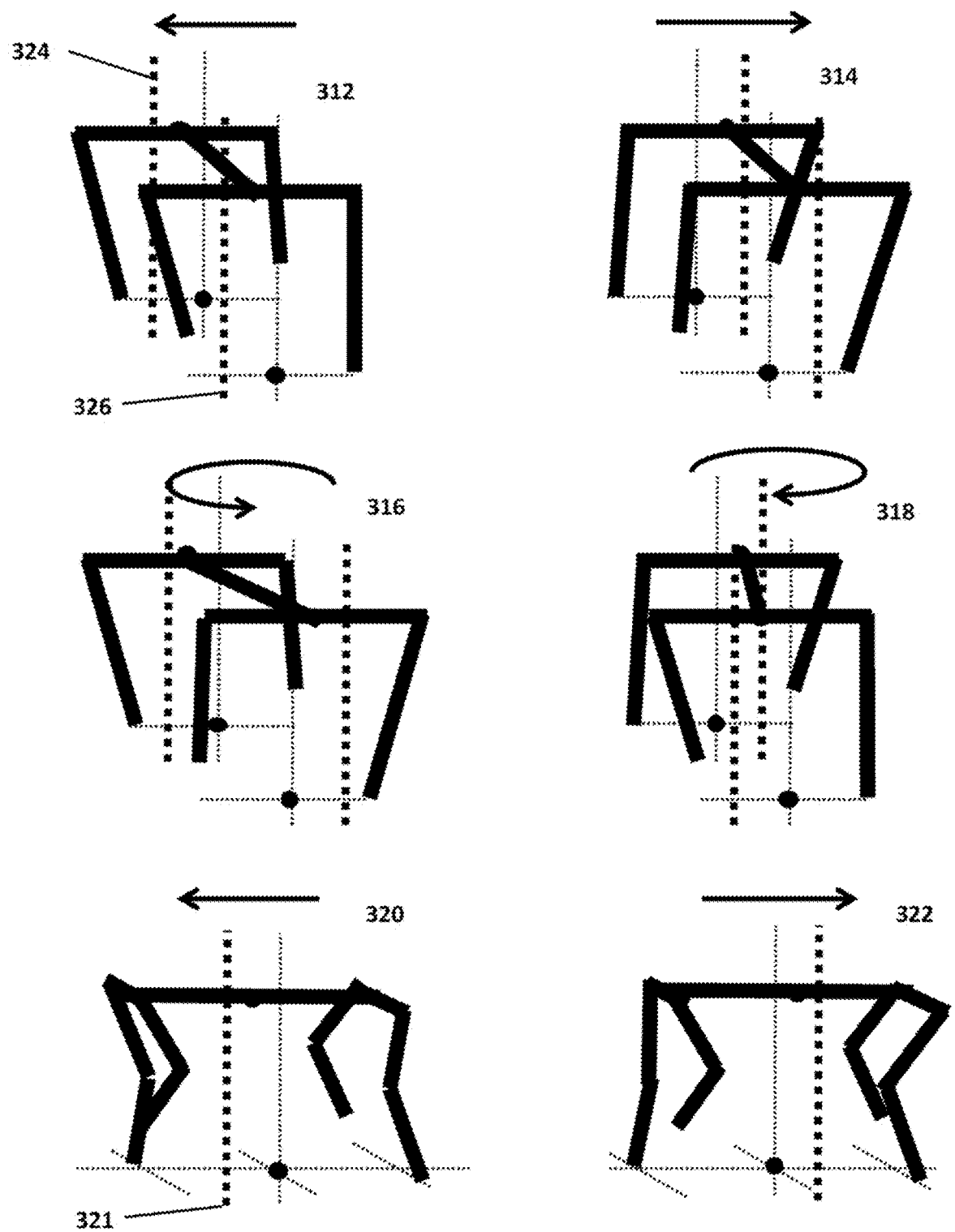
FIG. 19 shows how adjustments to the reference signals of balance controllers generate different locomotor behaviors in the quadruped robot of FIG. 12, in embodiments.

FIG. 19 shows how adjustments to the reference signals of balance controllers generate different locomotor behaviors in quadruped robot 200 of FIG. 12. Adjusting the reference signals of the CG controllers introduced in FIG. 14 away from neutral will cause quadruped robot 200 to slide its trunk in different directions. If this sliding movement occurs while quadruped robot 200 is stepping, then only the down legs will cause quadruped robot 200 to slide while the up legs will move in the opposite direction due to the symmetry controller, thus moving the perceived support position which is calculated as the midpoint between the feet. As the perceived support position therefore remains roughly below the CG, the CG-to-support position controllers are prevented from accomplishing their reference state and the sliding movement continues indefinitely as locomotion. The distance from neutral of this CG reference signal adjustment determines the speed of the CG sliding movement and thus locomotion. By adjusting different patterns of X and Y reference signals, quadruped robot 200 may be made to walk and turn in different directions as shown in the figures. The dotted lines in the figures above, 324, 326 and 321 represent the movement direction of the reference signals to accomplish different locomotor behaviors as indicated by the arrows.

Figure 20:
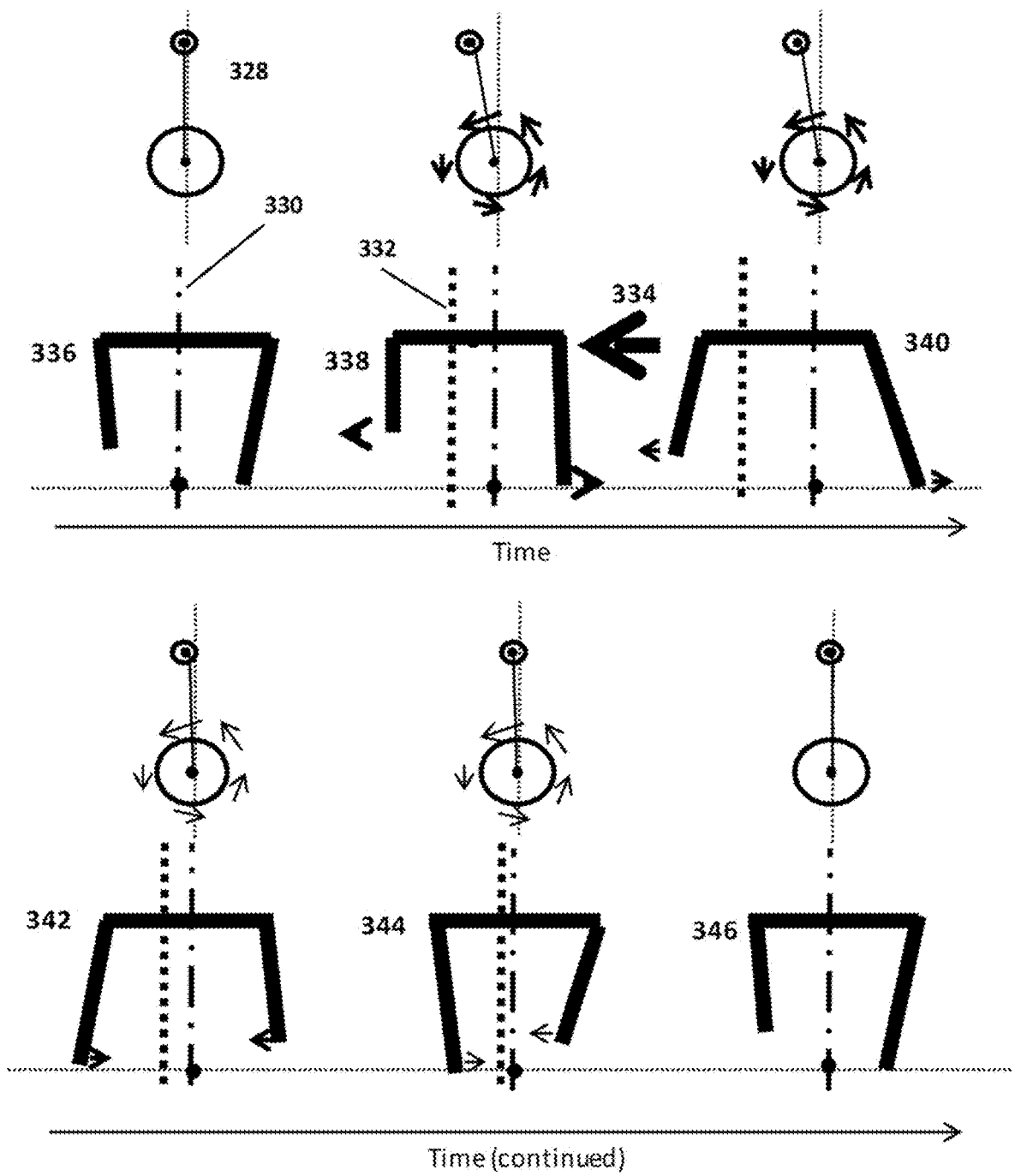
FIG. 20 shows inverted pendulum-like balance control through locomotion of the quadruped robot of FIG. 12, in an embodiment.

FIG. 20 shows inverted pendulum-like balance control through locomotion of quadruped robot 200 of FIG. 12. If quadruped robot 200 is pushed to generate a large CG error, the reference signals of the same CG controllers responsible for locomotor behavior 312-322 can be adjusted in the direction of the push. The figure diagrams show balance along the X axis only, but in practice the Y axis is also controlled in parallel. The resulting locomotion promotes that the CG remains above the center of support and helps to prevent toppling over. The behavior of this controller shares many similarities with the classic inverted pendulum balanced by a motorized wheel.

Because of the other effective balance controllers, errors at this CG controller are typically reduced by those other controllers before it can produce large outputs. For example, if quadruped robot 200 receives a small or even a moderate push disturbance, it may defend balance through simple CG control, or through a combination of stepping, yielding of the stance legs, and symmetry control in the flight legs as described in FIG. 18. However, if the disturbance is large enough that the other balance controllers cannot reduce the error, then the inverted pendulum system outputs become more clearly expressed. As with all controllers discussed here, this embodiment works in conjunction with the stabilizing and protective effects of force protective yielding and in some cases the waxy flexibility controller. To generate the necessary hip joint torques required to produce fast locomotor movements, the present embodiment may dynamically adjust the force yielding thresholds.

FIG. 21 shows a hierarchy and corresponding pseudocode for controlling location of a visual target along the horizontal axis relative to center of the visual field. The embodiment shown here lacks a motor-actuated head/neck or motor-actuated eyes, so the visual offset errors become reference signals to the CG to support controllers discussed above, 316-318, that cause the hips housing the camera to rotate towards the target 364. If performed while standing with all four feet planted, a fourth axis of hip rotation for each leg is helpful to facilitate this movement in robots with a rigid spinal column. With an actuated head/neck and eyes, target-location errors would cause signal to be added in parallel those position controllers to generate movements of those effectors to bring the target closer to the reference position in the visual field. If the robot is stepping, outputs from this controller cause the robot to rotate the orientation of its body through locomotion.

FIG. 22 shows a hierarchy and corresponding pseudocode for controlling location of a visual target along the vertical axis relative to center of visual field. The embodiment shown here lacks a motor actuated head/neck or eyes and thus visual offset errors become reference signals to the trunk pitch orientation controller, 254-256. The CG controller for the Y axis, which maintains a neutral reference signal, cancels any forward tipping movements generated here.

FIG. 23 shows hierarchies responsible for a) stance leg behavior and b) flight leg behavior of quadruped robot 200 of FIG. 12 during stepping. FIG. 23A is diagram showing one embodiment of a control architecture for controlling the behavior of legs of quadruped robot 200 that are in stance mode. Levels 1 and 2 are not shown for clarity. The dashed lines illustrate reference signal connections. When a given leg is in stance mode, joint angles for that leg are determined by the corresponding lower X, Y and Z controllers 408-430 shown in this hierarchy. For example, if the front left leg is down then its joint angle reference signals will be determined by descending signals from controllers 408, 416 and 424, which themselves receive reference signals from controllers 396, 402, 404 and 400, and so on.

FIG. 23B is a diagram showing one embodiment of the control architecture discussed so far for controlling the behavior of legs that are in flight mode. As in FIG. 23A, levels 1 and 2 are not shown for clarity. When a given leg is in flight mode, joint angles for that leg are determined by the corresponding lower X, Y, and Z controllers 440-462 shown in this hierarchy. In an alternate embodiment, all levels shown here (FIGS. 23A and 23B) are shifted down by one level as the X, Y, and Z controllers are replaced with the appropriate conversion of error directly to joint angle reference signals. For example, controller 432 would issue joint angle, rather than Cartesian, reference signals. By shifting controllers down by one level we may gain a performance advantage by increasing speed and certain types of simplicity in design.

Figure 24:
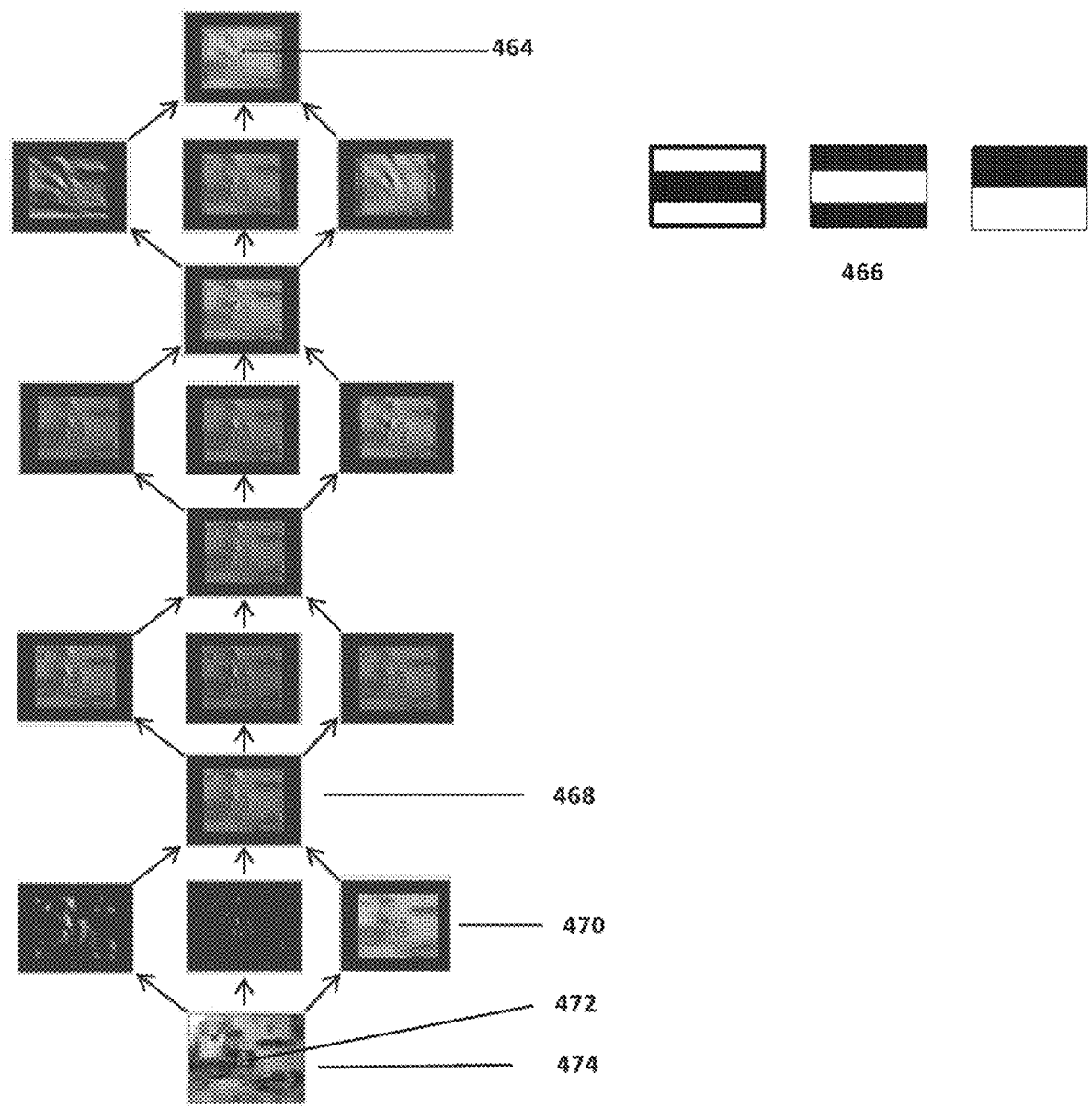
FIG. 24 shows a perceptual hierarchy that has trained to detect the set of visual features shown in the center of the visual field, in an embodiment.

FIG. 24 shows a perceptual hierarchy that has trained to detect the set of visual features shown in the center of the visual field. The hierarchy works bottom to top. The bottom-most image 474 represents the camera input, preprocessed with a progressively increasing blur with increasing eccentricity to simulate the fovea/periphery of actual eye input. Moving up the hierarchy, images display the individual or pooled output of detectors 468 utilizing standard matrix convolution techniques to highlight corresponding features in the image. The top-most image 464 represents the final output of the perceptual hierarchy, indicating the approximate X, Y coordinates of the target object as the area with the highest output intensity. The hierarchy shown here is a relatively small hierarchy with four levels and three detectors at each level. The three classes of convolution reference matrix used 466 are shown at top right of this figure. The hierarchy is tuned by varying the size and orientation of these reference matrixes for different detectors in the hierarchy. Besides representing an unusually small perceptual hierarchy, these techniques are similar to those commonly used in industry. What makes this embodiment unique is how it learns.

Figure 25:
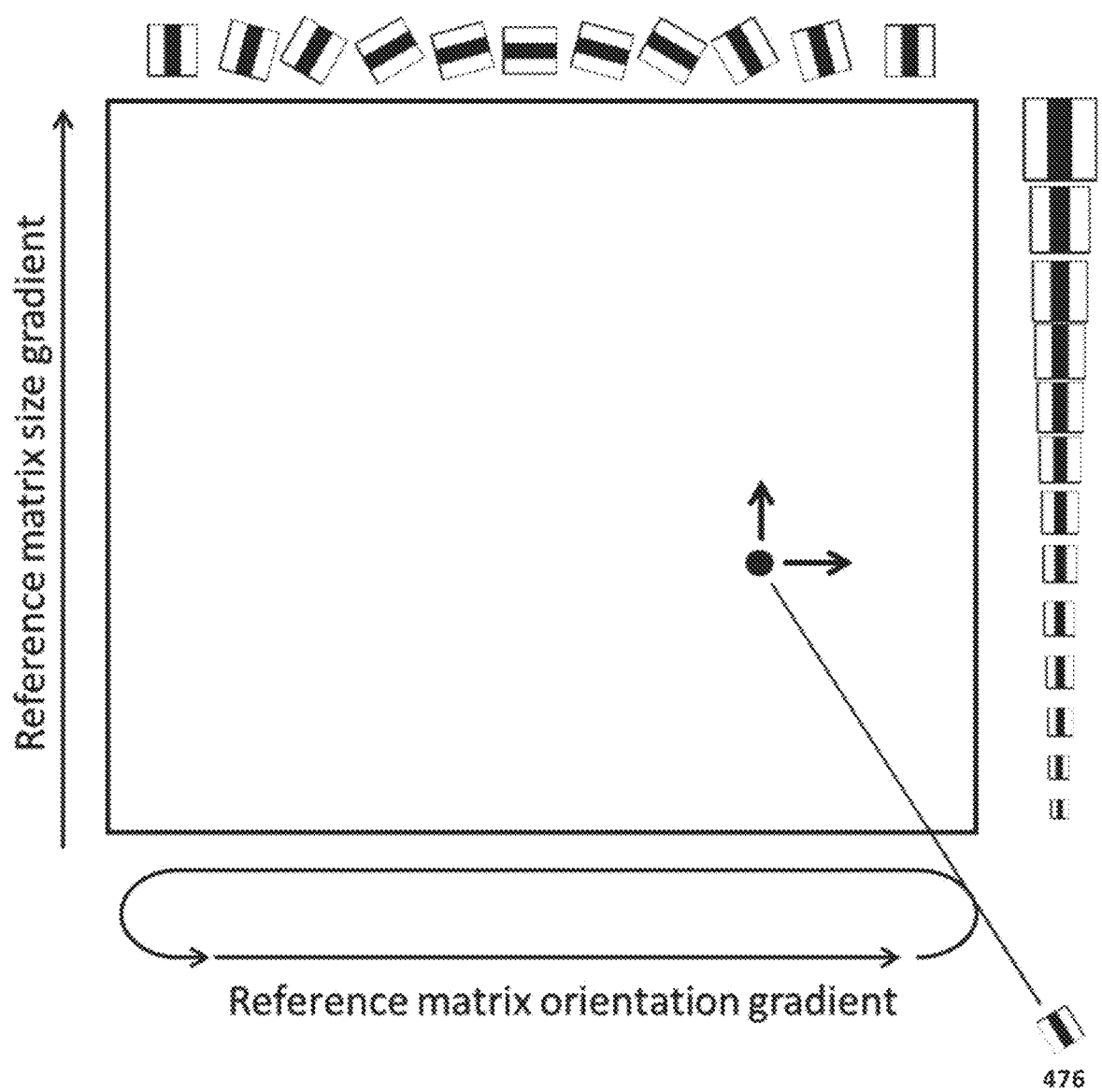
FIG. 25 shows a technique for rapid visual learning, in an embodiment.

FIG. 25 shows a technique for rapid visual learning. The X, Y coordinates of the black dot represent the position of the reference matrix 476 in size, orientation perceptual space. This space is organized with linear gradients along both dimensions. The 2D space is cylindrical because moving far enough along the dimension of orientation returns you to the start. Movement in this space is continuously controlled by a gradient descent algorithm seeking to minimize an error representing object perception in the target region of the visual field. Movement speed is proportionate to this error value so that the algorithm produces large movements through perceptual space when it is failing badly (e.g., no visual features are perceived in the target region) and small fine-tuning movements when it is performing well (e.g., visual features are clearly perceived in the target region). This gradient descent process can occur independently and in parallel for all detectors at all levels in the perceptual hierarchy. Alternately, gradient descent can occur sequentially from the top of the hierarchy to the bottom or vice versa. This process can also be orchestrated using standard backpropagation techniques, with the major difference being that the critical adjustments are movements in a predefined perceptual space, rather than adjustments in connection weights or biases as it typically done. Although the example shown here only includes the dimensions of orientation and size, it is possible to include color as a third dimension. It is also possible to assemble a visual hierarchy in which the perceptual dimensions detected by the gradient of convolution matrices can represent hierarchically higher perceptual features as we move up the hierarchy, such as the aspect ratio of various geometric shapes, or the perceived degree of "happiness" of a face. The same basic logic of assembling perceptual dimensions, by arranging detectors along linear gradients and then assembling these gradients into perceptual hierarchies, applies to all sensory modalities, such as auditory and somatosensory, etc. Assembling such perceptual gradients generates an internal perceptual space that may be rapidly navigated to accomplish higher goals in much the same way that physical Cartesian space can be navigated for the same purpose. As with the example of visual learning shown here, the goal of this navigation in perceptual space is typically perception of some target object in comparison to non-target objects. This process forms the basis of perceptual learning, discussed below. Once an object is learned, the set of reference positions for each dimension in perceptual space that define the object can be set directly with no need for discovery through navigation in perceptual space.

Figure 26:
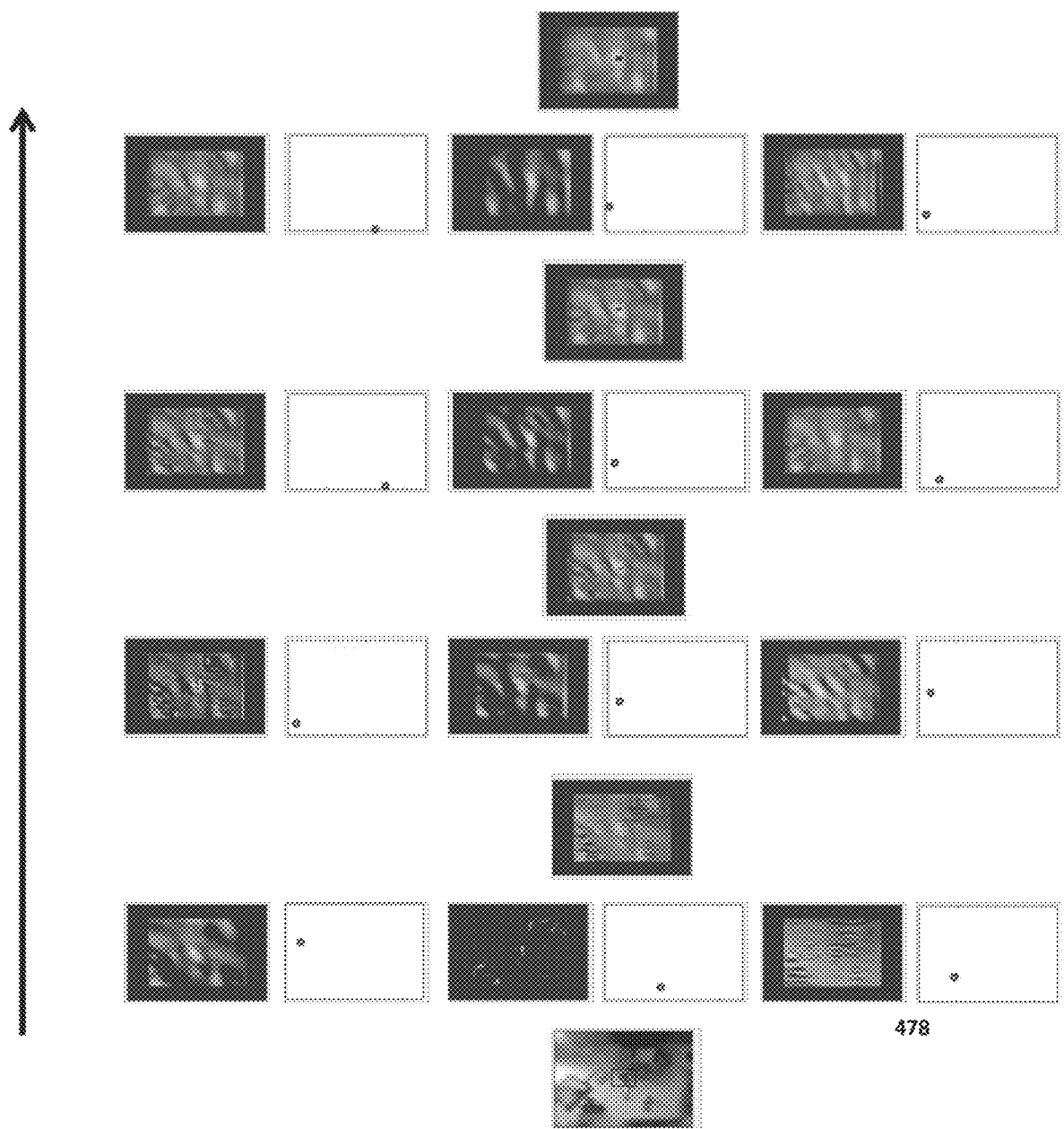
FIG. 26 shows a perceptual hierarchy with a corresponding reference matrix of each detector determined by position of the index point in size and orientation space, in an embodiment.

FIG. 26 shows a perceptual hierarchy with a corresponding reference matrix of each detector determined by position of the index point in size and orientation space. By allowing detectors to independently move through this space by gradient descent, the hierarchy shown here reorganized itself to detect the target object on a noisy background in approximately 3 seconds while running in real time with live camera input on a standard desktop computer. Movement through size/orientation space occurs at every step in the loop. Movement speed of all detectors is automatically slowed to a near stop as the object is acquired. Once the object is acquired, reorganization may be held offline by other systems for the purposes of object tracking. Once an object is acquired, the exact configuration of the hierarchy shown here may be represented as a 24-digit number representing the orientation/size indices for each of the 12 detectors. This 24-digit number may be saved to memory and retrieved as needed to detect a previously defined object in the environment. The process described here will work for hierarchies of different sizes. In larger hierarchies, it may be helpful to prevent redundancy in detectors at a particular level by incorporating detector overlap as a component of the gradient descent error. The perceptual gradients and hierarchies described here and with respect to FIG. 24 are thought to model the cortical and thalamic sensory processing regions, which are well known to contain gradients and hierarchies of detectors, often called receptive fields.

Figure 27:
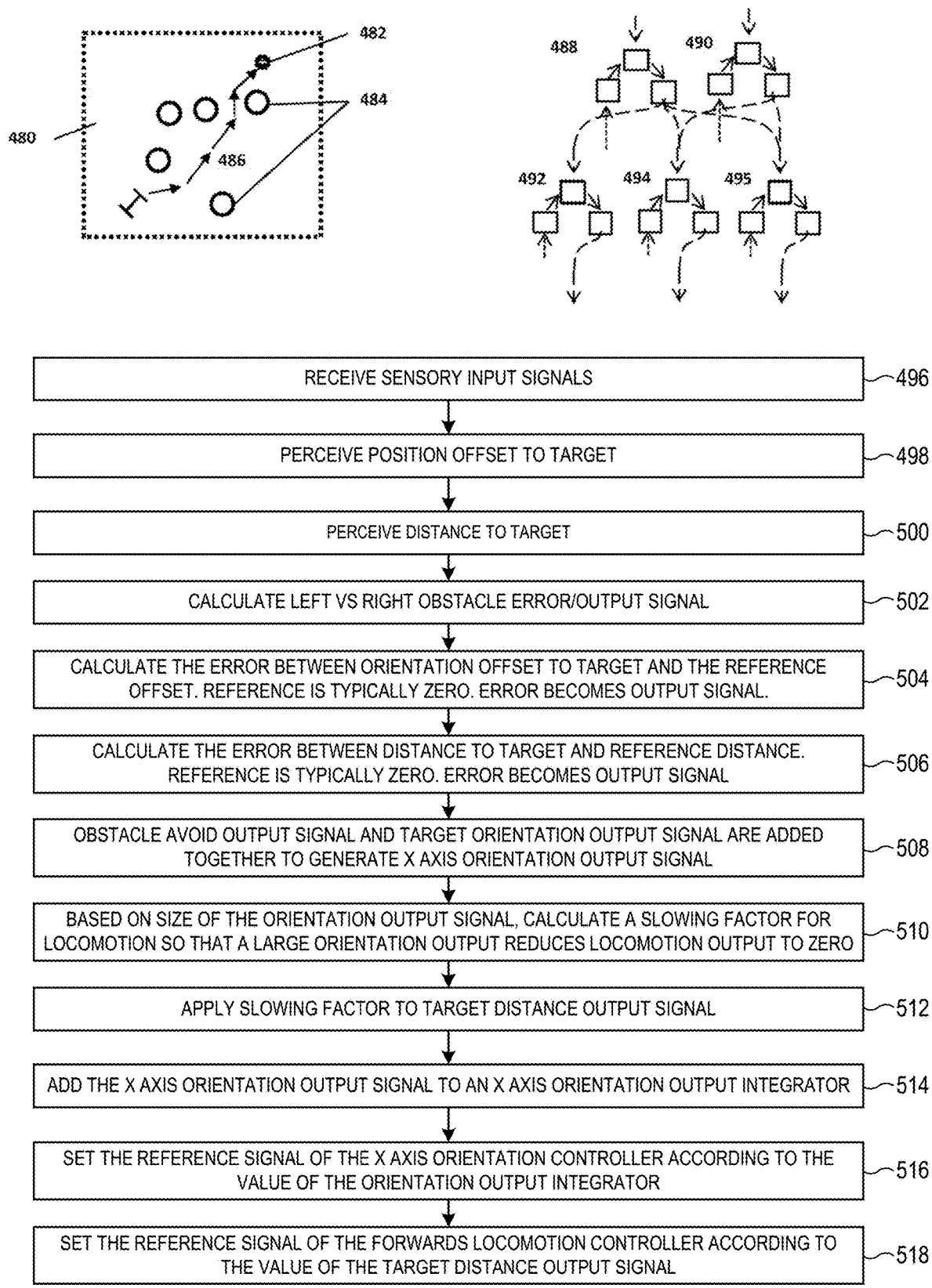
FIG. 27 shows a technique and corresponding pseudocode for target pursuit and simultaneous obstacle avoidance, in embodiments.

FIG. 27 shows a technique and corresponding pseudocode for target pursuit and simultaneous obstacle avoidance. The visual system is mounted on a head with an IMU and connected to the body by a neck with joint position sensors for perceiving position and orientation of the head in the world. The visual system includes a second camera for the purpose of depth perception. Using standard computer vision techniques, it is possible to calculate the 3D position of objects, including the robot itself, on a perceived world map. When introduced to a new environment, the robot will update the map 480 with the Cartesian coordinates and corresponding visual reference perceptions of major features 484 482 in the environment. The current position of the robot on the map is inferred from the positioning of visible landmarks. After a particular location or object has been added to the map, it is possible to calculate the Cartesian distance between the target location and any point on the robot body, such as the head. These distance perceptions can be controlled by comparing the current perception to a reference perception and converting the errors into output reference signals to the appropriate lower level controllers. In the example shown here, distance between the head and target object is controlled by adjusting reference signals to the CG controllers 492-495 while at the same time activating the stepping sequence and corresponding system transitions to generate locomotor behavior, as shown in 312-322. By setting the proximity reference of the target to zero, the robot will continuously orient towards and approach the target until it is at the target. In parallel, the obstacle avoidance controller will prevent the robot from colliding with or getting stuck behind various intervening obstacles even if they are actively moving. For stability, orientation outputs have a slowing effect on locomotion so that the larger the turning command the slower the forward locomotion command becomes.

Figure 28:
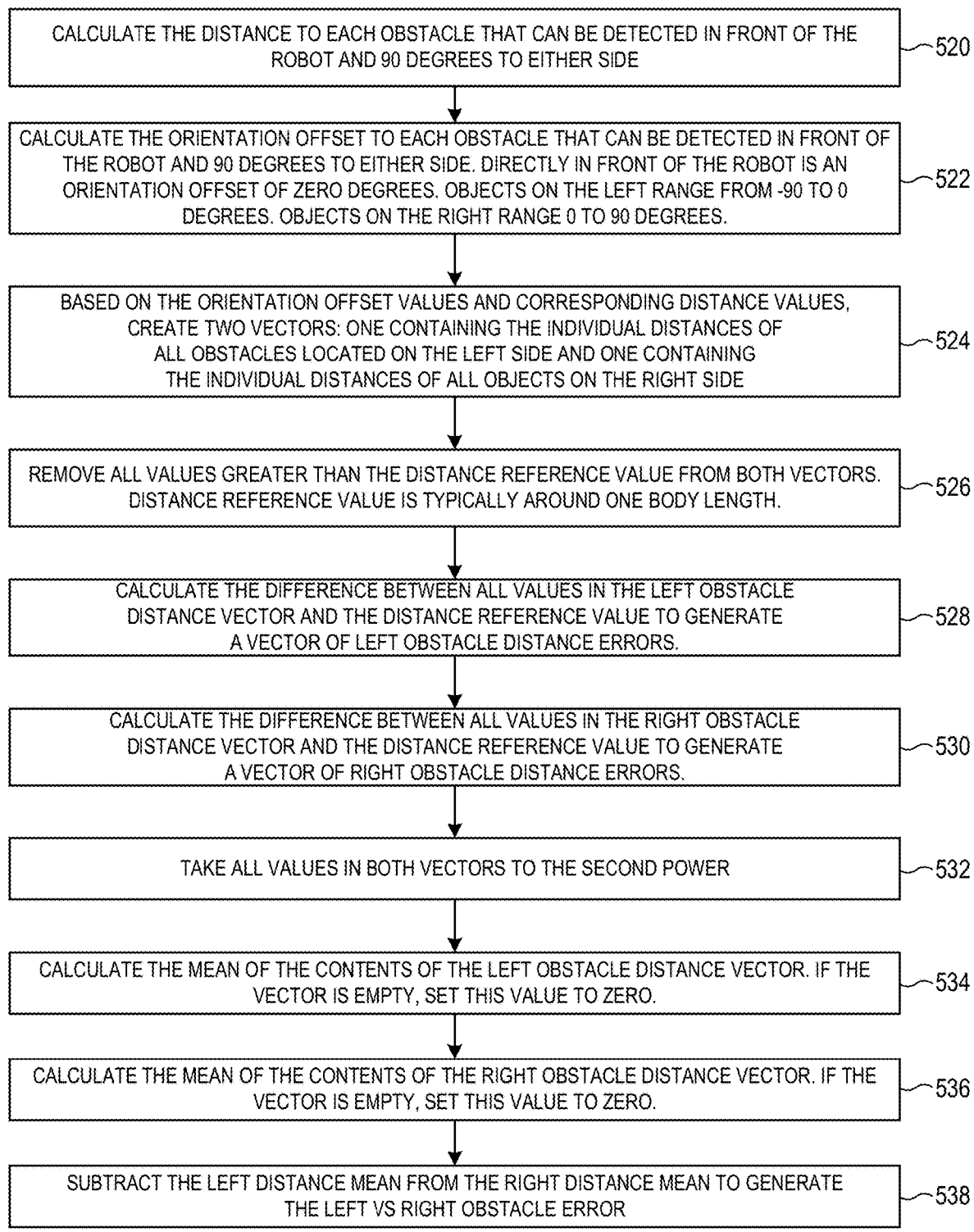
FIG. 28 shows pseudocode for generating the obstacle avoidance perception, in an embodiment.

FIG. 28 shows pseudocode for generating the obstacle avoidance perception. To prevent collisions with obstacles, an obstacle avoidance controller 490 (see FIG. 27) calculates the mean of all perceived obstacle proximities on the left and right sides of the robot and then subtracting those values to generate a single perceptual signal representing left versus right obstacle obstruction. The reference proximity for this system represents the desired distance-from-obstacles to be maintained by the robot as it navigates. By setting positive proximity errors to zero, obstacle avoidance controller 490 becomes a unidirectional controller that will only push the robot away from an obstacle if it moves too close but not bring it closer. Obstacle proximity errors are exponentially weighted so that avoidance behavior ramps up quickly as the robot moves close to an obstacle, overriding any conflicting signals from the target pursuit controller 488. Obstacle avoidance controller 490 sends its outputs to lower-level controllers for generating orientations 494, 495. These outputs are added together with the outputs from the target orientation controller to generate the final reference signal sent to CG controllers to cause rotation 316-318. Although the target and obstacle proximity controllers described here work best when controlling perceptions derived from a world map that is updated in real time, they can also control "line of sight" perceptions derived directly from visual perceptions only. The downside to relying on this type of direct visual perception only is in being unable to pursue the target when it is visually blocked.

Figure 29:
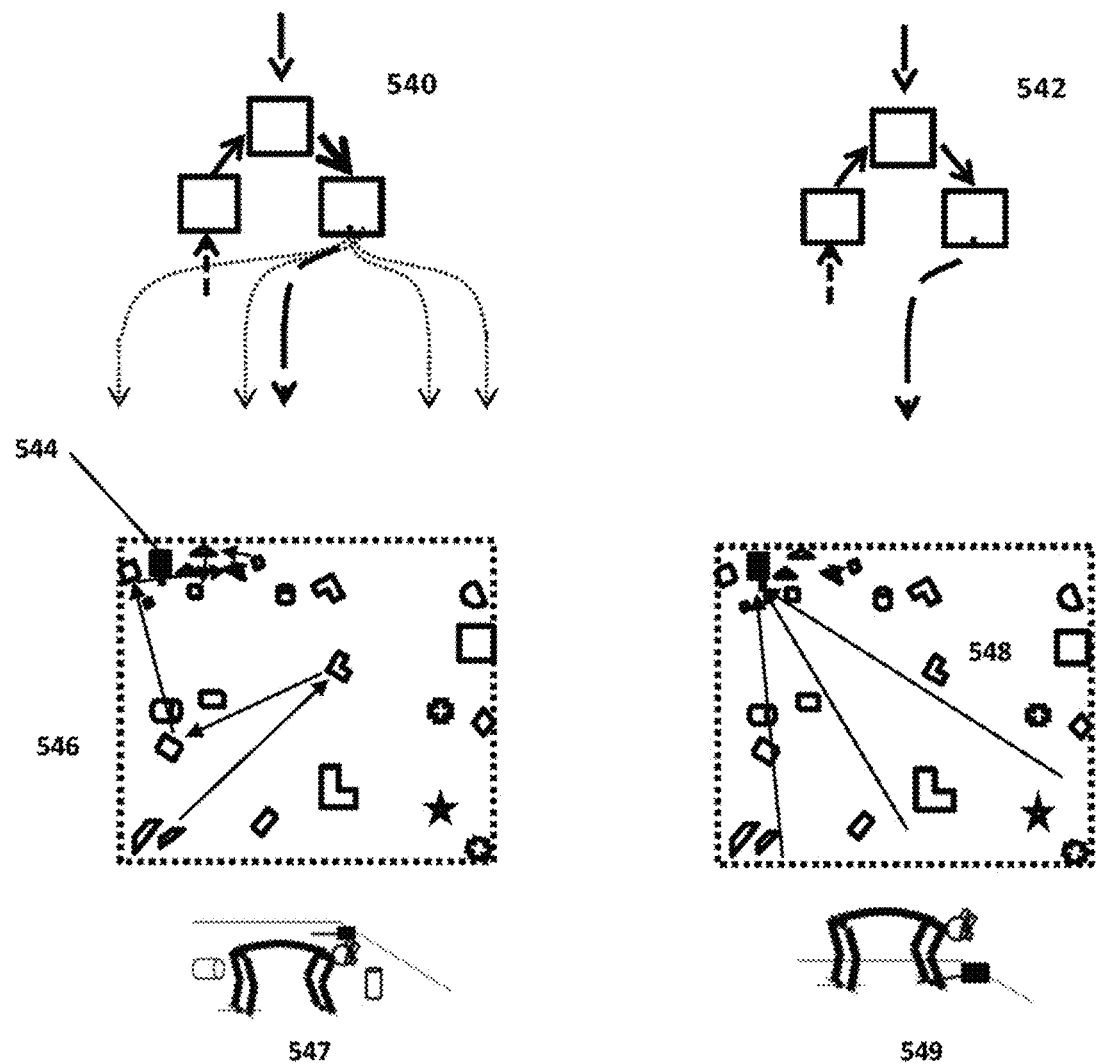
FIG. 29 depicts perceptual learning required to charge a battery, in an embodiment.

FIG. 29 depicts perceptual learning required to charge a battery. The control hierarchy begins with no knowledge that standing on the lever delivers electricity to charge its battery. For simplicity, the battery charge is assumed to be reduced in a series of instantaneous bursts. We simply begin with a "battery charge" controller which is experiencing error due to low perceived power, but which has not yet established an effective output function capable of reducing that error. Because of this persistent error, the controller will vary its output function by changing the perceptual targets of the target pursuit controller 488. In this example, changes occur by selecting a new spatial location a certain step distance from the previous location, and then acquiring (as described in FIGS. 25-26) and pursuing whatever perceptual features are perceived at that new location. These changes occur periodically in discrete steps, so that there is enough time following each step to observe whether the change had an effect on reducing controller error. If the error reduces following a particular change, then a) the size of the steps is subsequently reduced, thus slowing the search process and b) the direction of the last step change is subsequently repeated, thus moving the system in the same direction that caused the previous decrease in error. If the error does not reduce following a change, then a) the size of the steps is slowly increased, and b) a new and random direction is chosen for the next step change. As such, the search process described here can be thought of as a form of gradient descent in which the relevant gradient is the higher controller error itself, and in which the outputs generated to move along this gradient are changes in how that controller error is transformed into the reference signals of lower controllers.

In the current example, these changes take the form of changes in the spatial location of the perceptual target of approach, resulting in exploratory behavior as the robot approaches one perceptual target in the environment after another. The robot might first approach the blue/green object, then the brightly lit object located ten feet away, then the location with the wavy texture located eleven feet away from that, etc. In this case, the size of the step changes determines the rate of exploration; small changes result in fine local exploration while large changes result in widely distributed exploration. Over time, with enough random exploration, the robot in our present example will eventually move across the lever and cause it to press, resulting in a decrease in the error of the battery charge controller driving the reorganization. This decrease in error will cause a) subsequent repetition of the last step direction, and b) a large drop in the size of the exploration steps as illustrated by the trajectory 546. The following step changes will therefore result in exploration of nearby space to whatever perceptual goals caused the last error reduction. Over time, as the target reference signals come to rest on the perceptual features of the lever (or of some very nearby or overlapping perceptual feature), then the system will succeed in producing frequent lever pressing/standing and the speed of exploration will be reduced faster than it can increase. The configuration of the output function of the "battery charge" controller will therefore become stable and a new controller is thereby established 548, although the learning process described here will continue to make fine-tuning adjustments whenever the controller is active. When the robot is subsequently experiencing a "low electricity" error, it will pursue the previously learned perceptual target to reduce that error, even if that target is actively moving.

Figure 30:
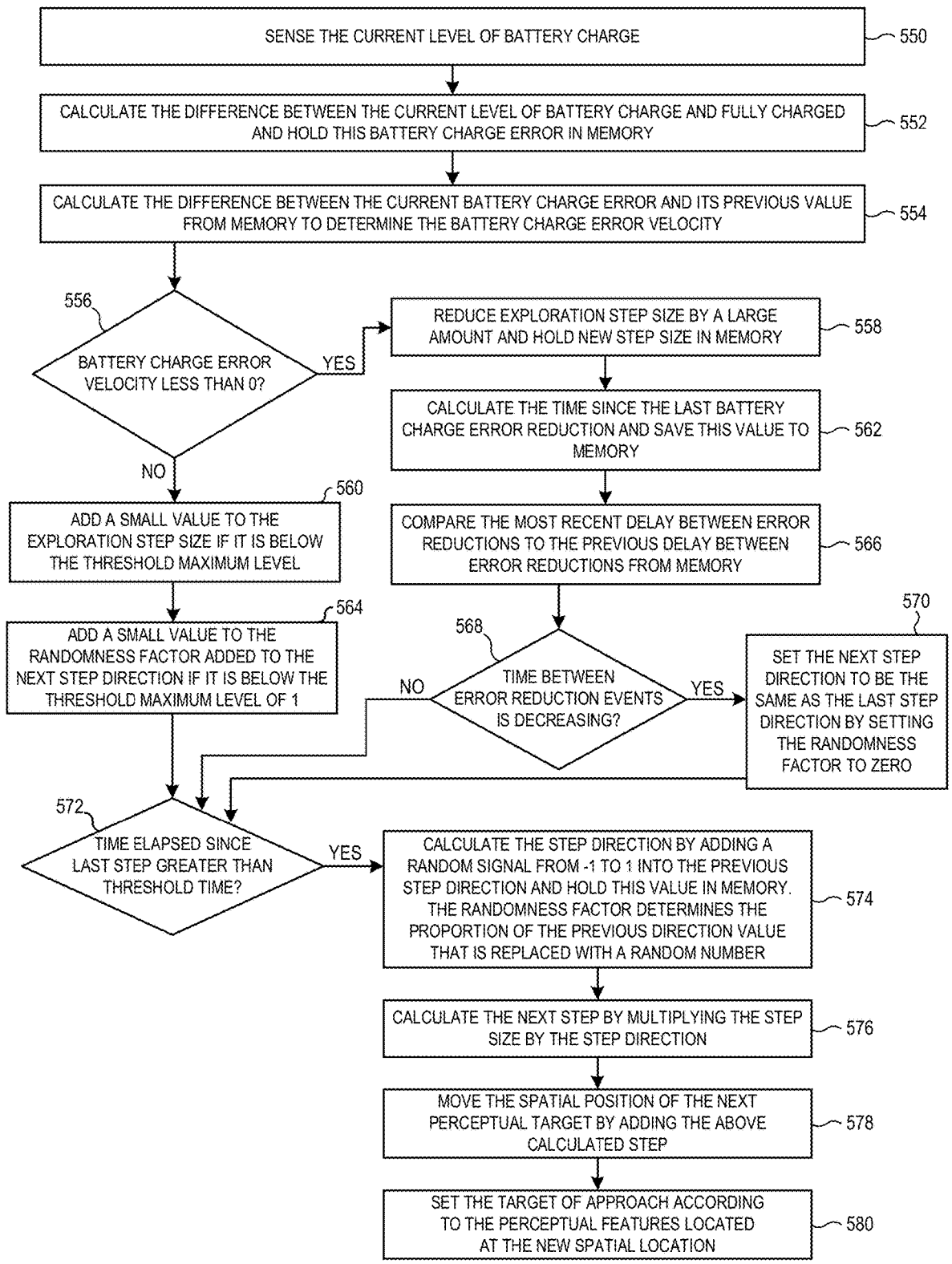
FIG. 30 shows pseudocode for generating the perceptual learning depicted in FIG. 29, in an embodiment.

FIG. 30 shows pseudocode for generating the perceptual learning depicted in FIG. 29.

Figure 31:
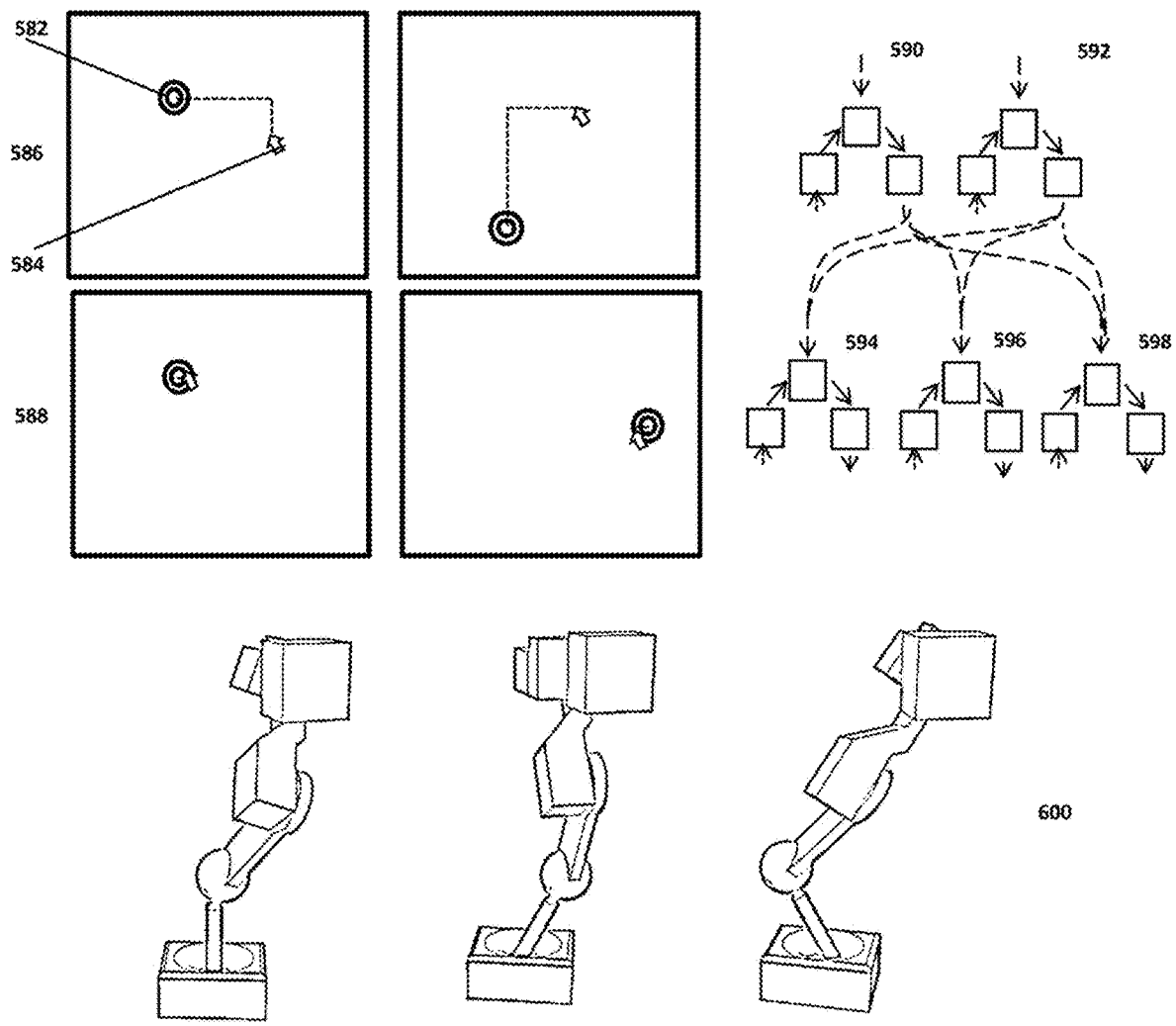
FIG. 31 depicts motor learning required to move an on screen cursor, in an embodiment.

FIG. 31 depicts motor learning required to move an on-screen cursor. In the previous example of learning, the robot establishes a new controller by discovering the correct perceptual goal to approach, which is an example of perceptual learning. In many cases, however, the robot already knows the definition of the perceptual goal and must instead learn the motor output coordination required to accomplish that goal. Whereas in perceptual learning we explore and adjust the static set of reference signals that define a particular perceptual goal, in motor learning we adjust the process by which a higher output is continuously converted into a set of lower reference signals. For example, if a naive robot must learn to position a computer cursor 584 relative to a moving on-screen target 582 with its arm using an attached joystick 600, then it must discover a conversion through which the X and Y cursor-to-target position errors become relative motor velocities to the arm joints at level 2. A new controller will be established when a conversion is discovered that is capable of continuously reducing the cursor position errors close to zero 588.

FIG. 32 shows pseudocode for generating the motor learning depicted in FIG. 31. For clarity, FIG. 32 only shows the X axis controller. As with the previous example of perceptual learning, motor learning occurs through a gradient descent process in which the controller error itself is the gradient. Although this process will work with a body part or even a whole body of any complexity, we will assume for the present example that the arm has three joints and that learning is confined to those arm joints only. Initially, the output gains or weightings translating each error, X axis error and Y axis error, into movements at the arm joints are set at a random value from −1 to 1. With two errors and three joints we have a total of six gains to reorganize. Each set of three gains is reorganized with respect to its own error only. Changes are applied to the gain sets after enough time has elapsed to determine the performance of the current gain set relative to the previous gain set in the form of cumulative error experienced during each trial period. The size of these changes is also proportional to the overall error being experienced by the system, so that high error will cause large steps while low error will cause small fine-tuning steps. As learning progresses and the gains move in the appropriate directions, the arm will be progressively more able to produce motor coordination that reduces the proximity error along both axes. As the error decreases, gradient descent will slow and two new controllers, an X axis cursor controller and a Y axis cursor controller, will thereby be established.

Although the present example assumes that the errors are converted into level 2 joint angle reference signals, they could alternately be converted into level 3 Cartesian reference signals, level 1 force reference signals, or a combination of reference signals sent to different levels at once, depending on the requirements of the task. For example, if the task requires simultaneous position and force control, such as when manipulating a delicate object, then reference signals must be sent to both level 1 and level 2 controllers, or level 1 and 3 controllers. Besides learning to work external devices such as a joystick, motor learning can be helpful in adapting the robot to a new or upgraded appendage, or in recovering motor function following injury. Motor learning can also be applied to reorganize such parameters as PID tuning and output signal conditioning. To take full advantage of this feature, robotic systems may "play" or perform exercises to challenge various controllers.

FIG. 33 shows pseudocode for generating sequence control.

Figure 34:
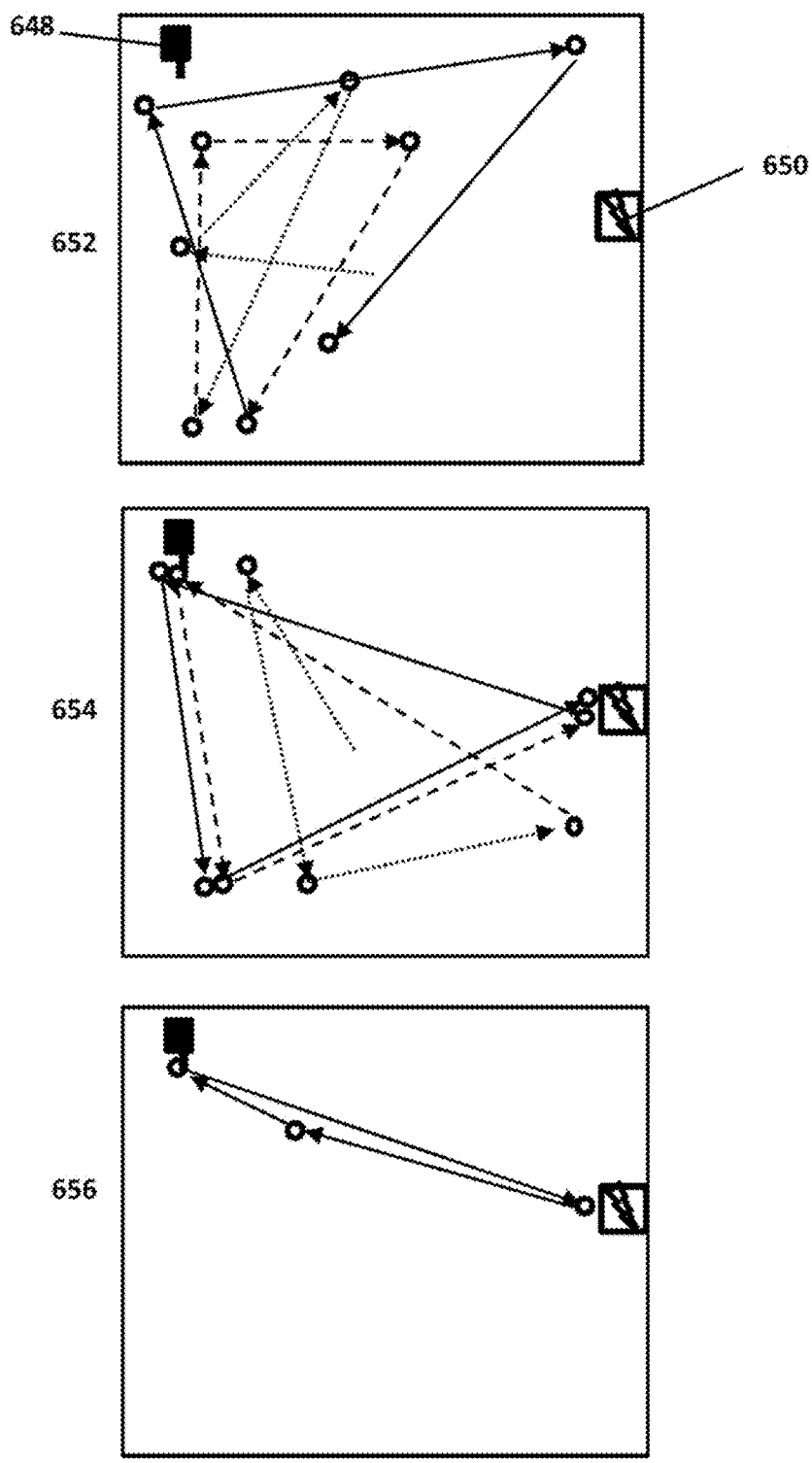
FIG. 34 shows perceptual sequence learning required to perform an operant task, in an embodiment.

FIG. 34 shows perceptual sequence learning required to perform an operant task. In the previous example of perceptual learning, simply identifying and approaching the lever as a lower goal was sufficient to achieve the higher goal of charging the battery. In many environmental situations, however, a sequence of lower goals is required to achieve the higher goal. For example, if the robot was required to first press the lever and then walk to a different location where the wireless charging station would, consequently to each lever press, deliver a small charge as soon as the robot was within range. In order to fully charge the battery in this scenario, the robot would need to repeatedly walk back and forth between the lever and the charging station. In order to learn such a sequence of goals, sequence perceptual learning would be required. Sequence perceptual learning works exactly as in the previous example of perceptual learning but with one key difference: the parameter steps taken during reorganization form a repeating sequence with a small number (e.g., 2 to 10) of positions.

As with the previous examples of learning, both the size of the exploratory steps and whether or not steps repeat their previous movements is determined by the error of the higher level controller. However, in sequence learning, each repeating sequence position has its own unique exploratory trajectory. For example, during learning the robot may execute a three-step sequence in which each step consists of approaching a different perceptual target, and in which each of the three targets is varied over time through its own exploratory path 652-654. Once a particular sequence causes a) the lever to press and then b) the charging station to be approached close enough for it to deliver a charge, then the consequent error reduction will cause the speed of exploration to drop while also causing subsequent repetition of previous step directions 654. Over time, the sequence will reshape until it includes the necessary lower perceptual goals (lever as target of approach and charging pad as target of approach) and in the appropriate order (first approach the lever then approach the charging pad) to achieve the higher goal (battery charge) 656. Over time, this sequence will continue to refine through small adjustments as the algorithm seeks the combination of sequence goals that can reduce the higher error the fastest. Once an effective sequence is established, unnecessary "superstitious" sequence goals can be removed by periodically omitting a sequence step to see if the higher goal can still be accomplished. If the sequence still works following omission of a sequence step, then that sequence step can be removed entirely. During learning, this process can be used in either direction (omission or addition) to determine the appropriate number of repeating sequence steps to start with.

Because the sequences learned through this method are sequences of perceptual goals being issued to a lower controller and not specific actions, then the learning and performance of the sequence control hierarchy described here will still work even if the perceptual targets or obstacles are actively moving. In principle, this technique can be applied to construct an output function for virtually any higher level controller, as long as the relevant perceptions can be perceived and as long as the robot is physically capable of accomplishing them. The perceptual goals that form the sequence can be somatosensory goals, auditory goals, postures, etc.

Figure 35:
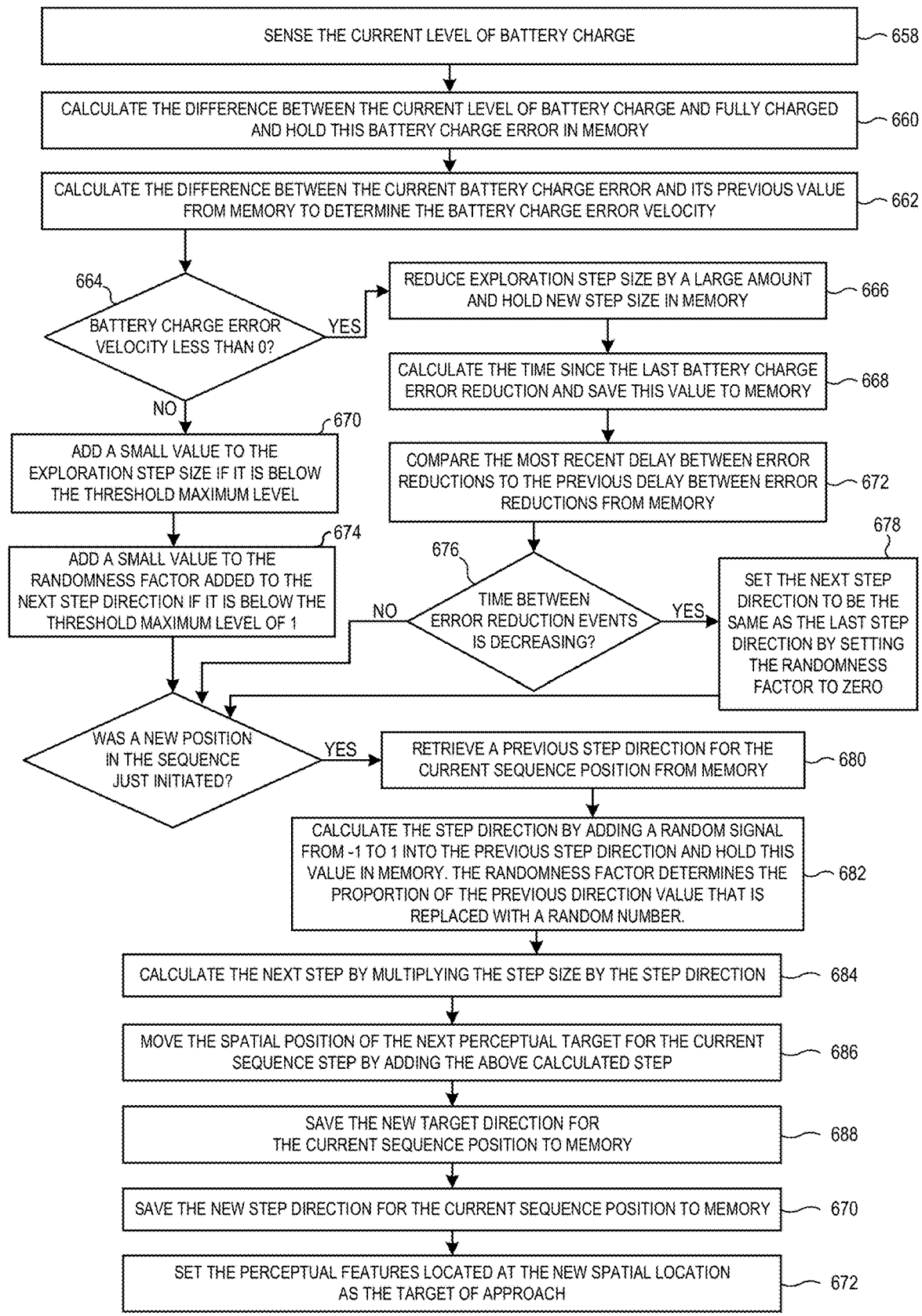
FIG. 35 shows pseudocode for generating the sequence learning depicted in FIG. 34, in an embodiment.

FIG. 35 shows pseudocode for generating the sequence learning depicted in FIG. 34.

FIG. 36 shows a method and corresponding pseudocode that models neural circuits for clinical experimentation. Besides their use in robotics, embodiments described herein may also be used as accurate working models of neural circuits and systems. In its simplest form, each controller may be thought of as a neuron receiving at least two inputs which are somehow subtracted from one another—for example, an inhibitory input and an excitatory input from upstream neurons. If the excitatory input represents the perceptual input signal and the inhibitory input represents the reference signal, then the addition of these two signals represents the subtraction or comparison. The resulting change in output of the target neuron above or below its baseline firing rate value may then be used as the reference signal for lower-level controllers. Where appropriate, the leaky integrators in the output function of each module may be used as a model of the downstream synapse. It may be necessary in some cases to include an additional leaky integrator in the output function of each controller solely for the purpose of modeling more rapid synapse dynamics. Where applicable, neuromodulatory influences such as the outputs of dopamine or serotonin neurons, are modeled here by adjusting the synapse dynamics according to their known effects. Other operations, such as longer timescale integration, differentiation and multiplexing are modeled using standard neural computation techniques. Depending on the region of the nervous system one wishes to model, neurons can alternately function as distinct subcomponents of larger controllers as shown in the FIG. 32.

A realistic neural model of a particular controller is comprised of a population of model neurons all performing the same function. PID control can be modeled by adjusting the range of individual tuning parameters of model neurons in this population (some are more sensitive to error velocity, some are more sensitive to error integral, etc.), with outputs that are ultimately added together to generate a single output value for the population. By adjusting the composition of this population, different tunings can be accomplished in its capacity as a single controller. This approach to modeling neuronal populations can be used to implement the nervous system control architecture described thus far as a more physiologically realistic model. Once such a model is assembled, the effects of various drugs can be simulated by adjusting synapse dynamics to reflect the specific known effects on neurotransmitter release or reuptake, etc. of a particular drug on those populations. Various neurological disorders may also be simulated by correspondingly adjusting properties or population sizes of various classes of neurons depending on the disorder one wishes to model. With this approach, drugs and experimental therapies can be introduced to the model as a method to safely and rapidly explore their system-wide effects in both healthy and diseased states. Over time, as these models become more refined, their clinical usefulness is expected to increase.

FIG. 37 shows a method that models the basal ganglia (BG). The basal ganglia are a set of subcortical nuclei with a relatively straightforward circuit organization. Together these nuclei are thought to constitute the central system in the brain for assembling and implementing the higher control architectures involved in behavior. With reference to the scheme presented in previous figures, the basal ganglia are thought to be represented by level 4 controllers as well as the flexible workspace for combining them into different sequences and hierarchies. For example, the target proximity controller 488 is thought to be embodied in the basal ganglia; adjustment to the reference signals of locomotor and orientation controllers is thought to reflect output by the basal ganglia to lower brain regions controlling those variables.

Besides projecting to lower brainstem motor regions, an important anatomical feature of the basal ganglia is the highly stereotyped circuit loops connecting nearly every cortical region back to itself. The basic design for this "thalamacortical" circuit loop feature is as follows: BG output nuclei (substantia nigra pars reticulata (SNr) and globus pallidus internal segment (GPi)) to thalamus to cortex to BG input nucleus (striatum) to direct and indirect (via globus pallidus external segment (GPe)) routing pathways, to BG output nuclei. Another important feature of the basal ganglia is the presence of dopamine neurons in the substantia nigra pars compacta (SNc), which appear to function as an adaptive gain controller and gate for striatal output; dopamine activity is proportionate to the ability of the striatum to adjust its output. through different channels. One hypothesis to explain the computational importance of dopamine is expressed in FIG. 53 as the "gate opening" signal 888. FIG. 53 also depicts in more detail the hypothesized function of the basal ganglia in assembling different control architectures.

The diagram in FIG. 37 shows, in a basic way and omitting a number of anatomical features for clarity, how the neural circuitry of the basal ganglia may embody a control architecture. The cortex is assumed to form the majority of gradients and hierarchies of detectors required to generate perceptions 700 and facilitate perceptual learning. The thalamus is also assumed to form certain lower level perceptual gradients used for the same purpose 700. As indicated by the arrow 710 a majority of sensor input signals arrive to thalamus and cortex via thalamus. Outputs from the output nuclei of the BG to the cortex via thalamus, as well as outputs to the thalamus itself, are assumed to represent reference signals which are subtracted from the perceptual signals generated in cortex/thalamus. The result of this subtraction is an error signal which is sent to the striatum. By splitting, inverting and routing these error signals to the appropriate output channels 706, the striatum is assumed to specify and generate the control architecture itself. These output channels 708, formed by the output nuclei of the BG, send reference signals either a) up to thalamus or cortex via thalamus to other level 4 controllers, or b) to lower brainstem controllers for locomotion, orientation, etc. Depending on the pattern of routing, splitting and inversion of incoming error signals into outgoing reference signals through the output nuclei, the striatum may in principle accomplish any control architecture required for animal behavior.

FIG. 38 shows a method that models neurological disorders in a robot. In these examples, the disorders shown are movement disorders resulting from damage to parts of the basal ganglia. These disorders are accomplished in a robot by weakening and/or adding noise to particular controller components in accordance with the disorder one wishes to model. Refer to the previous figures to see the relationship between neural circuitry and the controller module shown above. Parkinson's disease 716 results from damage to dopamine neurons. The dashed line indicates a damaged circuit connection, resulting in a decreased ability of the controller to adjust output. This presents as a robot with forms of postural and behavioral rigidity and slowness due to an inability to adjust reference signals in the control hierarchy and thus behavioral outputs. Huntington's disease 718 results from damage to striatal neurons. The dashed line indicates a damaged capacity to gate and route error signals to the appropriate target locations, resulting in the production of aberrant control architectures. This presents as a robot which produces dancelike writhing movements due to the aberrant outputs and conflicts being generated by those faulty architectures.

FIG. 39 shows a method that models drug administration to a robot. In these examples, the drugs exert primary effects through their influence on the circuitry of the basal ganglia. Although not shown here, varying dose-strength may be modeled by simply adjusting the strength of the drug-induced modification to the affected controllers. A dose of cocaine 720 causes increased dopamine signaling. The thick line indicates an enhanced circuit connection, resulting in an increased ability of the controller to adjust output. This presents as a robot which may adjust behavioral output over a wider range more quickly and sustain a particular output for more extended periods of time. A dose of clozapine 722 causes decreased dopamine signaling. The thin line indicates a weakened circuit connection, resulting in decreased ability of the controller to adjust output. This presents as a robot which appears apathetic and resembles a Parkinsonian robot in many ways.

Figure 40:
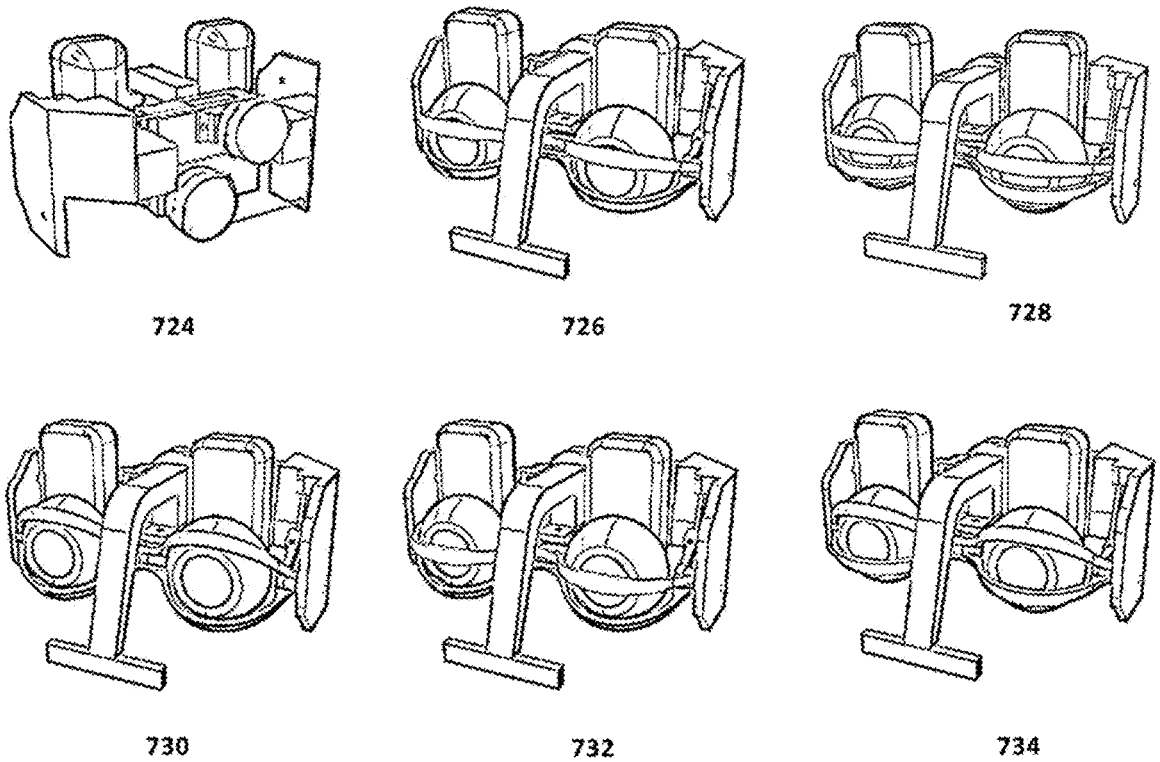
FIG. 40 shows a method that generates social signaling in a robot face, in an embodiment.

FIG. 40 shows a method that generates social signaling in a robot face. The cameras used in visual perception are fitted with glossy iris/sclera parts and independently actuated top and bottom eyelids. The position of each eyelid is controlled by a pulley actuator acting against a spring. The face shown does not include skin or eyelid covering but only shows the moving parts and underlying structure. In whatever behavior the robot is engaged, the average error velocity of the highest level of online controller(s) is calculated over some preceding time period and used as a value representing the current internal "happiness" of the robot. Given this arrangement, if the error begins to reduce then the robot appears glad 734 and if the error begins to increase then the robot appears upset 732. In other words, values below error velocity baseline represent positive affect while values above error baseline represent negative affect. This affect value is represented proportionately by the face as the relative positions of the upper and lower eyelids; as the value moves above baseline, both upper and lower eyelids move up 734 from neutral. As the value moves below baseline, both eyelids move down 732 from neutral. "Arousal" is calculated as the mean absolute rate of change in the outputs of the highest level of online controllers, calculated over the last several seconds. Arousal above baseline (i.e., higher rate of change) is proportionately represented on the face by the top and bottom eyelids moving out in opposite directions 730. Arousal below baseline is represented as the eyelids moving closer together 728. Affect and arousal signaling systems run online at the same time and their outputs are added to generate the position reference signals for upper and lower eyelids. This technique allows a human or another robot to quickly infer and empathize with the internal state of a robot. As facial actuators increase in complexity to include mouth parts and facial muscles, this technique can be expanded to include appropriate position reference signal adjustment for those controllers.

Figure 41:
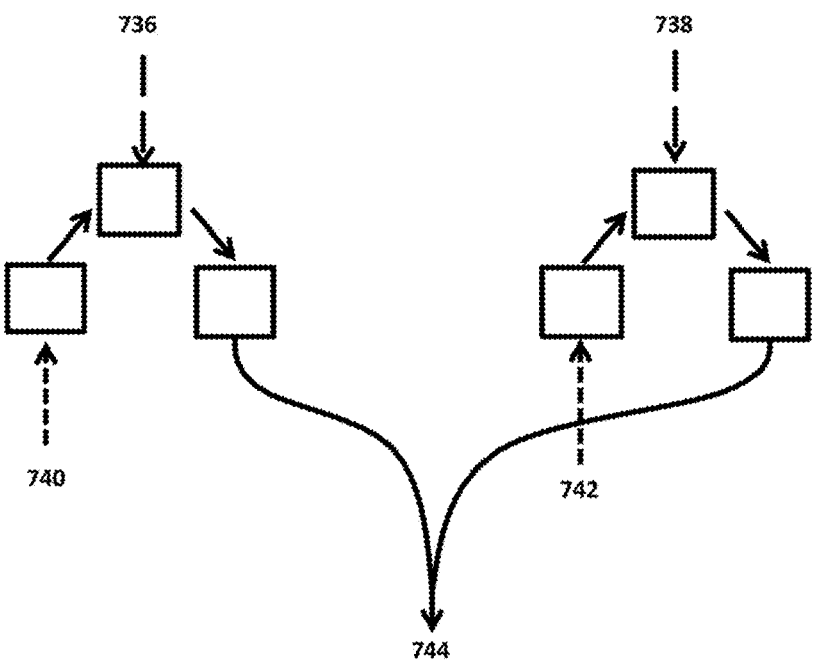
FIG. 41 shows one embodiment for a single joint angle controller.

FIG. 41 shows one embodiment for a single joint angle controller. In this embodiment, force and position control are both at level 1 in the control hierarchy. This is the simplest embodiment of joint angle control. The reference signal of the force controller is dynamically adjusted by higher-level controllers and the outputs of the force and position controllers are added together to generate the motor command.

Figure 42:
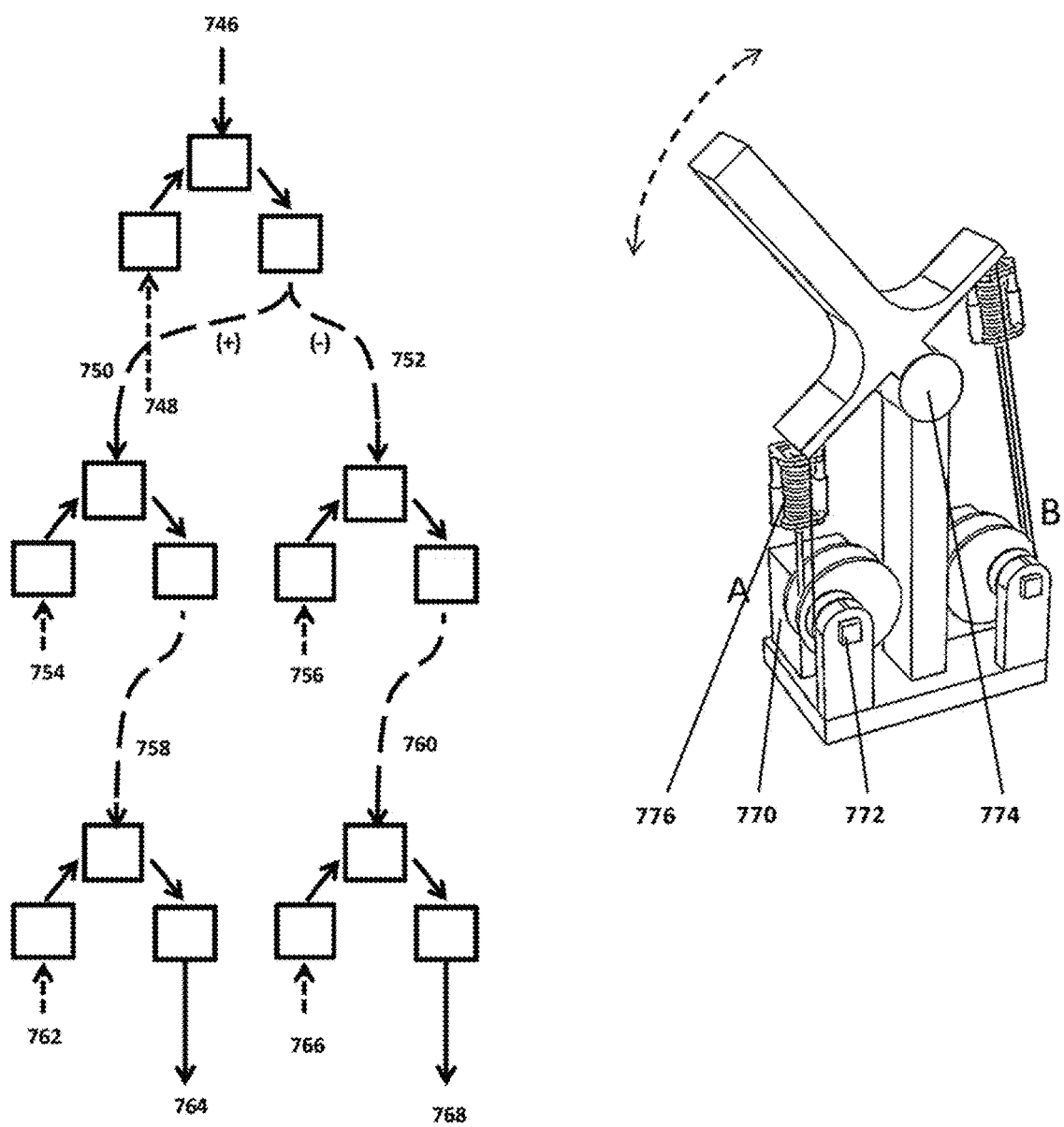
FIG. 42 shows another embodiment for a single joint angle controller.

FIG. 42 shows another embodiment for a single joint angle controller. In this embodiment, the joint angle is controlled by contracting muscle-like linear actuators. This is the most physiologically realistic embodiment of joint angle control, including tendons with stretch sensors (springs with spring-displacement sensors or strain gauges 776), muscle spindles (linear potentiometers to measure muscle length 772), reciprocal innervation and contracting muscles (linear actuators 770). In this design, joint angle is perceived 748 directly through a potentiometer. In another embodiment, joint angle may be perceived by the difference in length between muscle A and muscle B. The joint angle controller outputs length reference signals 750-752 with opposite signs to muscle length controllers A and B. Each muscle length controller outputs a reference signal 758-760 to the corresponding muscle force controller of the same muscle. Any type of linear actuator (piston, air muscle, etc.) or spring element (metal, rubber, etc.) should work as well as those shown in the diagram. Although this figure shows a joint comprised of only two reciprocal muscles, this technique can be used to model joints of any complexity and comprised of any number of muscles as long as the relative output signs and output gain functions for muscle position controllers are appropriately set.

Figure 43:
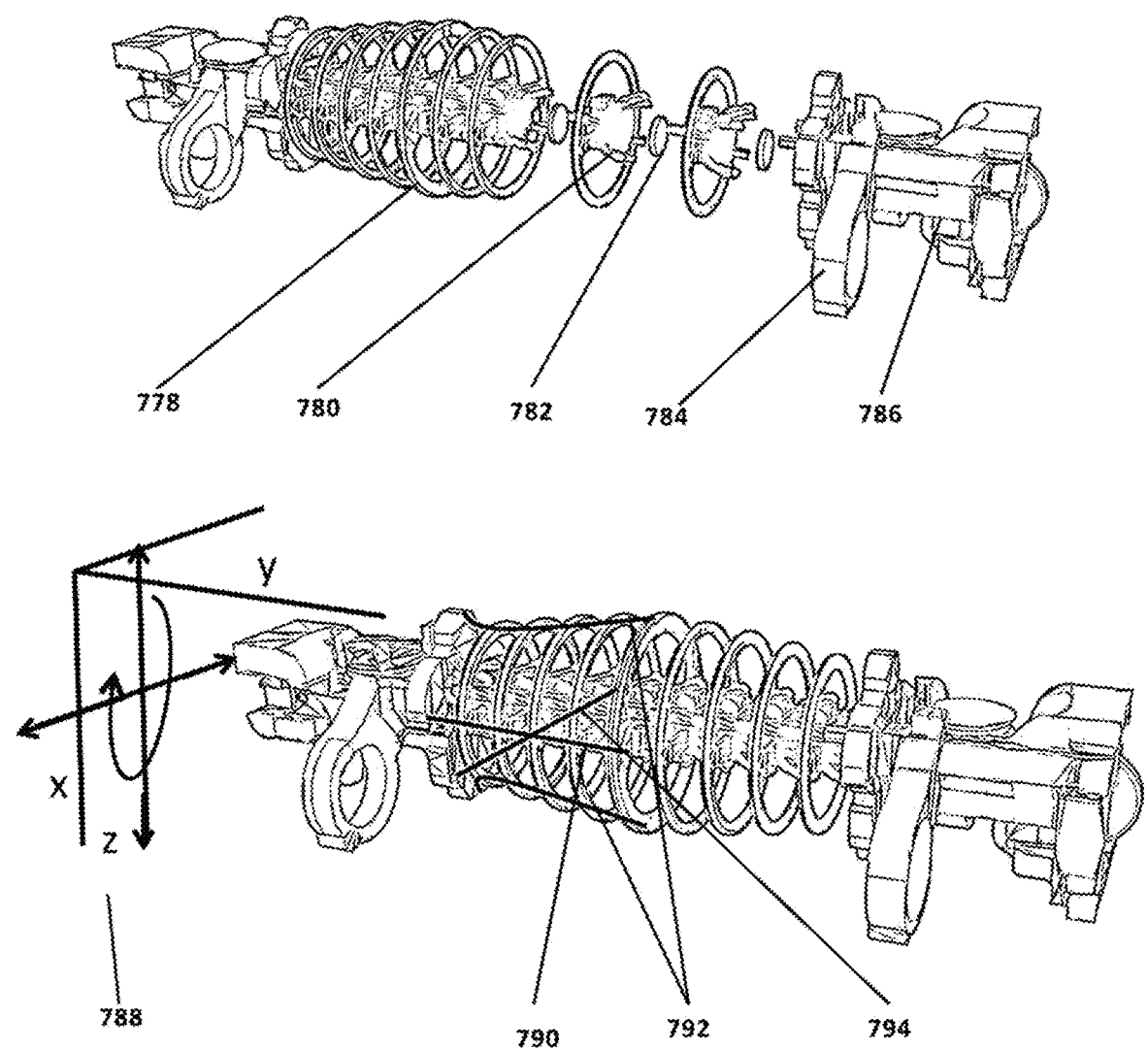
FIG. 43 is a design for a flexible robot spinal column, in an embodiment.

FIG. 43 is a design for a flexible robot spinal column. Shoulder and hip motor housings each contain an IMU. X and Y bend are perceived through linear potentiometers measuring relative body segment lengths. Twist is perceived through perceived roll tilt of front compared to back. Spinal twists and bends are generated by linear actuators 790-794 mimicking the function of contracting muscles.

Figure 44:
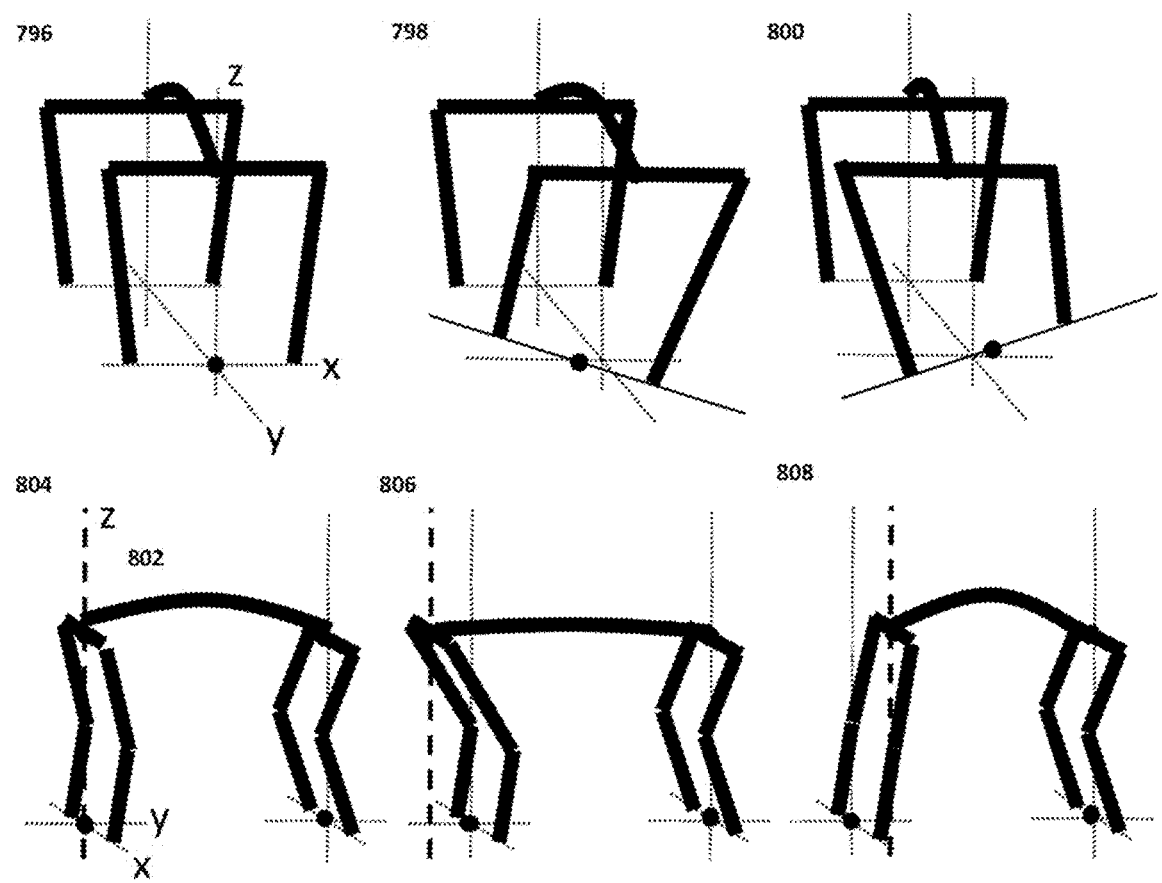
FIG. 44 shows balance control behaviors made possible by a flexible spinal column.

FIG. 44 shows balance control behaviors made possible by a flexible spinal column. In a robot with a flexible actuated spinal column capable of bending and twisting movements, each leg pair can control roll orientation 798-800 independently by commanding the necessary movement of the spine to decouple the opposite leg pair from the influence of the movement. This is a helpful feature for allowing the robot to maintain stable posture on nonplanar surfaces. The variable of CG relative to support position along the Y axis can also be controlled independently 806-808 for each leg pair only in a body having this design feature. In a robot with a rigid spinal column, rotation and Y distance between hips are physically fixed between leg pairs.

Figure 45:
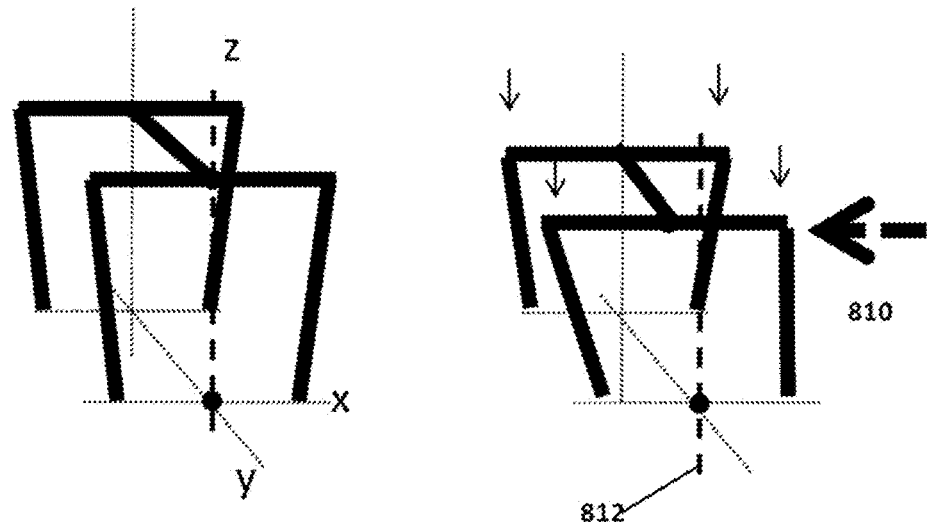
FIG. 45 shows controlling of balance of the quadruped robot of FIG. 12 through crouching, in an embodiment.

FIG. 45 shows controlling of balance of quadruped robot 200 of FIG. 12 through crouching. Diagrams show the output of a balance controller in response to a lateral push disturbance. A CG error in any direction causes proportionate whole-body crouching output, which has a stabilizing effect by dropping the center of gravity. Crouching may be accomplished by adjusting reference signals of body reference frame Z foot position controllers.

Figure 46:
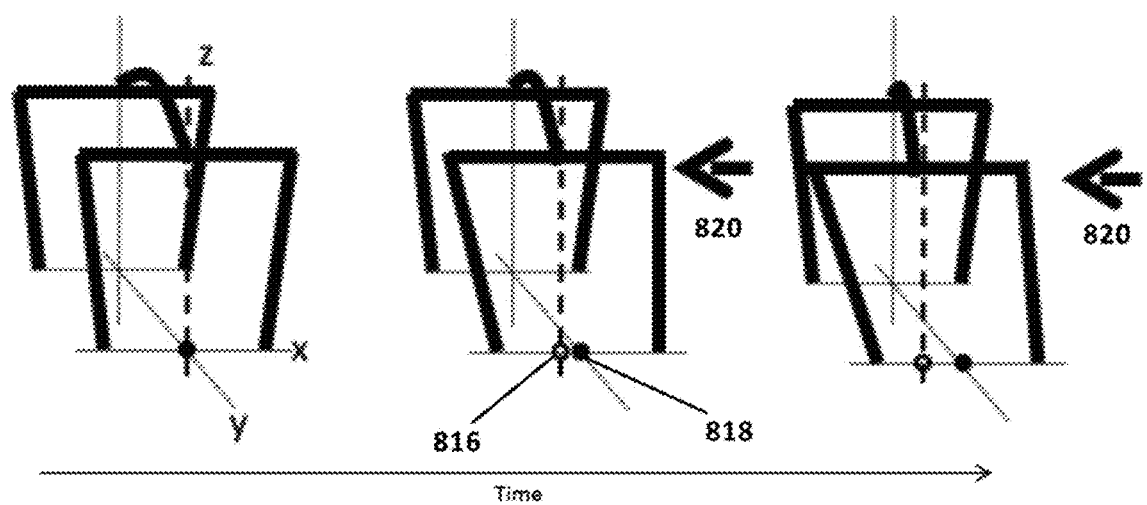
FIG. 46 shows controlling of the center-of-gravity of the quadruped robot of FIG. 12 relative to average point of foot force, in an embodiment.

FIG. 46 shows controlling of the center-of-gravity of quadruped robot 200 of FIG. 12 relative to average point of foot force. While standing, if pushed to the side, the reference signal of the CG position controller moves so that the CG remains positioned not over the geometric midpoint 818 between the feet of a leg pair but instead over the average point of foot force 816 of a leg pair. The average point of foot force may represent the point of support when standing. Panels show how the geometric CG reference signal changes in response to a lateral push disturbance over time. Perception of the average point of foot force benefits from flexible feet with multiple force sensors per foot so that the distribution of foot force may be more accurately sensed. This embodiment can produce stabilizing yielding/sliding movements of the trunk in the event of a push disturbance. The foot force perception can play an important role in the CPG model discussed in FIG. 47.

Figure 47:
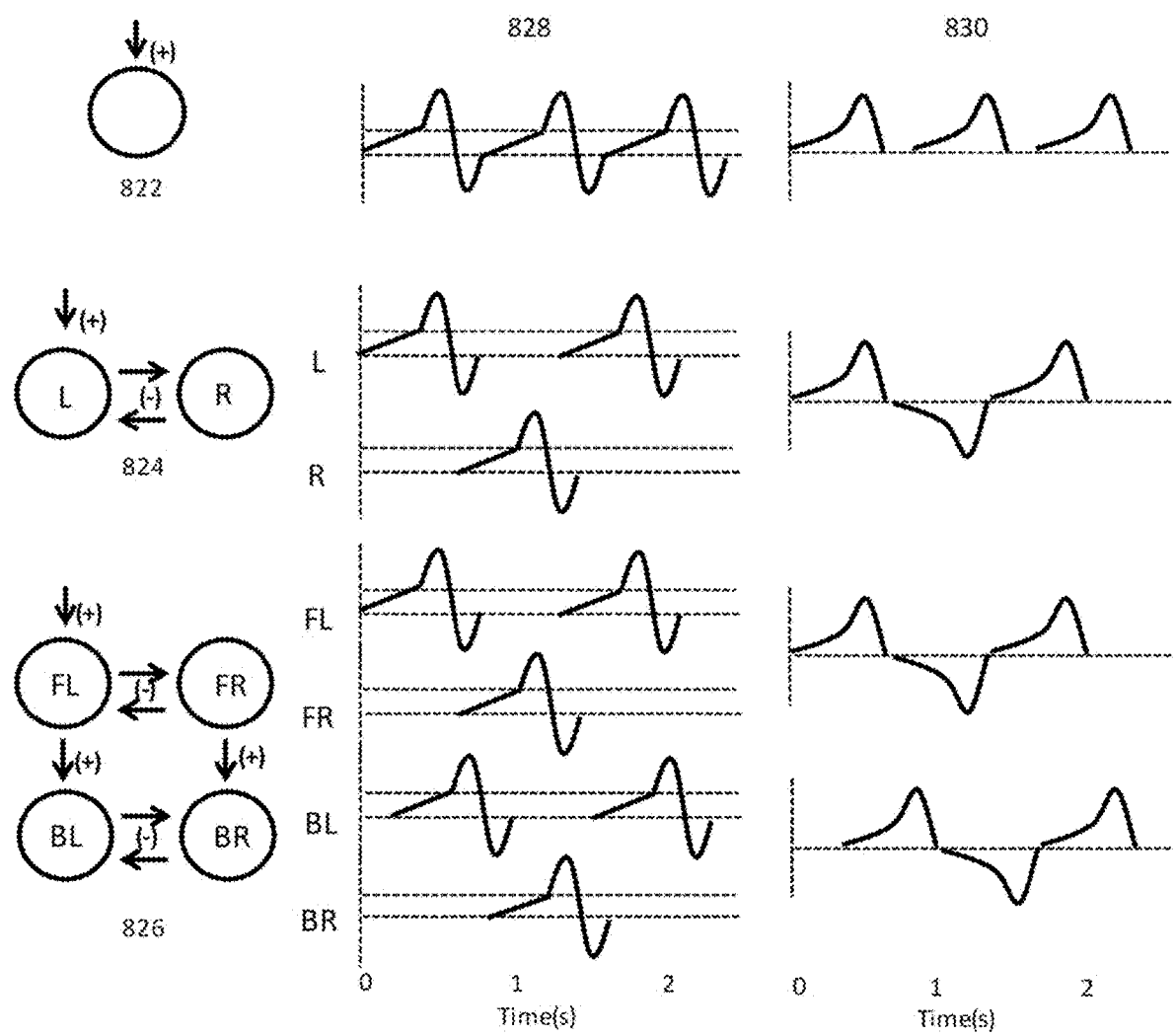
FIG. 47 shows a method that generates whole-body oscillation of the center-of-gravity position of the quadruped robot of FIG. 12 along the X-axis, in an embodiment.

FIG. 47 shows a method that generates whole-body oscillation of the center-of-gravity position of quadruped robot 200 of FIG. 12 along the X-axis. This whole body oscillation forms the basis of realistic vertebrate-like stepping as discussed below. Oscillation of CG reference signal is controlled by one reference signal oscillator 824 for each leg pair. Computationally, each oscillator is a pair of coupled burst generators 822; one for movement of the CG reference signal in the negative direction and one for movement in the positive direction along the X axis. Each burst generator is a leaky integrator which will integrate a descending command signal and generate a rapid burst of activity if a threshold is passed, followed by a brief refractory period of inactivity. Burst generators in each pair exert reciprocally inhibitory effects on one another to prevent co-activation. The outputs of each pair of burst generators are added together to generate the reference signal for CG controllers 830. The front oscillator receives a descending command signal, which is integrated as described above to generate oscillation of the front CG reference signal. The command signal to the back oscillator comes from the front oscillator as a slightly time-delayed copy of its own command signal. By adjusting this time delay, as well as the burst-thresholds and integrator turnaround points, a wide range of frequencies and patterns of body oscillation may be achieved. To take full advantage of this technique, it is beneficial for the robot to have a flexible spinal column.

Figure 48:
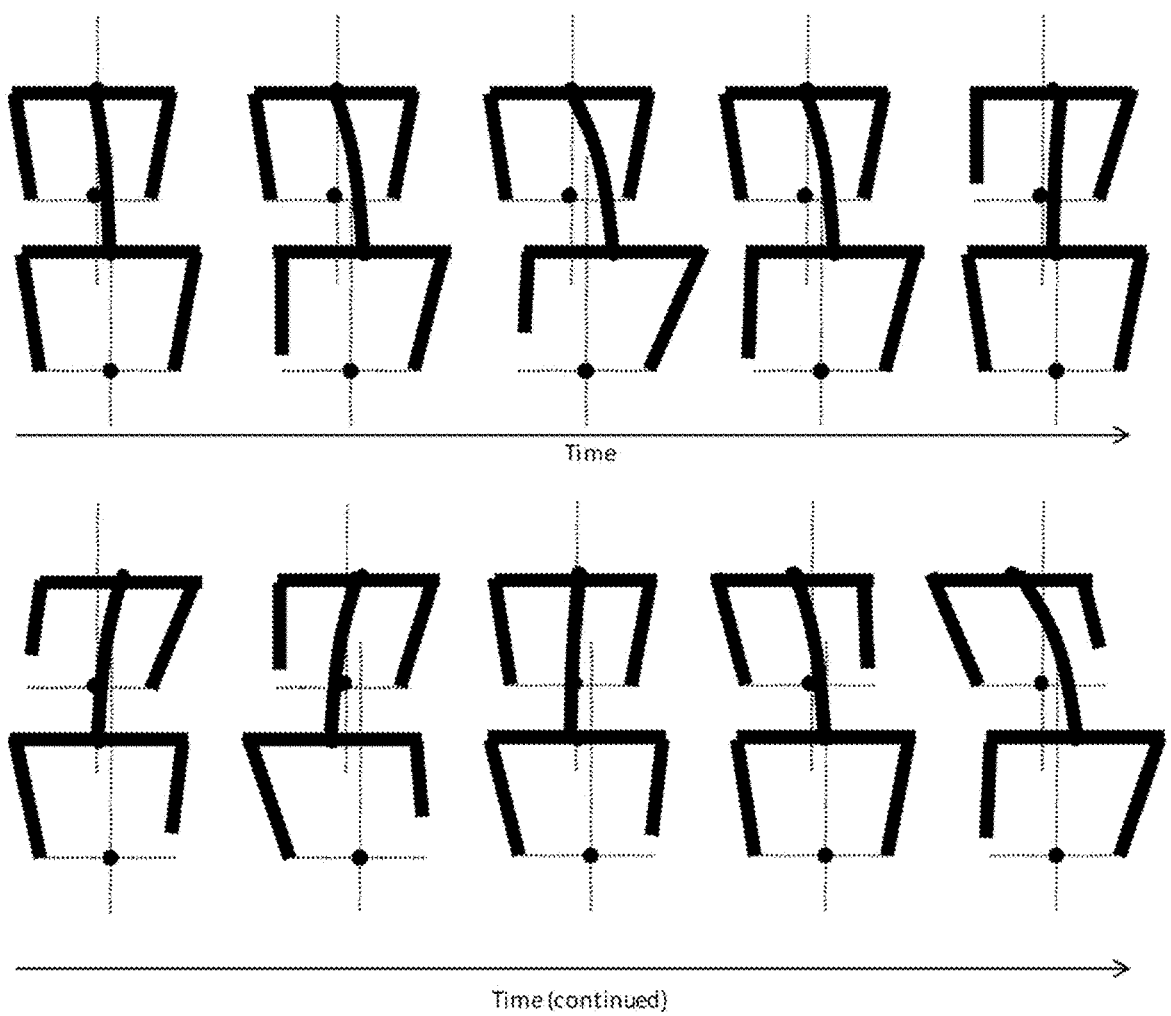
FIG. 48 shows a method that generates stepping through whole body oscillation of the quadruped robot of FIG. 12, in an embodiment.

FIG. 48 shows a method that generates stepping through whole body oscillation of quadruped robot 200 of FIG. 12. As the coupled oscillators produce oscillation of X CG and the center-of-foot force shifts more over one foot of a leg pair, the opposite foot has a brief window of time to stably to lift off of the ground. Leg lift is generated when the average point of foot force for a pair, or some other perception reflecting the window of stability for leg lifting, exceeds an activation threshold. Beyond this threshold, leg lift is activated for the lighter leg proportionately to distance past threshold. In the diagram shown here, the CG shifts and corresponding leg-lifts are exaggerated for the purposes of demonstration. If the oscillation occurs quickly enough, the CG will need to move only a very small distance to generate the foot force distribution required to activate leg lift.

Figure 49:
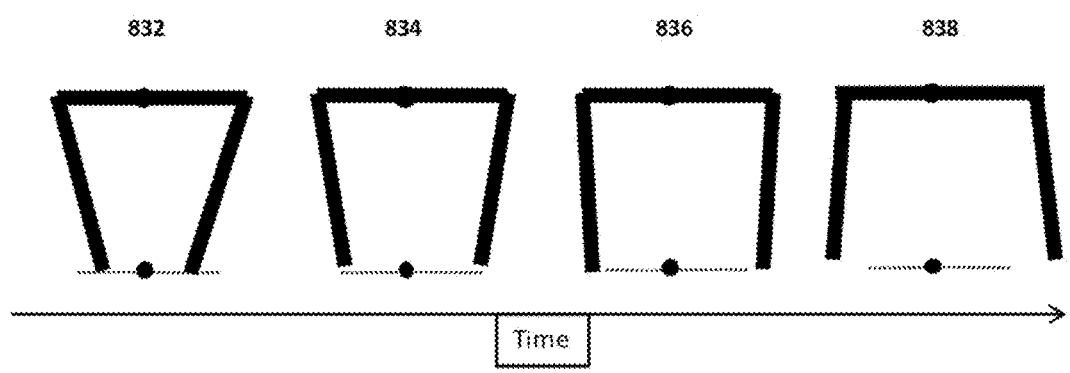
FIG. 49 shows controlling balance stability through widening of the stance of the quadruped robot of FIG. 12, in an embodiment.

FIG. 49 shows controlling balance stability of quadruped robot 200 of FIG. 12 through widening of the stance of quadruped robot 200. This embodiment is activated only when the robot is stepping, and only when the corresponding leg is off the ground. The controlled variable of this embodiment is the time-windowed average velocity of CG error along a given axis, which is a measure of instability; if the robot has a very narrow stance, then it is more likely to experience more sustained and continuous tipping movements. By widening the stance 832-838, these tipping movements can be reduced. This embodiment operates slowly so that it only responds to constant and sustained instability and not discrete events. The diagram shows the behavior of this controller over time during sustained instability.

Figure 50:
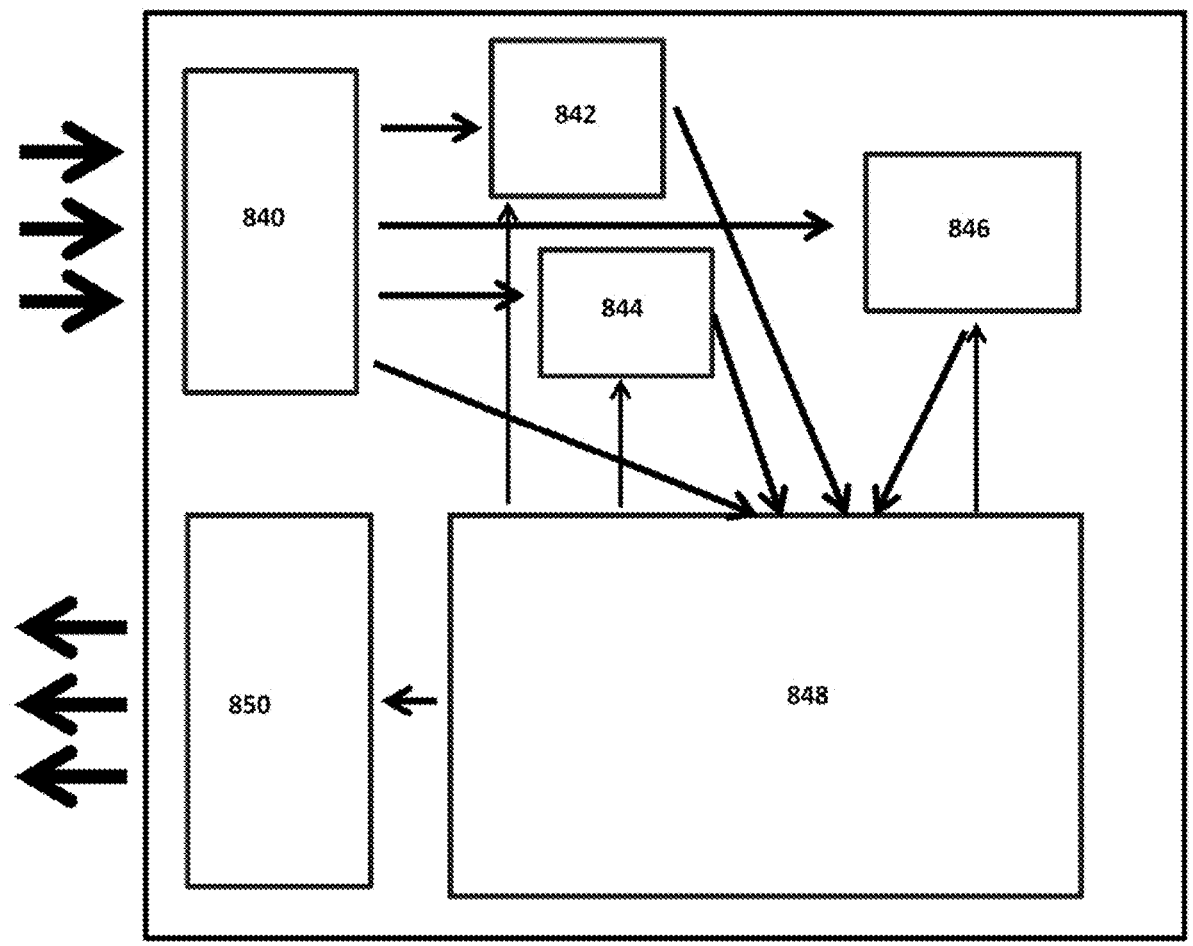
FIG. 50 shows a design for a nervous system emulator engine based on computer hardware, in an embodiment.

FIG. 50 shows a design for a nervous system emulator engine based on computer hardware. All of the computations presented thus far represent simple computations that may, in principle, be carried out entirely by specialized computer hardware, such as analog circuits or ASIC chips. Alternately, if run on standard computer parts, all computations presented here are best carried out by hardware designed to run many simple computations in parallel, such as a graphics processing unit (GPU). Whether analog or digital, dedicated hardware for running the nervous system emulator engine would include the following components: a) central switchboard component for assembling and sequencing control architectures by adjusting the input/output routing of various signals (model basal ganglia and lower brainstem/spinal circuitry), b) specialized perceptual processing hardware for different sensory modalities (model thalamus/cortex), c) high-bandwidth input and output channels for sensory and motor systems comprised of up to millions of individual channels (model efferent and afferent neural pathways). Connections from perceptual processing systems to the controller hierarchy would function as perceptual inputs. Connections from the controller hierarchy to perceptual processing systems would serve to adjust perceptual processing as needed.

FIG. 51 shows a method that implements gradient descent in analog circuitry. A switch 862 has many output channels. In this example, activating a particular output channel selects the visual reference matrix associated with that channel, which feeds back to alter the incoming visual error signal. Once the correct channel is selected, the visual error signal should drop significantly and slow the process of gradient descent. The output targets of the switch are arranged in a gradient as shown 864. Channel selection occurs in such a way that it simulates movement through the gradient, e.g., the output channel position of switch 862 may be determined by the value of an integrator 852. Movement direction is altered 856 by the derivative 858 of the incoming error signal 860. If the error signal is reducing, then the direction does not switch. If the error signal is increasing or not reducing, then the direction does switch. Speed of movement 854 is proportional to the error signal itself. In the example shown here, the error represents the unique presence of a visual feature in the center of the visual field as determined by the selected visual reference matrix. In principle, this technique could be used to build specialized hardware for perception of a target along any perceptual dimension or combination thereof. This technique also represents a hypothesized perceptual processing function of the cortex/thalamus as an analog process carried out by neuronal circuits. Similar techniques could be used to accomplish gradient descent for the purpose of motor learning if the gradients represent output gains or weightings from −1 to 1 for converting higher errors into joint velocities.

FIG. 52 shows a method that constructs and reorganizes the output function of a controller in analog circuitry. In this example, the controller has access to three possible output effectors 880 representing joint angle controllers. Using standard analog computational techniques, the error signal is calculated through the addition of a positive incoming signal (perceptual signal 868) with a negative incoming signal (reference signal 866). The error signal is then routed through a multiplexor 872 capable of splitting the error into any pattern of output signals through the six available channels. There are three "positive" channels through which the signal is unchanged, and three "negative" channels 874 through which the signal is effectively multiplied by "−1" as a way to invert the direction of influence on the effector output. Before arriving at the effector, these error signals undergo PID tuning and enter into a set of different leaky integrator channels 876. For simplicity, the final outputs of these integrators are inverted once again before being sent out so that they are in the correct format to function as reference signals for lower-level controllers. The thick arrows in the diagram represent one possible configuration in which two output effectors—one moving in the positive direction and one moving in the negative direction—are used to reduce the error.

FIG. 53 shows a method that constructs and reorganizes control hierarchies in analog circuitry. In this example, there are three controllers with shared access to three possible output effectors representing joint angle controllers. The essential organization here is identical to that in FIG. 52 with two key differences. First, the output signals in this version may either travel to the three output effectors, or they may loop back up to become reference signals for any other of the three controllers shown 890. Second, the multiplexor input channels are each independently gated 878 and may only be opened when the corresponding controller is activated by a change to its reference signal. This gate-opening is accomplished for each controller by splitting its reference signal into two parts: the original reference signal 890 sent to the original location, and a "gate opening" signal 888 sent to the corresponding multiplexor input gate for that controller. The gate opening signal reflects the speed of the reference signal, so that the gate is only opened when the reference signal is changing, and in proportion to that change. This gating feature is necessary to suppress the output of certain controllers when running different control hierarchy configurations; only those controllers which receive reference signal changes resulting from activation of the top-most controller in the hierarchy will be allowed to express their outputs. This feature allows for the activation of entirely different control architectures—even those utilizing some of the same controllers-through simply adjusting the reference signal of a single controller at the top 884. The method shown here also represents the hypothesized function of the basal ganglia as an analog process carried out by neuronal circuits: the gate opening signal represents dopamine signaling. The gated multiplexor represents the striatum. The comparison between reference and perceptual signals represents a function of the thalamus/cortex. The positive and negative channels represent the direct and indirect pathways of the basal ganglia. The leaky integrator channels in this diagram represents the output nuclei of the basal ganglia.

The example of FIG. 53 only has three controllers and three shared output effectors, but it is still capable of a large number of control hierarchy configurations. New control hierarchy configurations may be generated by simply adjusting the signal splitting and routing by the multiplexor. The current active configuration shown in the diagram is a two-level hierarchy utilizing two of three output effectors. This active configuration is indicated by thicker lines. In principle the technique shown here may be expanded indefinitely by increasing the number of controllers and output effectors and used to construct control hierarchies of any size or complexity. The method shown here is designed to work with a selector system (not shown) responsible for activating the top controllers 884 in each candidate hierarchy based on which top controller is experiencing the greatest error. The controller and corresponding hierarchy configuration with the greatest time integrated error will be activated at the expense of others.

DRAWINGS—REFERENCE NUMERALS

50—Input function receives input signal or signals and converts them into a single perceptual value.
52—Comparison function subtracts the perceptual input value from the reference value (goal value) for perceptual input. The error between them is sent to the output function.
54—Output function converts the error signal into an output signal through PID tuning, signal conditioning and a tunable leaky integrator. The output signal is routed to an effector capable of reducing the error through negative feedback.
56—Reference signal for sensor input
58—Output signal to effector
60—Sensor input signal
62-74—Pseudocode steps for a generic controller module. In this and all subsequent pseudocode diagrams, the steps occur in a repeating loop.
76-80—Levels in a generic three-level hierarchy of controllers
82—A diagram showing basic hardware components required to run the emulator engine and the transfer of information between them.
84-102—Pseudocode steps for generating robot behavior through a generic hierarchy of controllers.
104—Force sensor input
106—Position sensor input
108—Position reference signal
110—Force reference signal
112—Motor output command
114—Force sensor (load cell) arranged to sense torque at the joint
116—Position sensor (potentiometer) arranged to sense the joint position
118—Motor for joint movement
120-130—Pseudocode steps for generating the control hierarchy depicted in 104-112.
132—Joint 1
134—Joint 2
136—Joint 3
138—Cartesian foot-shoulder relationships (level 3)
140—Joint position controllers (level 2)
142—Joint force controllers (level 1)
144-162—Pseudocode steps for generating the active hierarchy (Y axis control) shown in FIG. 6. By changing the joint from 2 to 3 and the axis from Y to X, this pseudocode will also generate the active hierarchy shown in FIG. 8.
164-186—Pseudocode steps for generating the active hierarchy (Z axis control) shown in FIG. 9
188-198—Pseudocode steps for generating joint yielding with waxy flexibility.
200—A robot having four of the arms described in FIGS. 5-10.
202-206—The output behavior, shown from the front, of Cartesian control of each foot in the world reference frame. The reference signals that determine foot position do not change while the trunk is tilted along the roll plane.
208-212—The output behavior, shown from the side, of Cartesian control of each foot in the world reference frame. The reference signals that determine foot position do not change while the trunk is tilted along the pitch plane.
214-238—Pseudocode steps for generating Cartesian control of foot position in the world reference frame as shown in 202-212. Pseudocode shown here is for a single foot.
240—The same robot as in 200 shown standing on a platform.
242—Shown from the front, the output behavior of the trunk roll orientation controller on a tilting platform.
244—Shown from the front, the output behavior of the X-axis CG controller on a tilting platform.
246-250—Shown from the front, the combined output behavior of both a) the trunk roll orientation controller and b) the X-axis CG controller on a tilting platform.
252-256—Shown from the side, the combined output behavior of both a) the trunk pitch orientation controller and b) the Y-axis CG controller on a tilting platform.
258-270—Pseudocode steps for generating trunk orientation control along the roll plane, 242
272-280—Pseudocode steps for generating the X-axis CG controller, 244, for the front leg pair.
282—A simple step cycle for the robot shown over time.
283—Level platform surface 284-288—The output behavior on a level platform of the controllers active during the flight and stance phases of the step cycle.
290—The output behavior on a tilted platform of the controllers active during the flight and stance phases of the step cycle.
291—Angled platform surface.
292-302—Pseudocode steps for generating body symmetry control about the X axis for a single leg pair during stepping.
304-306—Two different views of a posture generated by X and Y symmetry control for all legs during stepping. In the top-down views, 306 and 310, down legs are identified with a black circle.
308-310—Two different views of a different posture generated by X and Y symmetry control for all legs during stepping.
312—Rightwards locomotor behavior
314—Leftwards locomotor behavior
316—Counterclockwise turning locomotor movement
318—Clockwise turning locomotor movement
320—Forwards locomotor movement
321—Y axis CG reference signal
322—Backwards locomotor movement
324—Thick dashed line represents the X CG reference signal for the back leg pair.
326—Thick dashed line represents the X CG reference signal for the front leg pair.
328—Diagram depicting the behavior of the robot in each frame as that of a motorized inverted pendulum.
330—Dot-dash line represents the reference signal of the inverted pendulum controller along the X axis.
332—Thick dashed line represents the X CG reference signal along the X axis.
334—Arrow indicates a large push disturbance to the side of the robot along the X axis.
336-346—From a front view, frames depict the behavior produced by the inverted pendulum controller over time and in response to a push during stepping.
348-358—Pseudocode steps for generating visual target orientation behavior along the X axis.
360-362—Top down views of a robot oriented towards a visual target along the X axis.
364—Visual target
366—Robot eye view of the visual target.
368—Dashed line represents the visual field position reference signal for X axis control.
370-378—Pseudocode steps for generating visual target orientation behavior along the Z axis.
380-382—View of a robot oriented towards a visual target along the Z axis.
384—Robot eye view of the visual target.
386—Dashed line represents the visual field position reference signal for Z axis control.
388—X axis target orientation controller.
390—"Inverted pendulum" balance X CG controller
392—"Inverted pendulum" balance Y CG controller
394—Z axis target orientation controller
396—X CG controller for the front leg pair
398—X CG controller for the back leg pair
400—Y CG controller for the body
402—Trunk roll orientation controller
404—Trunk pitch orientation controller
408—X controller in the body reference frame for the front left foot
410—X controller in the body reference frame for the front right foot
412—X controller in the body reference frame for the back left foot
414—X controller in the body reference frame for the back left foot
416—Z controller in the body reference frame for the front left foot
418—Z controller in the body reference frame for the front right foot
420—Z controller in the body reference frame for the back left foot
422—Z controller in the body reference frame for the back right foot
424—Y controller in the body reference frame for the front left foot
426—Y controller in the body reference frame for the front right foot
428—Y controller in the body reference frame for the back left foot
430—Y controller in the body reference frame for the back right foot
432—X symmetry controller for the front leg pair
434—X symmetry controller for the back leg pair
436—Ground proximity controller
438—Y symmetry control for front leg pair
439—Y symmetry control for back leg pair
440—X controller in the world reference frame for the front left foot
442—X controller in the world reference frame for the front right foot
444—X controller in the world reference frame for the back left foot
446—X controller in the world reference frame for the back right foot
448—Z controller in the world reference frame for the front left foot
450—Z controller in the world reference frame for the front right foot
452—Z controller in the world reference frame for the back left foot
454—Z controller in the world reference frame for the back right foot
456—Y controller in the world reference frame for the front left foot
458—Y controller in the world reference frame for the front right foot
460—Y controller in the world reference frame for the back left foot
462—Y controller in the world reference frame for the back right foot
464—Target location in final output image
466—The three classes of convolution reference matrix used
468—Pooled and slightly down-sized detector outputs become the input to the next level of detectors.
470—Individual detector outputs, normalized to a 0-1 scale and thresholded to remove the lower 50% of detector output
472—Image target region
474—Input image
476—Current reference matrix for the index position in feature space shown in the figure.
478—Current index position in feature space and corresponding output image.
480—A diagram showing robot target pursuit from a bird's eye view.
482—The target
484—Brown circles represent obstacles to avoid hitting.

486—Arrows show the trajectory of the robot to the target.
488—Target pursuit controller
490—Obstacle avoidance controller
492—Y axis CG controller
494—X axis CG controller front leg pair
495—X axis CG controller back leg pair
496-518—Pseudocode steps for generating target pursuit and obstacle avoidance behavior.
520-538—Pseudocode steps for generating the obstacle avoidance perception.
540—A "battery charge" controller experiencing extended high errors and reorganizing its output function.
542—A "battery charge" controller experiencing low errors because of an established working output function.
544—Battery charge lever
546—Arrows depict the exploratory trajectory of a robot as targets of pursuit are varied as a means of reducing battery charge error.
547—Diagram depicting the robot having approached a perceptual target that is not the lever which has no effect on battery charge error.
548—Arrows depict the trajectory of a robot that has learned the proper target to approach in order to reduce battery charge error.
549—Diagram depicting the robot having approached a perceptual target that is the lever, and which has a reducing effect on battery charge error.
550-580—Pseudocode steps for generating perceptual learning.
582—Moving target
584—Computer cursor
586—Row of panels shows perceptual feedback before learning in which both X and Y errors are large.
588—Row of panels shows perceptual feedback after learning in which both X and Y errors are small.
590—X cursor to target controller
592—Y cursor to target controller
594-598—Joint angle controllers for the arm
600—Figures show motor control task with arm actuating a joystick.
602-628—Pseudocode steps for generating motor learning.
630-646—Pseudocode steps for generating sequence control.
648—Lever to deliver a unit of battery charge
650—Wireless battery charging station
652—Exploratory trajectory of a repeating 3 position sequence before any learning has occurred. Lighter arrows indicate an earlier time point.
654—Exploratory trajectory of a repeating 3 position sequence as the first charge is delivered and learning first occurs.
654—Trajectory of a repeating 3 position sequence after learning.
658-672—Pseudocode steps for generating sequence perceptual learning.
674—Excitatory neuron
676—Inhibitory neurons
678—Perceptual input
680—Comparison function
682—Reference input
684—Output signal
696-698—Pseudocode steps for realistic modeling of neural circuitry.
700—Input function may occur in thalamus and cortex.
702—Comparison function may occur in thalamus and cortex.
704—Adaptive gain control may be accomplished by dopamine neurons in the SNc.
706—Output function may occur in striatum.
708—Output integration and connections to lower controllers may be embodied in the output nuclei of the BG, such as the SNr.
710—Majority of sensory input signals arrive at the thalamus.
712—Majority of outgoing reference signals to lower motor controllers exit to the brainstem motor structures of the medial motor pathway.
714—A control architecture diagram showing how recurrent loops, such as those formed by the BG, can be used to construct a hierarchy of controllers.
716—A model of Parkinson's disease
718—A model of Huntington's disease
720—A model of cocaine administration
722—A model of clozapine administration
724—Actuators
726—Neutral
728—Arousal below baseline
730—Arousal above baseline
732—Affect below baseline
734—Affect above baseline
736—Position reference signal
738—Force reference signal
740—Position sensor input
742—Force sensor input
744—Motor output
746—Joint angle reference signal
748—Joint angle sensor input
750—Muscle A length reference signal
752—Muscle B length reference signal
754—Muscle A length input
756—Muscle B length input
758—Spring A displacement reference signal
760—Spring B displacement reference signal
762—Spring length sensor input
764—Motor A output
766—Spring length sensor input
768—Motor B output
770—Linear actuator (motor with pulley)
772—Linear potentiometer for sensing "muscle" length
774—Joint of rotation with potentiometer for sensing angle
776—Spring element anchor for linear actuator with linear potentiometer to sense spring displacement
778—Linear actuators anchor to center vertebra
780—Vertebra with integrated filament routing for linear actuators
782—Soft rubber intervertebral disk
784—Leg attachment
786—Housing for three pulley-actuated motors with imbedded torque sensors: X bend, Y bend and twist
788—three actuated degrees of freedom for each of the two (front and back) spinal segments
790—X bend actuator filament (opposite side filament Is obscured by body)
792—Y bend actuator filaments
794—Body twist actuator filament (opposite side filament is obscured by body)
796—Flexible spinal cord shown in context of a standing robot body.

798-800—Robot with flexible spinal cord shown producing postures in only the front leg pair which are made possible by the flexible spinal cord.
802—Reference signal for the Y axis CG controller for the front leg pair
804-808—Robot with a flexible spinal cord shown producing adjustments of the Y axis CG controller in the front leg pair only
810—Sideways push disturbance
812—X axis CG reference signal
816—Average point of foot force for the leg pair
818—Geometric point of support for the leg pair
820—Lateral push disturbance
822—Row shows single burst generator
824—Row shows burst generator for single leg pair
826—Row shows burst generator pairs for both leg pairs
828—Column shows burst generator behavior plots. Output occurs only above zero. Below zero is refractory
830—Column shows output reference signal
832-838—Robot shown from the front as stance with is increased over time.
840—Sensor input preprocessing and routing
842—Sensory processing hierarchy #1—somatosensory processing, for example.
844—Sensory processing hierarchy #2—spatial processing, for example.
846—Sensory processing hierarchy #3—visual processing, for example.
848—Central control architectures
850—Motor output preprocessing and routing
852—Integrator value determines switch output channel
854—Switch movement speed. Gain of signal added to the integrator.
856—Switch movement direction. Determines whether signal is added or subtracted from integrator
858—Derivative function determined derivative of visual error signal
860—Incoming visual error signal
862—Many-channel switch determines which visual reference matrix is selected and active.
864—Possible visual reference matrices arranged along a gradient. In the diagram shown here, only one matrix may be selected at a time.
866—Reference signal
868—Perceptual signal
870—Error signal
872—Multiplexor capable of splitting/duplicating and routing the error signal through any combination of the available channels. This function models the striatum.
874—A function for performing the analog computation "*−1" to reverse the influence of the output signal on the target effector. This function models the indirect pathway of the basal ganglia.
876—A function for PID tuning and integration of each output signal. The analog computation "*−1" is performed on the signal before it is sent to the integrator, which in turn sends the signal to a downstream target as a reference signal. This function models the output nuclei of the basal ganglia.
878—Activation gates that allow signal through a channel in proportion to slightly time integrated reference signal velocity to the corresponding controller. This function models the dopamine receptor systems in the striatum.
880—Output effector controllers which do not participate in the flexible control hierarchy system. For example, these controllers may be joint angle controllers. This function models controllers below the level of the basal ganglia, such as the MLR and tectum.
882—Reference signals for output effector controllers.
884—Reference signal for the top-most controller in the control hierarchy. This signal must come from outside the loops.
886—Perceptual signals. This models perceptual inputs from the cortex and thalamus.
888—"Gate opening" signals calculated as the derivative of corresponding reference signals. This models dopamine neurons projecting from the substantia nigra pars compacta to the striatum.
890—Reference signals for middle levels in the control hierarchy. These reference signals are the output signals of higher controllers. This models the basal ganglia-thalamocortical loops.

ADDITIONAL EMBODIMENTS

Figure 54:
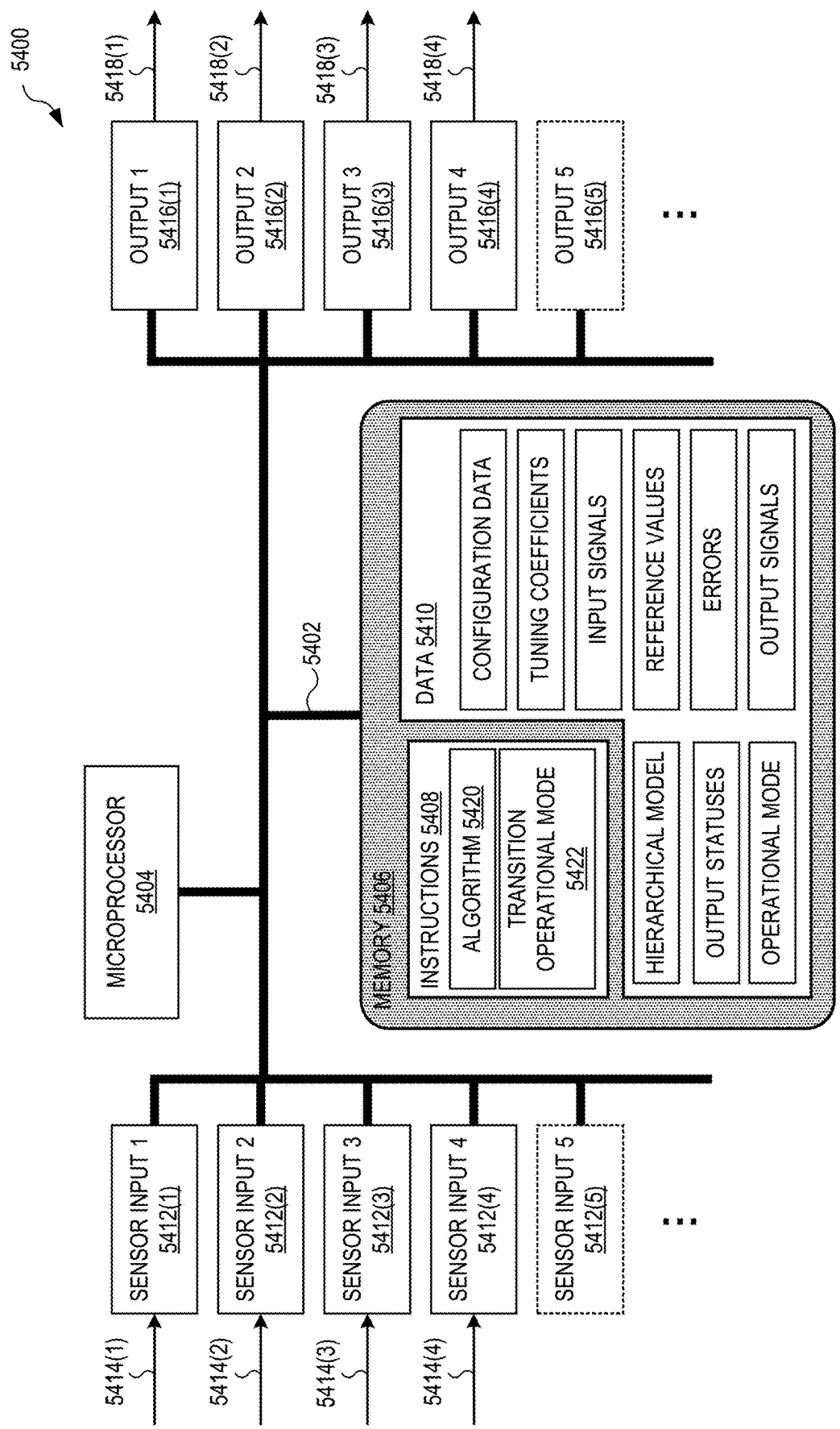
FIG. 54 is a schematic diagram of one nervous system emulator engine that controls a robot body, in an embodiment.

FIG. 54 is a schematic diagram of one nervous system emulator engine 5400 that controls a robot body (e.g., robot body 12 of FIG. 1A). Emulator engine 5400 includes a microprocessor circuit 5404 that processes data, and a memory 5406 that stores data 5410 and instructions 5408. Microprocessor circuit 5404, memory 5406, and other components of emulator engine 5400 are communicatively coupled via a bus 5402.

Nervous system emulator engine 5400 includes a plurality of sensor input circuits 5412 that receive sensor signals 5414 from sensors coupled to the robot body (e.g., sensors 16 of FIG. 1A). As shown in FIG. 54, each sensor input circuit receives one sensor signal 5414. Although FIG. 54 shows four sensor circuits 5412 receiving four sensor signals 5414, emulator engine 5400 may be configured with a different number of sensor input circuits 5412 for use with a corresponding number of sensors.

Nervous system emulator engine 5400 also includes output circuits 5416 that output control signals 5418 to effectors of the robot body (e.g., effectors 18 of FIG. 1A) that manipulate controllable components of the robot body (e.g., controllable components 20 of FIG. 1A). Each effector may be a linear actuator, motor, visual display, heater, or other type of actuator for manipulating the corresponding controllable component. While FIG. 54 shows nervous system emulator engine 5400 having four output circuits 5416 outputting four control signals 5418, nervous system emulator engine 5400 may have a different number of output circuits for use with a corresponding number of effectors.

Each sensor input circuit 5412 may amplify, filter, and/or digitize the corresponding sensor signal 5414. Each sensor may be a force sensor (e.g., load cell, force-sensitive resistor), length sensor, angle sensor, rotation sensor, torque sensor, orientation sensor (e.g., accelerometer, gyroscope), temperature sensor, pressure sensor, optical sensor, color sensor, or other type of sensor. Depending upon the type of sensor, each sensor input circuit 5412 may be configured for two-terminal sensing, four-terminal Kelvin sensing, a Wheatstone bridge, or another type of impedance, voltage, or current measurement technique. Each sensor input circuit 5412 may include difference amplifiers, instrumentation amplifiers, and/or similar components for analog signal conditioning. In some embodiments, sensor input circuits 5412 include filters to reject noise and/or interference from sensor signals 5414. When sensor signals 5414 are analog signals, sensor input circuits 5416 may include analog-to-digital converters (ADCs) to digitize respective sensor signals 5414. When sensor signals 5414 are digital signals, sensor input circuits 5416 may include receivers to receive digital signals 5414.

Depending upon the type of effector, each output circuit 5416 may be configured to output an analog voltage or current, wherein the corresponding output control signal 5418 is an analog control signal. Each output circuit 5416 may be configured to output a digital signal, wherein the corresponding output control signal 5418 is a digital control signal. In one embodiment, at least one output circuit 5416 is a pulse-width modulation (PWM) circuit configured to drive a motor. In another embodiment, at least one output circuit 5416 outputs a digital motor command for controlling a motor controller of the corresponding effector. In another embodiment, output circuits 5416 include digital-to-analog converters (DACs) to generate corresponding analog control signals 5418.

Microprocessor circuit 5404 may include at least one central processing unit (CPU), graphics processing unit (GPU), digital signal processor (DSP), field-programmable gate array (FPGA), or other type of integrated circuit capable of performing logic, control, and input/output operations. Microprocessor circuit 5404 may include a mixed-signal integrated circuit, such as a System-on-Chip (SoC) or microcontroller unit (MCU), that combines a processor, memory, and input/output interfaces on a single chip. Microprocessor circuit 5404 may also include a memory controller, bus controller, graphics processing unit, and/or other components that manage data flow between microprocessor circuit 5404, memory 5406, and other components communicatively coupled with bus 5402.

Memory 5406 may include both volatile memory (e.g., RAM, SRAM, etc.) and nonvolatile memory (e.g., ROM, FLASH, etc.). Instructions 5408 include machine readable instructions that, when executed by microprocessor circuit 5404, control operation of emulator engine 5400. Instructions 5408 may include at least one algorithm 5420, as well as operating system instructions. Algorithm 5420 is selected based upon desired functionality of emulator engine 5400, as described in further detail below.

In FIG. 54, memory 5406 is shown storing configuration data, tuning coefficients, input signal values, reference values, error signal values, output signal values, output statuses of output circuits 5416, an operational mode, and hierarchical model data. The configuration data may include values that define operation of instructions 5408 (e.g., for configuring algorithm 5420). Input signal values may be received from sensor input circuits 5412 via bus 5402, and output signal values may be directed to output circuits 5416 via bus 5402. Some of the reference values stored in data 5410 may be obtained from output signal values stored in data 5410, depending on the hierarchical model data stored in data 5410.

Microprocessor circuit 5404 executes instructions 5408 (e.g., algorithm 5420) to (i) receive input signals from sensor input circuits 5412 and store the input signals in memory 5406, (ii) convert the input signals into perceptual inputs, (iii) for each perceptual input, generate an error by comparing the perceptual input to a reference value, and process the error into an output signal; and (iv) route the output signals according to the hierarchical model. Tuning coefficients may be selected and stored in data 5410 so that emulator engine 5400 reduces the errors when output control signals 5418 control the effectors.

In certain embodiments, nervous system emulator engine 5400 transmits output control signals 5418 wirelessly to the effectors via one or more wireless transmitters (not shown in FIG. 54), wherein the effectors are configured to receive output control signals 5418 via a wireless transmission. In other embodiments, nervous system emulator engine 5400 transmits output control signals 5418 to the effectors via electrical wires, such as coaxial cable or twisted-pair cabling. In one embodiment, nervous system emulator engine 5400 transmits each output control signal 5418 to a corresponding effector via a fiber optic cable, wherein the output control circuits 5416 and effectors are configured with fiber-optic transceivers.

Figure 55:
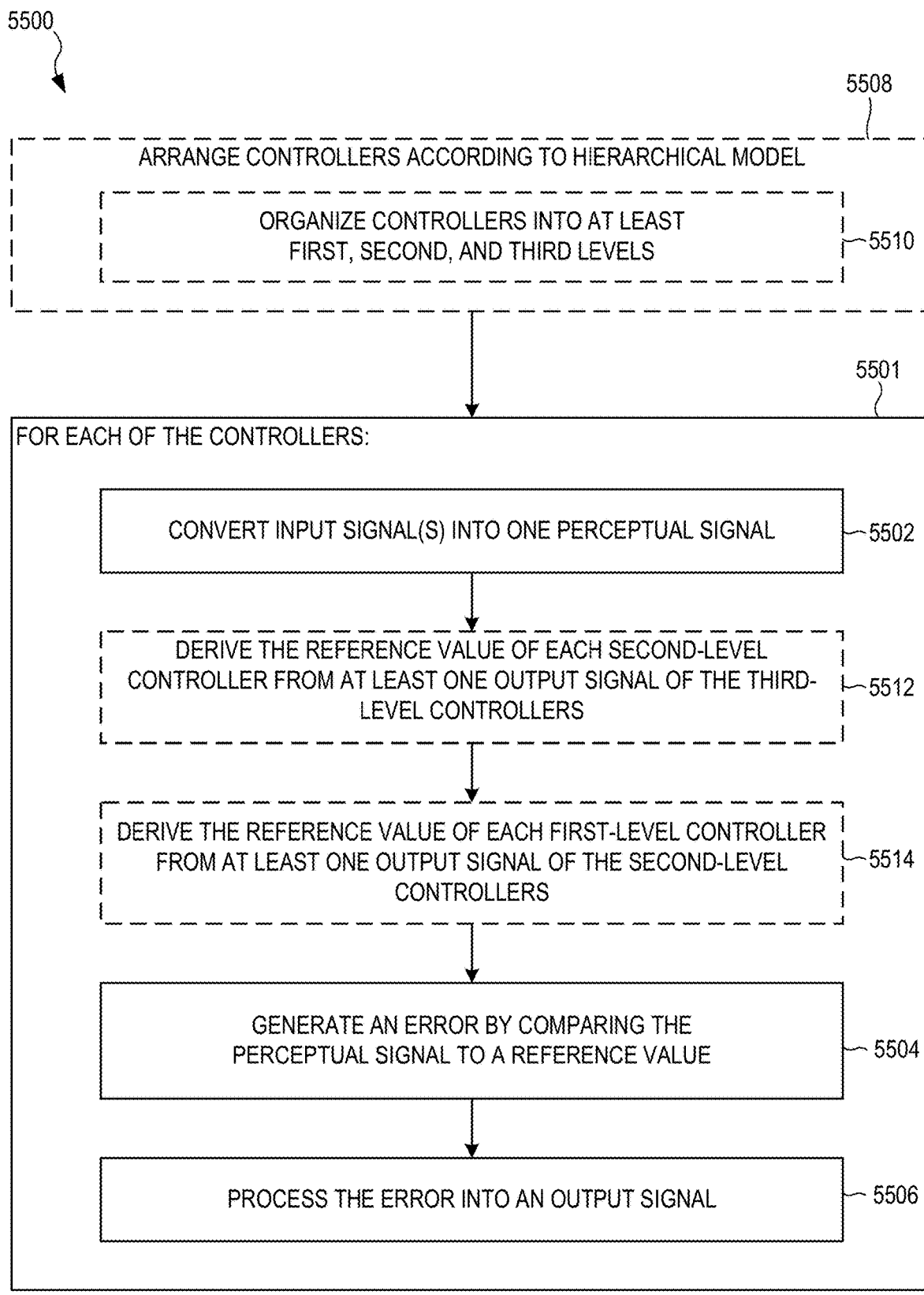
FIG. 55 shows a method that emulates robotic control, in embodiments.

FIG. 55 shows a method 5500 that emulates robotic control. Method 5500 includes a step 5501 that repeats steps 5502, 5504, and 5506 for each of a plurality of controllers arranged according to a vertebrate nervous system hierarchical model. Step 5502 of method 5500 converts at least one input signal, from a plurality of sensors coupled to a plurality of controllable components of a robot body, into one perceptual signal. In one example of step 5502, emulator engine 5400 of FIG. 54 stores input signals from sensor input circuits 5412 in data 5410 of memory 5406. Step 5504 of method 5500 generates an error by comparing the perceptual signal to a reference value. In one example of step 5504, emulator engine 5400 of FIG. 54 includes machine-readable instructions (e.g., algorithm 5420) that control microprocessor circuit 5404 to compare each input signal to a reference value to generate a corresponding error stored in data 5410. Step 5506 of method 5500 processes the error into an output signal to reduce the error when a plurality of the output signals control a corresponding plurality of effectors, of the robot body, that manipulate the controllable components of the robot body. In one example of step 5506, emulator engine 5400 includes machine-readable instructions that control microprocessor circuit 5404 to generate an output signal from an error, store the output signal in data 5408, and route the output signal to one of output circuits 5416.

In some embodiments, method 5500 includes a step 5508 that arranges the plurality of controllers according to the vertebrate nervous system hierarchical model. In one of these embodiments, step 5508 includes a step 5510 that organizes the plurality of controllers into at least first, second, and third levels of the vertebrate nervous system hierarchical model.

In another embodiment, method 5500 includes steps 5512 and 5514 when the vertebrate nervous system hierarchical model contains at least first, second, and third levels. Step 5512 derives the reference value of each of the controllers of the second level from at least one output signal of the controllers of the third level, and step 5514 derives the reference value of each of the controllers of the first level from at least one output signal of the controllers of the second level. FIG. 2 depicts one example of steps 5512 and 5514.

In some embodiments, method 5500 includes a step (not shown) that organizes the plurality of controllers into at least first and second levels of the vertebrate nervous system hierarchical model. In other embodiments, method 5500 includes a step (not shown) that organizes the plurality of controllers into at least first, second, third, and fourth levels of the vertebrate nervous system hierarchical model. In one of these embodiments, step 5501 of method 5500 includes a step (not shown) that derives the reference value of each of the controllers of the third level from at least one output signal of the controllers of the fourth level.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A vertebrate nervous system emulator engine, comprising:
    a plurality of servo controllers, each of the plurality of servo controllers having a servo input, a reference input, and a servo output;
    a plurality of switches configured to:
        electrically connect a first subset of the plurality of servo controllers to each other to form a first hierarchy of servo controllers; and
        electrically connect a second subset of the plurality of servo controllers to each other to form a second hierarchy of servo controllers that is different than the first hierarchy;
        each of the first and second hierarchies including at least a first level of servo controllers and a second level of servo controllers, the servo output of each of the servo controllers of the second level being electrically connected to the reference input of at least one of the servo controllers of the first level; and
    a sequencer configured to control the plurality of switches to reconfigure the plurality of servo controllers from the first hierarchy to the second hierarchy.

2. The vertebrate nervous system emulator engine of claim 1, at least one of the plurality of servo controllers being included in both the first and second hierarchies.

3. The vertebrate nervous system emulator engine of claim 1, wherein:
    the second level of the first hierarchy includes a first-hierarchy top controller having a differential input stage and a gain stage, the differential input stage being configured to generate an error signal by subtracting a servo signal received at the servo input of the first-hierarchy top controller from a reference signal received at the reference input of the first-hierarchy top controller, the gain stage being configured to amplify the error signal into an output signal and output the output signal via the servo output of the first-hierarchy top controller;
    the sequencer is configured to determine, based at least on the error signal of the first-hierarchy top controller, when a perceptual goal of the first hierarchy has been achieved; and
    the sequencer is configured to control the plurality of switches in response to the perceptual goal of the first hierarchy being achieved.

4. The vertebrate nervous system emulator engine of claim 3, wherein the first-hierarchy top controller is the only one of the plurality of servo controllers in the second level of the first hierarchy.

5. The vertebrate nervous system emulator engine of claim 3, wherein:
    the second level of servo controllers of the second hierarchy includes a second-hierarchy top controller; and
    the sequencer is further configured to, in response to the perceptual goal of the first hierarchy being achieved, apply a reference signal to the reference input of the second-hierarchy top controller.

6. The vertebrate nervous system emulator engine of claim 5, wherein the first-hierarchy top controller and the second-hierarchy top controller are the same one of the plurality of servo controllers.

7. The vertebrate nervous system emulator engine of claim 5, wherein the second-hierarchy top controller is the only one of the plurality of servo controllers in the second level of the second hierarchy.

8. The vertebrate nervous system emulator engine of claim 1, wherein:
    the second level of servo controllers of the second hierarchy includes a second-hierarchy top controller;
    the sequencer is configured to apply a reference signal to the second-hierarchy top controller;
    the plurality of switches include a gate-opening switch configured to close in response to a change in the reference signal; and
    the gate-opening switch, when closed, electrically connects the reference signal to the reference input of the second-hierarchy top controller.

9. The vertebrate nervous system emulator engine of claim 8, wherein:
    the sequencer is configured to generate the reference signal as a step function with a transition edge; and
    the gate-opening switch is configured to close in response to the transition edge.

10. The vertebrate nervous system emulator engine of claim 1, each of the servo controllers of the first and second hierarchies being electrically connected to one or more of a plurality of sensors coupled to a plurality of controllable components.

11. The vertebrate nervous system emulator engine of claim 10, the servo outputs of the servo controllers of the first level being electrically connected to a plurality of effectors that manipulate the plurality of controllable components.

12. The vertebrate nervous system emulator engine of claim 11, further comprising the plurality of sensors, the plurality of effectors, and the plurality of controllable components.

13. The vertebrate nervous system emulator engine of claim 1, wherein:
    each of the first and second hierarchies includes a third level of servo controllers; and
    the servo output of each of the servo controllers of the third level is electrically connected to the reference input of one or more of the servo controllers of the second level.

14. The vertebrate nervous system emulator engine of claim 13, wherein:
    each of the first and second hierarchies includes a fourth level of servo controllers; and
    the servo output of each of the servo controllers of the fourth level is electrically connected to the reference input of one or more of the servo controllers of the third level.

15. The vertebrate nervous system emulator engine of claim 14, wherein the servo output of at least one of the servo controllers of the fourth level is electrically connected to the reference input of another one of the servo controllers of the fourth level.

16. The vertebrate nervous system emulator engine of claim 14, further comprising a leaky integrator having an integrator input and an integrator output, the integrator input being electrically connected to the servo output of at least one of the servo controllers of the fourth level, the integrator output being electrically connected to the reference input of one of the servo controllers of the third level.

17. The vertebrate nervous system emulator engine of claim 1, wherein each of the plurality of servo controllers is implemented as an analog circuit.

18. The vertebrate nervous system emulator engine of claim 1, wherein each of the plurality of servo controllers is implemented as a digital circuit.

19. The vertebrate nervous system emulator engine of claim 1, wherein:
  each servo controller of the plurality of servo controllers has a differential input stage and a gain stage, the differential input stage being configured to generate an error signal by subtracting a servo signal, received at the servo input of said each servo controller, from a reference signal received at the reference input of said each servo controller, the gain stage being configured to amplify the error signal into an output signal and output the output signal via the servo output of said each servo controller; and
  one or more of the plurality of switches are intra-controller switches, each of the intra-controller switches being switchable to electrically connect an output of the differential input stage of one of the plurality of servo controllers to an input of the gain stage of a different one of the plurality of the servo controllers.

20. The vertebrate nervous system emulator engine of claim 19, the gain stage of each servo controller including one or more of a proportional term, an integral term, and a derivative term.

21. The vertebrate nervous system emulator engine of claim 1, wherein one or more of the plurality of switches are inter-controller switches, each of the inter-controller switches being switchable to electrically connect the servo output of one of the plurality of servo controllers to the reference input of a different one of the plurality of servo controllers.

22. A method for emulating a vertebrate nervous system, comprising operating the sequencer of the vertebrate nervous system emulator engine of claim 1 to control the plurality of switches to reconfigure the plurality of servo controllers from the first hierarchy to the second hierarchy.

23. A method for emulating a vertebrate nervous system, comprising:
  controlling, with a first subset of a plurality of servo controllers that are electrically connected to each other to form a first hierarchy of servo controllers, a plurality of movable components to achieve a first perceptual goal;
  controlling, in response to the first perceptual goal being achieved, a plurality of switches to electrically connect a second subset of the plurality of servo controllers to each other to form a second hierarchy of servo controllers that is different than the first hierarchy; and
  controlling, with the second hierarchy, the plurality of movable components to achieve a second perceptual goal that is different from the first perceptual goal;
  wherein:
  each of the plurality of servo controllers has a servo input, a reference input, and a servo output; and
  each of the first and second hierarchies includes at least a first level of servo controllers and a second level of servo controllers, the servo output of each of the servo controllers of the second level being electrically connected to the reference input of at least one of the servo controllers of the first level.

\* \* \* \* \*